United States Patent
Ibarz Gabardos et al.

(10) Patent No.: US 10,131,052 B1
(45) Date of Patent: Nov. 20, 2018

(54) PERSISTENT PREDICTOR APPARATUS AND METHODS FOR TASK SWITCHING

(71) Applicant: Brain Corporation, San Diego, CA (US)

(72) Inventors: Borja Ibarz Gabardos, LaJolla, CA (US); Oleg Sinyavskiy, San Diego, CA (US)

(73) Assignee: Brain Corporation, San Diego, CA (US)

( * ) Notice: Subject to any disclaimer, the term of this patent is extended or adjusted under 35 U.S.C. 154(b) by 672 days.

(21) Appl. No.: 14/705,487

(22) Filed: May 6, 2015

Related U.S. Application Data

(60) Provisional application No. 62/059,039, filed on Oct. 2, 2014.

(51) Int. Cl.
*B25J 9/16* (2006.01)

(52) U.S. Cl.
CPC .............. *B25J 9/163* (2013.01); *B25J 9/1602* (2013.01); *Y10S 901/01* (2013.01)

(58) Field of Classification Search
CPC ........ B25J 13/081; B25J 19/021; G06N 3/008
See application file for complete search history.

(56) References Cited

U.S. PATENT DOCUMENTS 3,920,972 A   11/1975  Corwin, Jr. et al.
4,468,617 A   8/1984   Ringwall
4,617,502 A   10/1986  Sakaue et al.
4,638,445 A   1/1987   Mattaboni
4,706,204 A   11/1987  Hattori
(Continued)

FOREIGN PATENT DOCUMENTS

CN   102226740 A   10/2011
EP     2384863 A2  11/2011
(Continued)

OTHER PUBLICATIONS

Elements of Artificial Neural Networks: Mehrotra, 1997 MIT Press.*
(Continued)

*Primary Examiner* — Robert A Cassity
*Assistant Examiner* — Peter D Coughlan
(74) *Attorney, Agent, or Firm* — Reed Smith LLP; Sidharth Kapoor

(57) ABSTRACT

An apparatus and methods for training and/or operating a robotic device to perform a target task autonomously. The target task execution may be configured based on analysis of sensory context by the robot. Target action may comprise execution of two or more mutually exclusive actions for a given context. The robotic device may be operable in accordance with a persistent switching process. For a given sensor input, the switching process may be trained to select one of two or more alternative actions based on a prior action being executed. Switching process operation may comprise assigning priorities to the available tasks based on the sensory context; the task priorities may be modified during training based on input from a trainer. The predicted task priorities may be filtered by a "persistent winner-take-all process configured to switch from a current task to another task based on the priority breaching a switching threshold.

18 Claims, 23 Drawing Sheets

(56) References Cited

U.S. PATENT DOCUMENTS

| | | |
|---|---|---|
| 4,763,276 A | 8/1988 | Perreirra et al. |
| 4,852,018 A | 7/1989 | Grossberg et al. |
| 4,925,312 A | 5/1990 | Onaga et al. |
| 5,063,603 A | 11/1991 | Burt |
| 5,092,343 A | 3/1992 | Spitzer et al. |
| 5,121,497 A | 6/1992 | Kerr et al. |
| 5,245,672 A | 9/1993 | Wilson et al. |
| 5,303,384 A | 4/1994 | Rodriguez et al. |
| 5,355,435 A | 10/1994 | Deyong et al. |
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A | 2/1997 | Spoerre et al. |
| 5,612,883 A | 3/1997 | Shaffer et al. |
| 5,638,359 A | 6/1997 | Peltola et al. |
| 5,673,367 A | 9/1997 | Buckley |
| 5,687,294 A | 11/1997 | Jeong |
| 5,719,480 A | 2/1998 | Bock et al. |
| 5,739,811 A | 4/1998 | Rosenberg et al. |
| 5,828,812 A | 10/1998 | Khan et al. |
| 5,841,959 A | 11/1998 | Guiremand |
| 5,875,108 A | 2/1999 | Hoffberg et al. |
| 5,943,660 A | 8/1999 | Yesildirek et al. |
| 5,994,864 A | 11/1999 | Inoue et al. |
| 6,009,418 A | 12/1999 | Cooper |
| 6,014,653 A | 1/2000 | Thaler |
| 6,169,981 B1 | 1/2001 | Werbos |
| 6,218,802 B1 | 4/2001 | Onoue et al. |
| 6,243,622 B1 | 6/2001 | Yim et al. |
| 6,259,988 B1 | 7/2001 | Galkowski et al. |
| 6,272,479 B1 | 8/2001 | Farry et al. |
| 6,363,369 B1 | 3/2002 | Liaw et al. |
| 6,366,293 B1 | 4/2002 | Hamilton et al. |
| 6,442,451 B1 | 8/2002 | Lapham |
| 6,458,157 B1 | 10/2002 | Suaning |
| 6,489,741 B1 | 12/2002 | Genov et al. |
| 6,493,686 B1 | 12/2002 | Francone et al. |
| 6,532,454 B1 | 3/2003 | Werbos |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,581,046 B1 | 6/2003 | Ahissar |
| 6,601,049 B1 | 7/2003 | Cooper |
| 6,636,781 B1 | 10/2003 | Shen et al. |
| 6,643,627 B2 | 11/2003 | Liaw et al. |
| 6,697,711 B2 | 2/2004 | Yokono et al. |
| 6,703,550 B2 | 3/2004 | Chu |
| 6,760,645 B2 | 7/2004 | Kaplan et al. |
| 6,961,060 B1 | 11/2005 | Mochizuki et al. |
| 7,002,585 B1 | 2/2006 | Watanabe et al. |
| 7,024,276 B2 | 4/2006 | Ito |
| 7,243,334 B1 | 7/2007 | Berger et al. |
| 7,324,870 B2 | 1/2008 | Lee et al. |
| 7,342,589 B2 | 3/2008 | Miserocchi |
| 7,395,251 B2 | 7/2008 | Linsker |
| 7,398,259 B2 | 7/2008 | Nugent |
| 7,426,501 B2 | 9/2008 | Nugent |
| 7,426,920 B1 | 9/2008 | Petersen |
| 7,668,605 B2 | 2/2010 | Braun et al. |
| 7,672,920 B2 | 3/2010 | Ito et al. |
| 7,752,544 B2 | 7/2010 | Cheng et al. |
| 7,849,030 B2 | 12/2010 | Ellingsworth |
| 8,015,130 B2 | 9/2011 | Matsugu et al. |
| 8,145,355 B2 | 3/2012 | Danko |
| 8,214,062 B2 | 7/2012 | Eguchi et al. |
| 8,271,134 B2 | 9/2012 | Kato et al. |
| 8,315,305 B2 | 11/2012 | Petre et al. |
| 8,340,823 B2 | 12/2012 | Ohno et al. |
| 8,364,314 B2 | 1/2013 | Abdallah et al. |
| 8,380,652 B1 | 2/2013 | Francis, Jr. |
| 8,419,804 B2 | 4/2013 | Herr et al. |
| 8,452,448 B2 | 5/2013 | Pack et al. |
| 8,467,623 B2 | 6/2013 | Izhikevich et al. |
| 8,509,951 B2 | 8/2013 | Gienger |
| 8,571,706 B2 | 10/2013 | Zhang et al. |
| 8,639,644 B1 | 1/2014 | Hickman et al. |
| 8,655,815 B2 | 2/2014 | Palmer et al. |
| 8,751,042 B2 | 6/2014 | Lee et al. |
| 8,793,205 B1 | 7/2014 | Fisher et al. |
| 8,924,021 B2 | 12/2014 | Dariush et al. |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,056,396 B1 | 6/2015 | Linnell |
| 9,070,039 B2 | 6/2015 | Richert |
| 9,082,079 B1 | 7/2015 | Coenen |
| 9,104,186 B2 | 8/2015 | Sinyavskiy et al. |
| 9,122,994 B2 | 9/2015 | Piekniewski et al. |
| 9,144,907 B2 | 9/2015 | Summer et al. |
| 9,177,245 B2 | 11/2015 | Richert et al. |
| 9,186,793 B1 | 11/2015 | Meier |
| 9,189,730 B1 | 11/2015 | Coenen et al. |
| 9,193,075 B1 | 11/2015 | Cipollini et al. |
| 9,195,934 B1 | 11/2015 | Hunt et al. |
| 9,213,937 B2 | 12/2015 | Ponulak |
| 9,242,372 B2 | 1/2016 | Laurent et al. |
| 9,256,823 B2 | 2/2016 | Sinyavskiy et al. |
| 9,314,924 B1 | 4/2016 | Laurent et al. |
| 9,358,685 B2 | 6/2016 | Meier et al. |
| 9,384,443 B2 | 7/2016 | Passot et al. |
| 9,613,308 B2 | 4/2017 | Izhikevich et al. |
| 9,613,310 B2 | 4/2017 | Buibas et al. |
| 9,630,317 B2 | 4/2017 | Izhikevich et al. |
| 9,630,318 B2 | 4/2017 | Ibarz et al. |
| 9,687,984 B2 | 6/2017 | Smith et al. |
| 9,789,605 B2 | 10/2017 | Meier et al. |
| 9,792,546 B2 | 10/2017 | Passot et al. |
| 9,796,078 B2 | 10/2017 | Angle et al. |
| 9,821,461 B1 | 11/2017 | Urata et al. |
| 9,849,588 B2 | 12/2017 | Izhikevich et al. |
| 9,870,617 B2 | 1/2018 | Piekniewski et al. |
| 2001/0045809 A1 | 11/2001 | Mukai |
| 2002/0038294 A1 | 3/2002 | Matsugu |
| 2002/0103576 A1 | 8/2002 | Takamura et al. |
| 2002/0158599 A1 | 10/2002 | Fujita et al. |
| 2002/0169733 A1 | 11/2002 | Peters et al. |
| 2002/0175894 A1 | 11/2002 | Grillo |
| 2002/0198854 A1 | 12/2002 | Berenji et al. |
| 2003/0023347 A1 | 1/2003 | Konno et al. |
| 2003/0050903 A1 | 3/2003 | Liaw et al. |
| 2003/0108415 A1 | 6/2003 | Hosek et al. |
| 2003/0144764 A1 | 7/2003 | Yokono et al. |
| 2003/0220714 A1 | 11/2003 | Nakamura et al. |
| 2004/0030449 A1 | 2/2004 | Solomon |
| 2004/0036437 A1 | 2/2004 | Ito |
| 2004/0051493 A1 | 3/2004 | Furuta et al. |
| 2004/0128028 A1 | 7/2004 | Miyamoto et al. |
| 2004/0131998 A1 | 7/2004 | Marom et al. |
| 2004/0136439 A1 | 7/2004 | Dewberry et al. |
| 2004/0158358 A1 | 8/2004 | Anezaki et al. |
| 2004/0162638 A1 | 8/2004 | Solomon |
| 2004/0167641 A1 | 8/2004 | Kawai et al. |
| 2004/0172168 A1 | 9/2004 | Watanabe et al. |
| 2004/0193670 A1 | 9/2004 | Langan et al. |
| 2004/0267404 A1 | 12/2004 | Danko |
| 2005/0004710 A1 | 1/2005 | Shimomura et al. |
| 2005/0008227 A1 | 1/2005 | Duan et al. |
| 2005/0015351 A1 | 1/2005 | Nugent |
| 2005/0036649 A1 | 2/2005 | Yokono et al. |
| 2005/0049749 A1 | 3/2005 | Watanabe et al. |
| 2005/0054381 A1 | 3/2005 | Lee et al. |
| 2005/0065650 A1* | 3/2005 | Lewis .................. B25J 13/081 |
| | | 700/245 |
| 2005/0065651 A1 | 3/2005 | Ayers et al. |
| 2005/0069207 A1 | 3/2005 | Zakrzewski et al. |
| 2005/0113973 A1 | 5/2005 | Endo et al. |
| 2005/0119791 A1 | 6/2005 | Nagashima |
| 2005/0125099 A1 | 6/2005 | Mikami et al. |
| 2005/0283450 A1 | 12/2005 | Matsugu et al. |

(56) References Cited

U.S. PATENT DOCUMENTS

| | | |
|---|---|---|
| 2006/0069448 A1 | 3/2006 | Yasui |
| 2006/0082340 A1 | 4/2006 | Watanabe et al. |
| 2006/0094001 A1 | 5/2006 | Torre et al. |
| 2006/0129277 A1 | 6/2006 | Wu et al. |
| 2006/0129506 A1 | 6/2006 | Edelman et al. |
| 2006/0149489 A1 | 7/2006 | Joublin et al. |
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |
| 2006/0181236 A1 | 8/2006 | Brogardh et al. |
| 2006/0189900 A1 | 8/2006 | Flaherty et al. |
| 2006/0207419 A1 | 9/2006 | Okazaki et al. |
| 2006/0217837 A1 | 9/2006 | Koga et al. |
| 2006/0230140 A1 | 10/2006 | Aoyama et al. |
| 2006/0250101 A1 | 11/2006 | Khatib et al. |
| 2007/0022068 A1 | 1/2007 | Linsker |
| 2007/0074177 A1 | 3/2007 | Kurita et al. |
| 2007/0100780 A1 | 5/2007 | Fleischer et al. |
| 2007/0112700 A1 | 5/2007 | Den et al. |
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush et al. |
| 2007/0260356 A1 | 11/2007 | Kock et al. |
| 2008/0024345 A1 | 1/2008 | Watson |
| 2008/0040040 A1 | 2/2008 | Goto et al. |
| 2008/0097644 A1 | 4/2008 | Kaznov et al. |
| 2008/0100482 A1 | 5/2008 | Lazar |
| 2008/0112596 A1 | 5/2008 | Rhoads et al. |
| 2008/0114710 A1 | 5/2008 | Pucher |
| 2008/0133052 A1 | 6/2008 | Jones et al. |
| 2008/0140257 A1 | 6/2008 | Sato et al. |
| 2008/0154428 A1 | 6/2008 | Nagatsuka et al. |
| 2008/0162391 A1 | 7/2008 | Izhikevich |
| 2008/0208391 A1 | 8/2008 | Hasegawa et al. |
| 2008/0294074 A1 | 11/2008 | Tong et al. |
| 2008/0319929 A1 | 12/2008 | Kaplan et al. |
| 2009/0037033 A1 | 2/2009 | Phillips et al. |
| 2009/0037351 A1 | 2/2009 | Kristal et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1 | 9/2009 | Bass, II et al. |
| 2009/0234501 A1 | 9/2009 | Ishizaki |
| 2009/0265036 A1 | 10/2009 | Jamieson et al. |
| 2009/0272585 A1 | 11/2009 | Nagasaka |
| 2009/0287624 A1 | 11/2009 | Rouat et al. |
| 2009/0299751 A1 | 12/2009 | Jung |
| 2009/0312817 A1 | 12/2009 | Hogle et al. |
| 2010/0036457 A1 | 2/2010 | Sarpeshkar et al. |
| 2010/0081958 A1 | 4/2010 | She |
| 2010/0086171 A1 | 4/2010 | Lapstun |
| 2010/0119214 A1 | 5/2010 | Shimazaki et al. |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger et al. |
| 2010/0225824 A1 | 9/2010 | Lazar et al. |
| 2010/0228264 A1 | 9/2010 | Robinson et al. |
| 2010/0286824 A1 | 11/2010 | Solomon |
| 2010/0292835 A1 | 11/2010 | Sugiura et al. |
| 2010/0299101 A1 | 11/2010 | Shimada et al. |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen et al. |
| 2011/0026770 A1 | 2/2011 | Brookshire |
| 2011/0035052 A1 | 2/2011 | McLurkin et al. |
| 2011/0035188 A1 | 2/2011 | Martinez-Heras et al. |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch et al. |
| 2011/0119215 A1 | 5/2011 | Elmegreen et al. |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1 | 6/2011 | Orita et al. |
| 2011/0160907 A1 | 6/2011 | Orita |
| 2011/0196199 A1 | 8/2011 | Donhowe et al. |
| 2011/0202174 A1* | 8/2011 | Bogash ............... G06F 19/3462 700/225 |
| 2011/0208350 A1 | 8/2011 | Eliuk et al. |
| 2011/0218676 A1 | 9/2011 | Okazaki |
| 2011/0231016 A1 | 9/2011 | Goulding |
| 2011/0244919 A1 | 10/2011 | Aller et al. |
| 2011/0282169 A1 | 11/2011 | Grudic et al. |
| 2011/0296944 A1 | 12/2011 | Carter et al. |
| 2011/0319714 A1 | 12/2011 | Roelle et al. |
| 2012/0008838 A1 | 1/2012 | Guyon et al. |
| 2012/0011090 A1 | 1/2012 | Tang et al. |
| 2012/0011093 A1 | 1/2012 | Aparin et al. |
| 2012/0017232 A1 | 1/2012 | Hoffberg et al. |
| 2012/0022688 A1* | 1/2012 | Wong ................ G06N 3/008 700/253 |
| 2012/0036099 A1 | 2/2012 | Venkatraman et al. |
| 2012/0045068 A1 | 2/2012 | Kim et al. |
| 2012/0053728 A1 | 3/2012 | Theodorus et al. |
| 2012/0071752 A1 | 3/2012 | Sewell et al. |
| 2012/0079670 A1 | 4/2012 | Yoon et al. |
| 2012/0109866 A1 | 5/2012 | Modha |
| 2012/0143495 A1 | 6/2012 | Dantu |
| 2012/0144242 A1 | 6/2012 | Vichare et al. |
| 2012/0150777 A1 | 6/2012 | Setoguchi et al. |
| 2012/0150781 A1 | 6/2012 | Arthur et al. |
| 2012/0173021 A1 | 7/2012 | Tsusaka |
| 2012/0185092 A1 | 7/2012 | Ku |
| 2012/0197439 A1 | 8/2012 | Wang et al. |
| 2012/0209428 A1 | 8/2012 | Mizutani |
| 2012/0209432 A1 | 8/2012 | Fleischer et al. |
| 2012/0212623 A1 | 8/2012 | Cho et al. |
| 2012/0221147 A1 | 8/2012 | Goldberg et al. |
| 2012/0268580 A1 | 10/2012 | Kim et al. |
| 2012/0296471 A1 | 11/2012 | Inaba et al. |
| 2012/0303091 A1 | 11/2012 | Izhikevich |
| 2012/0303160 A1 | 11/2012 | Ziegler et al. |
| 2012/0308076 A1 | 12/2012 | Piekniewski et al. |
| 2012/0308136 A1 | 12/2012 | Izhikevich |
| 2013/0000480 A1 | 1/2013 | Komatsu et al. |
| 2013/0006468 A1 | 1/2013 | Koehrsen et al. |
| 2013/0019325 A1 | 1/2013 | Deisseroth et al. |
| 2013/0066468 A1 | 3/2013 | Choi et al. |
| 2013/0073080 A1 | 3/2013 | Ponulak |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073493 A1 | 3/2013 | Modha |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0096719 A1 | 4/2013 | Sanders et al. |
| 2013/0116827 A1 | 5/2013 | Inazumi |
| 2013/0118288 A1 | 5/2013 | Liu |
| 2013/0151442 A1 | 6/2013 | Suh, II et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0173060 A1 | 7/2013 | Yoo et al. |
| 2013/0206170 A1 | 8/2013 | Svendsen et al. |
| 2013/0218339 A1 | 8/2013 | Maisonnier et al. |
| 2013/0218821 A1 | 8/2013 | Szatmary et al. |
| 2013/0238122 A1 | 9/2013 | Hodgins et al. |
| 2013/0245829 A1 | 9/2013 | Ohta et al. |

(56) References Cited

U.S. PATENT DOCUMENTS

| | | |
|---|---|---|
| 2013/0251278 A1 | 9/2013 | Izhikevich et al. |
| 2013/0274924 A1 | 10/2013 | Chung et al. |
| 2013/0278631 A1 | 10/2013 | Border et al. |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0310979 A1 | 11/2013 | Herr et al. |
| 2013/0325244 A1 | 12/2013 | Wang et al. |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2013/0345718 A1 | 12/2013 | Crawford et al. |
| 2013/0345870 A1 | 12/2013 | Buehler et al. |
| 2013/0346347 A1 | 12/2013 | Patterson et al. |
| 2014/0012788 A1 | 1/2014 | Piekniewski |
| 2014/0016858 A1 | 1/2014 | Richert |
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0064609 A1 | 3/2014 | Petre et al. |
| 2014/0075004 A1 | 3/2014 | Van et al. |
| 2014/0081895 A1 | 3/2014 | Coenen et al. |
| 2014/0089232 A1 | 3/2014 | Buibas et al. |
| 2014/0114479 A1 | 4/2014 | Okazaki |
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0187519 A1 | 7/2014 | Cooke et al. |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1 | 9/2014 | Izhikevich et al. |
| 2014/0277744 A1* | 9/2014 | Coenen .................. B25J 9/163 700/264 |
| 2014/0298212 A1 | 10/2014 | Wen |
| 2014/0309659 A1 | 10/2014 | Roh et al. |
| 2014/0317035 A1 | 10/2014 | Szatmary et al. |
| 2014/0350723 A1 | 11/2014 | Prieto et al. |
| 2014/0358284 A1 | 12/2014 | Laurent et al. |
| 2014/0358828 A1 | 12/2014 | Phillipps et al. |
| 2014/0369558 A1 | 12/2014 | Holz |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0066479 A1 | 3/2015 | Pasupalak et al. |
| 2015/0077323 A1 | 3/2015 | Ramaswamy et al. |
| 2015/0094850 A1 | 4/2015 | Passot et al. |
| 2015/0094852 A1 | 4/2015 | Laurent et al. |
| 2015/0120128 A1 | 4/2015 | Rosenstein et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |
| 2015/0148956 A1 | 5/2015 | Negishi |
| 2015/0185027 A1 | 7/2015 | Kikkeri et al. |
| 2015/0204559 A1 | 7/2015 | Hoffberg et al. |
| 2015/0217449 A1 | 8/2015 | Meier et al. |
| 2015/0242746 A1 | 8/2015 | Rao et al. |
| 2015/0283701 A1 | 10/2015 | Izhikevich et al. |
| 2015/0283702 A1 | 10/2015 | Izhikevich et al. |
| 2015/0283703 A1 | 10/2015 | Izhikevich et al. |
| 2015/0284010 A1 | 10/2015 | Beardsley et al. |
| 2015/0306761 A1 | 10/2015 | O'Connor et al. |
| 2015/0317357 A1 | 11/2015 | Harmsen et al. |
| 2015/0338204 A1 | 11/2015 | Richert et al. |
| 2015/0339589 A1 | 11/2015 | Fisher |
| 2015/0339826 A1 | 11/2015 | Buibas et al. |
| 2015/0341633 A1 | 11/2015 | Richert |
| 2016/0004923 A1 | 1/2016 | Piekniewski et al. |
| 2016/0014426 A1 | 1/2016 | Richert |
| 2016/0075015 A1 | 3/2016 | Izhikevich et al. |
| 2016/0086050 A1 | 3/2016 | Piekniewski et al. |
| 2016/0086051 A1 | 3/2016 | Piekniewski et al. |
| 2016/0086052 A1 | 3/2016 | Piekniewski et al. |
| 2016/0096270 A1 | 4/2016 | Ibarz et al. |
| 2016/0096272 A1 | 4/2016 | Smith et al. |

FOREIGN PATENT DOCUMENTS

| | | |
|---|---|---|
| JP | H0487423 A | 3/1992 |
| JP | 2003175480 A | 6/2003 |
| RU | 2108612 C1 | 4/1998 |
| WO | WO-2008083335 A2 | 7/2008 |
| WO | WO-2010136961 A1 | 12/2010 |
| WO | WO-2011039542 A1 | 4/2011 |
| WO | WO-2012151585 A2 | 11/2012 |

OTHER PUBLICATIONS

Abbott L. F. and Nelson S.B. (2000), "Synaptic plasticity: taming the beast", Nature Neuroscience, 3, 1178-1183.

Alvarez, "Review of Approximation Techniques," PhD thesis, chapter 2, pp. 7-14, University of Bradford, 2000.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <ahref="http://msc.berkeley.edu/wjchen/publications/DSC12.sub.--8726.sub.--FI-.pdf">http://msc.berkeley.edu/wjchen/publications/DSC12.sub.--8726.sub.--FI-.pdf</a>/<http: />.

Bartlett et al., "Convexity, Classification, and Risk Bounds" Jun. 16, 2005, pp. 1-61.

Bartlett., et al., "Large Margin Classifiers: Convex Loss, Low Noise, and Convergence Rates," Dec. 8, 2003, 8 pgs.

Bohte, 'Spiking Nueral Networks' Doctorate at the University of Leiden, Holland, Mar. 5, 2003, pp. 1-133 [retrieved on Nov. 14, 2012]. Retrieved from the interne <ahref="http://homepages.cwi.nl/~sbohte/publication/phdthesis.pdf">http://homepages.cwi.nl/~sbohte/publication/phdthesis.pdf</a><url: />.

Bouganis, Alexandros, et al.,"Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Branca, et al. (1995), A Neural Network for Ego-motion Estimation from Optical Flow BMC'95 Proceedings of the 1995 British conference on machine vision (vol. 1), pp. 247-256.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of interspike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

(56) References Cited

OTHER PUBLICATIONS

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: < frontiersin.org />.

Gewaltig et al.. 'NEST (Neural Simulation Tool)', Scholarpedia, 2007. pp. 1-15. 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.

Graham The Surf Hippo User Manual Version 3.0 B. Unite de Neurosiences Integratives et Computationnelles Institut Federatif de Neurobiologie Alfred Fessard CNRS. France. Mar. 2002 [retrieved Jan. 16, 2014]. [retrieved biomedical.univ-paris5.fr ].

Grollman., et al., "Dogged Learning for Robots," IEEE International Conference on Robotics and Automation (ICRA), 2007.

Hatsopoulos, Visual Navigation with a Neural Network, Published 1991.

http://www.braincorporation.com/specs/13StemSpecSheet_Rev_Nov11_2013.pdf.

Huang, Fall Detection Using Modular Neural Networks with Back-projected Optical Flow, Published 2007.

Izhikevich E.M. (2006) Polychronization: Computation With Spikes. Neural Computation, 18:245-282.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Jin, X., Rast, A., F. Galluppi, F., S. Davies., S., and Furber, S. (2010) "Implementing Spike-Timing-Dependent Plasticity on SpiNNaker Neuromorphic Hardware", WCCI 2010, IEEE World Congress on Computational Intelligence.

Kalman Filter; wikipedia.

Karbowski et al., 'Multispikes and Synchronization in a Large Neural Network with Temporal Delays', Neural Computation 12. 1573-1606 (2000).

Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from the Internet: <ahref="http://ncs.ethz.ch/projects/evospike/publications/evolving-spiking-neural-networks-for-spatio-and-spectro-temporal-pattern-recognition-plenary-talk-ieee-is/view">http://ncs.ethz.ch/projects/evospike/publications/evolving-spiking-neural-networks-for-spatio-and-spectro-temporal-pattern-recognition-plenary-talk-ieee-is/view</a>.

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/ Khotanzad. pdf.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.

Laurent, 'The Neural Network Query Language (NNQL) Reference' [retrieved on Nov. 12, 2013]. Retrieved from the Internet: <URLhttps://code.google.com/p/ nnql/issues/detail?id=1>.

Lazar et a]. 'Multichannel time encoding with integrate-and-fire neurons.' Neurocomputing 65 (2005): 401-407.

Lazar et al. 'A video time encoding machine', in Proceedings of the 15th IEEE International Conference on Image Processing (ICIP '08 2008, pp. 717-720.

Lazar., et al., "Consistent recovery of sensory stimuli encoded with MIMO neural circuits," Computational intelligence and neuroscience, 2009.

Lazar et al. 'Consistent recovery of sensory stimuli encoded with MIMO neural circuits.' Computational intelligence and neuroscience (2010): 2.

Makridakis et al., "Evaluating Accuracy (or Error) Measures", INSEAD Technical Report, 1995/18/TM.

Masquelier, Timothee, 'Relative spike time coding and STOP-based orientation selectivity in the early visual system in natural continuous and saccadic vision: a computational model.' Journal of computational neuroscience 32.3 (2012): 425-441.

Miller III, "Real-Time Application of Neural Networks for Sensor-Based Control of Robots with Vision," IEEE Transactions on Systems, Man, and Cypernetics Jul./Aug. 1989, vol. 19 (4), pp. 825-831.

Nguyen et al., "Estimating divergence functionals and the likelihood ratio by penalized convex risk minimization" 2007, pp. 1-8.

Nichols, A Reconfigurable Computing Architecture for Implementing Artificial Neural Networks on FPGA, Master's Thesis, The University of Guelph, 2003, pp. 1-235.

Park., et al., Transfer of Skills between Human Operators through Haptic Training with Robot Coordination. International Conference on Robotics and Automation Anchorage Convention District, Anchorage, Alaska, USA, pp. 229-235 [online], 2010 [retrieved Dec. 3, 2015]. Retrieved from the Internet:<url:https:></url:https:>.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu! viewdoc/download?doi=0.1.1.5.4346&rep-repl&type-pdf.

Sato et al., 'Pulse interval and width modulation for video transmission.' Cable Television, IEEE Transactions on 4 (1978): 165-173.

Schemmel, J., et al., Implementing synaptic plasticity in a VLSI spiking neural network model. In: Proceedings of the 20061ntemational Joint Conference on Neural Networks (IJCNN'06), IEEE Press (2006) Jul. 16-21, 2006, pp. 1-6 [online], [retrieved on Aug. 24, 2012]. Retrieved from the Internet <url:> Introduction</url:>.

Simulink.RTM. model [online], [Retrieved on Dec. 10, 2013] Retrieved from <URL: http://www.mathworks.com/ products/simulink/index.html>.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Specification, figures and EFS receipt of U.S. Appl. No. 14/244,888, filed Apr. 3, 2014 and entitled "Learning apparatus and methods for control of robotic devices via spoofing" (100 pages).

(56) References Cited

OTHER PUBLICATIONS

Specification, figures and EFS receipt of U.S. Appl. No. 14/244,890, filed Apr. 3, 2014 and entitled "Apparatus and methods for remotely controlling robotic devices" (91 pages).
Specification, figures and EFS receipt of U.S. Appl. No. 14/244,892, filed Apr. 3, 2014 and entitled "Spoofing remote control apparatus and methods" (95 pages).
Specification, figures and EFS receipt of U.S. Appl. No. 14/265,113, filed Apr. 29, 2014 and entitled "Trainable convolutional network apparatus and methods for operating a robotic vehicle" (71 pages).
Specification, figures and EFS receipt of U.S. Appl. No. 14/285,385, filed May 22, 2014 and entitled "Apparatus and methods for real time estimation of differential motion in live video" (42 pages).
Specification, figures and EFS receipt of U.S. Appl. No. 14/285,414, filed May 22, 2014 and entitled "Apparatus and methods for distance estimation using multiple image sensors" (63 pages).
Specification, figures and EFS receipt of U.S. Appl. No. 14/285,466, filed May 22, 2014 and entitled "Apparatus and methods for robotic operation using video imagery" (64 pages).
Specification, figures and EFS receipt of U.S. Appl. No. 14/321,736, filed Jul. 1, 2014 and entitled "Optical detection apparatus and methods" (49 pages).
Specification, figures and EFS receipt of U.S. Appl. No. 14/326,374, filed Jul. 8, 2014 and entitled "Apparatus and methods for distance estimation using stereo imagery" (75 pages).
Specification, figures and EFS receipt of U.S. Appl. No. 14/489,242, filed Sep. 17, 2014 and entitled "Apparatus and methods for remotely controlling robotic devices" (100 pages).
Specification, figures and EFS receipt of U.S. Appl. No. 14/542,391, filed Nov. 14, 2014 and entitled "Feature detection apparatus and methods for training of robotic navigation" (83 pages).
Specification, figures and EFS receipt of U.S. Appl. No. 14/588,168, filed Dec. 31, 2014 and entitled—Apparatus and methods for training robots (101 pages).
Specification, figures and EFS receipt of U.S. Appl. No. 14/637,138, filed Mar. 3, 2015 and entitled "Salient features tracking apparatus and methods using visual initialization" (66 pages).
Specification, figures and EFS receipt of U.S. Appl. No. 14/637,164, filed Mar. 3, 2015 and entitled "Apparatus and methods for tracking salient features" (66 pages).
Specification, figures and EFS receipt of U.S. Appl. No. 14/637,191, filed Mar. 3, 2015 and entitled "Apparatus and methods for saliency detection based on color occurrence analysis" (66 pages).
Specification, figures and EFS receipt of U.S. Appl. No. 14/705,487, filed May 6, 2015 and entitled—Persistent predictor apparatus and methods for task switching (119 pages).
Szatmary et al., "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioL.org/article/info%3Adoi%2F10.1371%2Fjournal,pcbi.1000879<url:></url:>.
Walters, "Implementation of Self-Organizing Neural Networks for Visuo-Motor Control of an Industrial Robot," IEEE Transactions on Neural Networks, vol. 4 (1), Jan. 1993, pp. 86-95.
Wang 'The time dimension for scene analysis.' Neural Networks, IEEE Transactions on 16.6 (2005): 1401-1426.
Zhou, Computation of Optical Flow Using a Neural Network, Published 1988.
Li S., et al., "Random KNN feature selection—a fast and stable alternative to Random Forests," BMC Bioinformatics, 2011, vol. 12(450), pp. 1-11.
Manduchi R., et al., "Obstacle Detection and Terrain Classification for Autonomous Off-Road Navigation," Autonomous Robots, 2005, vol. 18, pp. 81-344.
Mehrotra K., et al., "Elements of Artificial Neural Networks," MIT press,1997, pp. 1-76.

\* cited by examiner

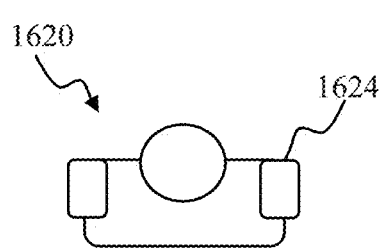
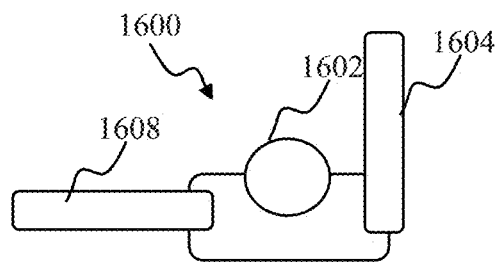
FIG. 16A
FIG. 16B
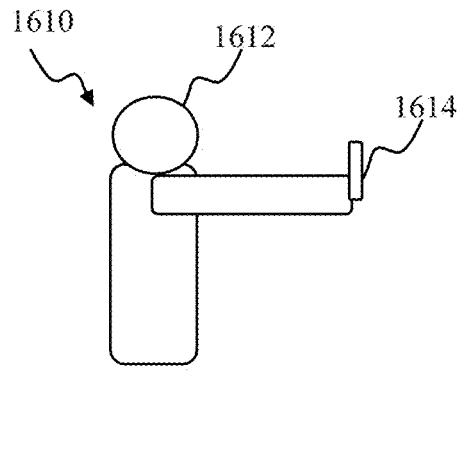
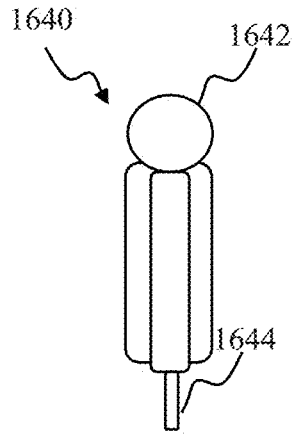
FIG. 16C
FIG. 16D

PERSISTENT PREDICTOR APPARATUS AND METHODS FOR TASK SWITCHING

CROSS-REFERENCE TO RELATED APPLICATIONS

This application claims the priority benefit of co-owned U.S. Provisional Patent Application Ser. No. 62/059,039 entitled "APPARATUS AND METHODS FOR TRAINING OF ROBOTS", filed Oct. 2, 2014, which is incorporated herein by reference in its entirety.

This application is related to co-pending and co-owned U.S. patent application Ser. No. 14/694,901 entitled "APPARATUS AND METHOD FOR HIERARCHICAL TRAINING OF ROBOTS", filed Apr. 23, 2015, Ser. No. 14/607,018 entitled "APPARATUS AND METHODS FOR TRAINING PATH NAVIGATION BY ROBOTS", filed Jan. 27, 2015, Ser. No. 14/588,168 entitled "APPARATUS AND METHODS FOR TRAINING OF ROBOTS", filed Dec. 31, 2014, Ser. No. 14/244,890 entitled "APPARATUS AND METHODS FOR REMOTELY CONTROLLING ROBOTIC DEVICES", filed Apr. 3, 2014, Ser. No. 13/918,338 entitled "ROBOTIC TRAINING APPARATUS AND METHODS", filed Jun. 14, 2013, Ser. No. 13/918,298 entitled "HIERARCHICAL ROBOTIC CONTROLLER APPARATUS AND METHODS", filed Jun. 14, 2013, Ser. No. 13/907,734 entitled "ADAPTIVE ROBOTIC INTERFACE APPARATUS AND METHODS", filed May 31, 2013, Ser. No. 13/842,530 entitled "ADAPTIVE PREDICTOR APPARATUS AND METHODS", filed Mar. 15, 2013, Ser. No. 13/842,562 entitled "ADAPTIVE PREDICTOR APPARATUS AND METHODS FOR ROBOTIC CONTROL", filed Mar. 15, 2013, Ser. No. 13/842,616 entitled "ROBOTIC APPARATUS AND METHODS FOR DEVELOPING A HIERARCHY OF MOTOR PRIMITIVES", filed Mar. 15, 2013, Ser. No. 13/842,647 entitled "MULTICHANNEL ROBOTIC CONTROLLER APPARATUS AND METHODS", filed Mar. 15, 2013, and Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure relates to, inter alia, computerized apparatus and methods for training of robotic devices to perform a plurality of tasks autonomously.

BACKGROUND

In some situations, it may be desirable to train a robot to execute mutually exclusive actions e.g., turn left/right when placed between two given visual markers. If the sensory context is comprised solely of visual input, existing training approaches may prove inadequate.

SUMMARY

In one aspect of the present disclosure, a non-transitory machine-readable storage medium having instructions embodied thereon, the instructions being executable by one or more processors to effectuate training of a learning component configured to operate a robotic apparatus, is disclosed. In one exemplary embodiment, the instructions are configured to, when executed cause the one or more processors to: provide a first control output, the first control output configured to cause the robotic apparatus to execute a first action; receive a feature occurrence information; configure a learning component to produce a predicted output based on an occurrence of a feature in the feature occurrence information, the predicted output configured to cause the robotic apparatus to execute a second action; evaluate a training input indicative of a target action; determine a second control output based on a combination of the training input and the predicted output, the second control output configured to maintain execution of the first action by the robotic apparatus; provide the second control output to the learning component; and adapt the learning component in accordance with a discrepancy measure between the second control output and the predicted output to effectuate training of the learning component; wherein the adaptation of the learning configuration is configured to cause the learning component to produce the second control output upon the occurrence of the feature during execution of the first action.

In one variant, a combined output is determined by an overriding combiner component configured to produce: the combined output corresponding to the training input when the training input comprises a non-trivial indication; and the combined output corresponding to the predicted output when the training input comprises a trivial indication. In one such case, the non-trivial indication comprises a non-zero signal. In another case, the trivial indication comprises a zero-valued signal.

In one variant, a combined output is characterized by an active state configured to cause the robotic apparatus to execute the second action; and an inactive state configured to be ignored by the robotic apparatus; and the combined output is effectuated by a combiner component operable in accordance with a state-persistent process characterized by a threshold, the process configured to: produce the active state of the combined output when a combination of the training input and the predicted output breaches the threshold; and produce the inactive state of the combined output when the combination of the training input and the predicted output does not breach the threshold. In one such variant, the active state comprises a positive value; and the inactive state comprises a negative value. In another such variant, the predicted output comprises a first vector comprised of a first component configured to activate the first action, and a second component configured to activate the second action; the training input comprises a second vector comprised of a plurality of components; the combined output comprises a third vector comprised of a plurality of components; and the threshold of the state-persistent process is performed on a component-by component basis. In some such cases, a sum of the plurality of components of the third vector is one. In still other variants, first components of the first vector are selected from a first range between negative one and positive one inclusive; the third components of the third vector are selected from the first range between negative one and positive one inclusive; and the second components of the second vector are selected from a second range between negative two and positive two inclusive.

In still another variant, a combined output is generated by an additive combiner component is configured to produce the combined output, the additive combiner component configured to generate a combination of the training input when the training input comprises a non-trivial indication; and the predicted input when the predicted output comprises a non-trivial indication.

In another aspect of the present disclosure, a robotic apparatus is disclosed. In one embodiment, the robotic apparatus includes: a sensor interface configured to receive sensor data related to an environment of the robotic apparatus; an interface configured to receive a training input; a feature detection component; an output prediction component in operable communication with the feature detection component and the interface, the output prediction component comprising logic configured to, based on a feature detection indication produced by the feature detection component, to produce a first task activation indication and a second task activation indication; and a switching component. In one exemplary variant, the switching component is configured to, for the feature detection indication: evaluate a current active task indication; based on the current active task indication corresponding to a third task, provide a task activation output comprising the first task activation indication; and based on the current active task indication corresponding to a fourth task, provide the task activation output comprising the second task activation indication; wherein: the third and the fourth tasks differ from one another so as to produce outcomes different from one another.

In one variant, the first, the second, the third and the fourth tasks differ from one another so as to produce outcomes different from one another.

In another variant, the first, the third and the fourth tasks differ from one another so as to produce outcomes different from one another.

In a fourth variant, the apparatus includes a first and second actuator operably coupled to the switching component; wherein the first task activation output is configured to activate the first actuator; and the second task activation output is configured to activate the second actuator. In one such case, the first actuator activation is configured to displace the robotic apparatus from a first coordinate to a second coordinate, and the second actuator activation is configured to displace the robotic apparatus from the first coordinate to a third coordinate substantially different from the second coordinate.

In another variant, the robotic apparatus is characterized by a state; the first activation indication is configured to modify a current instance of the state to a first state; and the second activation indication is configured to modify the current instance of the state to a second state, the second state being different from the first state. In one variant the state is characterized by a state parameter selected from the group consisting of a position of the robotic apparatus, a characteristic of motion of the robotic apparatus, and an orientation of the robotic apparatus. In another variant the apparatus includes a first mechanical element and a second mechanical element; wherein the state is characterized by a state parameter conveying information related to mutual orientation of the first and the second mechanical element. In still another variant, the apparatus includes a mechanical element characterized by a dimension of a plurality of possible dimensions; and wherein the state comprises a first dimension.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIGS. 16A-16D illustrate use of gestures by a human operator for communicating control indications to a robotic device, in accordance with one or more implementations.

Figure 1:
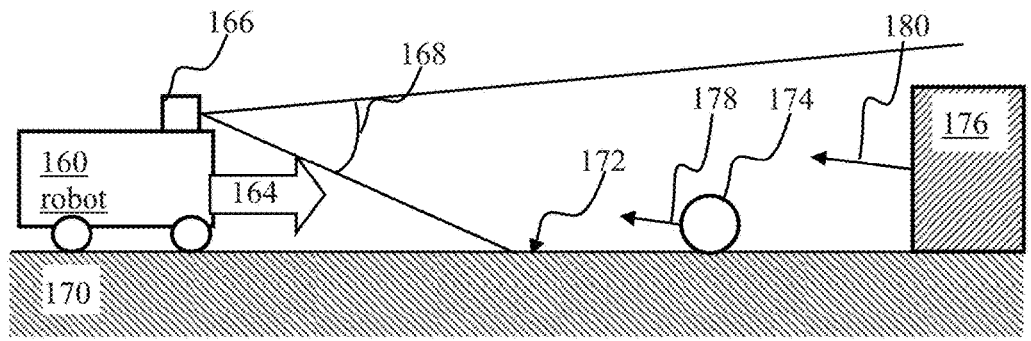
FIG. 1 is a graphical illustration depicting a robotic apparatus comprising an adaptive controller configured for autonomous navigation, in accordance with one or more implementations.

All Figures disclosed herein are © Copyright 2014-2015 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, smart TVs, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein the term feature may refer to a representation of an object edge, determined by change in color, luminance, brightness, transparency, texture, and/or curvature. The object features may comprise, inter alia, individual edges, intersections of edges (such as corners), orifices, and/or curvature As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, and/or other FireWire implementation), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., inband or OOB, cable modem, etc.), Wi-Fi (802.11), WiMAX (802.16), PAN (e.g., 802.15), cellular (e.g., 3G, LTE/LTE-A/TD-LTE, GSM, and/or other cellular interface implementation) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other wireless interface implementation), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

Figure 4A:
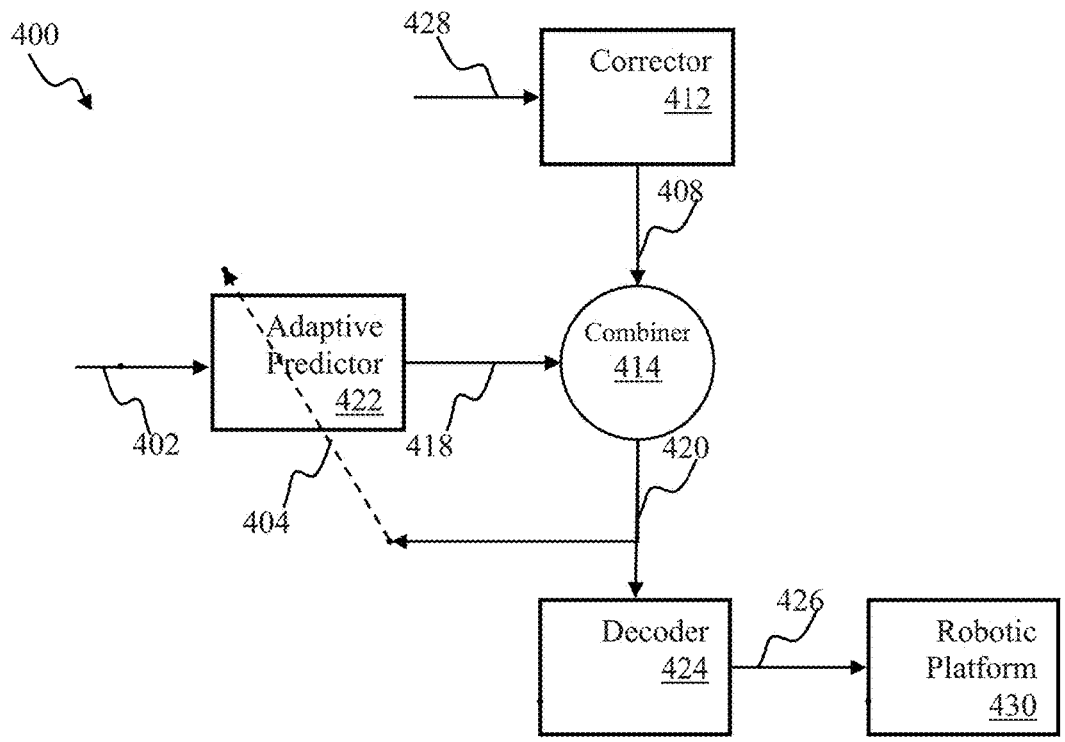
FIG. 4A is a block diagram illustrating an adaptive control system for use with, e.g., the robotic apparatus of FIG. 1, according to one or more implementations.
Figure 4B:
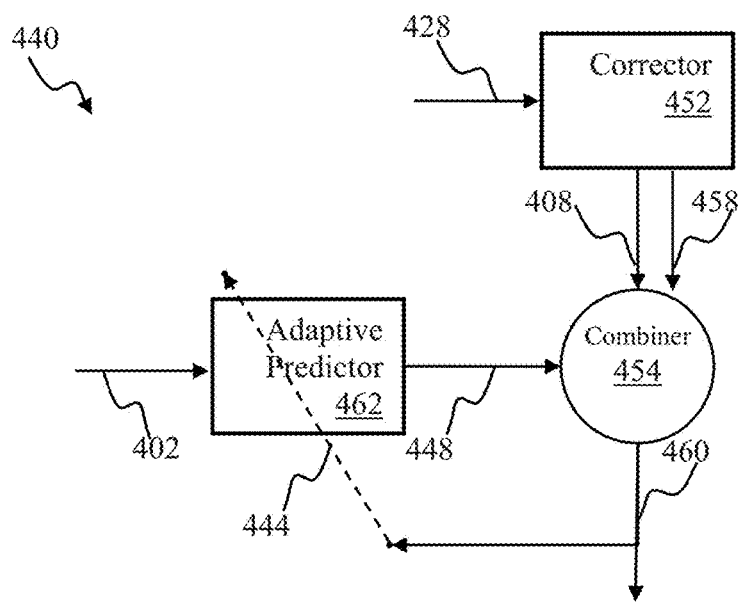
FIG. 4B is a block diagram illustrating an adaptive controller apparatus comprising a mode combiner for use with, e.g., the robotic apparatus of FIG. 1, according to one or more implementations.

FIG. 1 depicts a mobile robotic apparatus that may be configured with an adaptive controller in accordance with one or more implementations of e.g., the learning apparatuses illustrated in FIGS. 4A-4B, infra. The robotic apparatus 160 may comprise a sensor component 166. The sensor component 166 may be characterized by an aperture/field of view 168 (e.g., an extent of the observable world that may be captured by the sensor at a given moment). The sensor component 166 may provide information associated with objects within the field-of-view 168. In one or more implementations, such as object recognition, and/or obstacle avoidance, the output provided by the sensor component 166 may comprise a stream of pixel values associated with one or more digital images. In one or more implementations of e.g., video, radar, sonography, x-ray, magnetic resonance imaging, and/or other types of sensing, the sensor 166 output may be based on electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of red/green/blue (RGB) values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. Pixels and/or groups of pixels associated with objects and/or features in the input frames may be encoded using, for example, latency encoding described in co-owned U.S. patent application Ser. No. 12/869,583, filed Aug. 26, 2010 and entitled "SYSTEMS AND METHODS FOR INVARIANT PULSE LATENCY CODING"; U.S. Pat. No. 8,315,305, issued Nov. 20, 2012, and entitled "SYSTEMS AND METHODS FOR INVARIANT PULSE LATENCY CODING"; U.S. patent application Ser. No. 13/152,084, filed Jun. 2, 2011, and entitled "APPARATUS AND METHODS FOR PULSE-CODE INVARIANT OBJECT RECOGNITION"; and/or latency encoding comprising a temporal winner take all mechanism described in U.S. patent application Ser. No. 13/757,607, filed Feb. 1, 2013, and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using a spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such as neuron excitability which is described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in co-owned U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. The term continuous signal may be used to describe a non-spiking signal (e.g., analog, n-ary digital signal characterized by n-bits of resolution, n>1). In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, each of the foregoing being incorporated herein by reference in its entirety.

In some implementations of robotic navigation in an arbitrary environment, the sensor component 166 may comprise a camera configured to provide an output comprising a plurality of digital image frames refreshed at, e.g., 25 Hz frame rate. The sensor output may be processed by a learning controller, e.g., as illustrated and described with respect to FIG. 4A.

In some implementations of robotic vehicle navigation, output of the sensor 166 in FIG. 1 may comprise representations of one or more objects (e.g., targets, and/or obstacles). The tasks of the robot may be configured based on a context. In one or more implementations, the context may comprise one or more of robot state (e.g., location or motion information, (position, orientation, speed), platform state or configuration (e.g., manipulator size and/or position), available power and/or other), state of the environment (e.g., object size, location), environmental state (wind, rain), previous state information (e.g., based on historic states of robot motions), and/or other characteristic state information.

In some applications, it may be desirable to train a robot to execute mutually exclusive actions e.g., turn left/right when placed between two given visual markers. In some applications wherein the sensory context may be comprised solely of visual input (e.g., marker location, size, color, and/or other feature), existing training approaches may prove inadequate for selecting target (correct) action due to, e.g., lack of information as to whether the target action corresponds to a left or right turn. In some implementations, the action selection (e.g., right/left turn) may be configured based on a prior action.

In some implementations, action selection may be effectuated using a persistent (also referred to as stateful) switcher methodology disclosed herein. Stateful switcher methodology may be utilized with a robotic control process configured to execute a plurality of behaviors. In some implementations, e.g., such as described in U.S. patent application Ser. No. 14/694,901 entitled "APPARATUS AND METHOD FOR HIERARCHICAL TRAINING OF ROBOTS", filed Apr. 23, 2015, the foregoing being incorporated herein by reference in its entirety, the behaviors may be configured into a hierarchy comprising a plurality of levels. Individual behaviors may correspond to execution of a respective component of the control process. The output of a given component (associated with a given behavior) of the control process may be provided as an activation indication to one or more components of a lower level within the hierarchy, e.g., such as described below with respect to FIGS. 10A-11B. As used herein the term behavior may be used to describe an action The switching mechanism of the disclosure may be trained to learn an association between a given sensory context and a corresponding change in behavior (e.g., control output).

Figure 2:
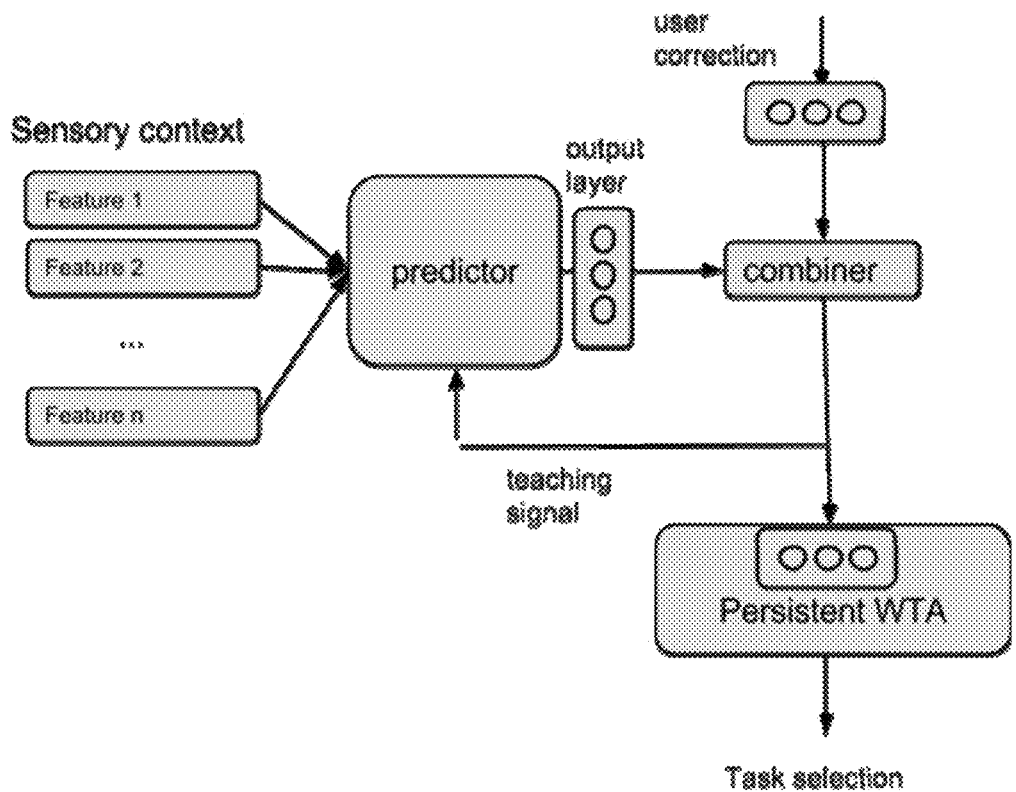
FIG. 2 is functional block diagram illustrating persistent switching apparatus, according to one or more implementations.

FIG. 2 illustrates persistent switching apparatus, according to one or more implementations.

By way of an illustration of implementing a fetch behavior, a robotic device may be configured to execute a task (e.g., approach a target). Task execution may comprise performing one or more actions (e.g., activate right wheel, activate left wheel, and/or other actions) also referred to as elementary behaviors. A human operator and/or a computerized entity may configure a hierarchy of behaviors (e.g., illustrated in FIGS. 10C-11B) for a given task comprising one or more elementary behaviors for a given task (e.g., partition the task). One or more behavioral predictors (e.g., 912, 914, 916 in FIG. 9) may be trained to produce an output for the respective behavior (e.g., activate left/right wheels to approach a target and implement target approach behavior 912) based on sensory input. An operator (e.g., a human, and/or a computerized entity) may train a switching component (e.g., 902) to switch between behaviors based on the sensory context.

FIG. 2 illustrates a control apparatus comprising a stateful switcher, configured in accordance with one or more implementations. The apparatus 200 may comprise a sensory context determination component 202 comprising one or more feature extractors 204, 206, 208. Individual feature extractors 204, 206, 208 may be configured to detect one or more features (e.g., target object, obstacles) in sensory input. The sensory input may comprise information provided by, e.g., a camera, a RADAR, LiDAR, structured light sensor, motion sensor, and/or input from other sensors. In some implementations, the sensor input may comprise input 1002 described below with respect to FIG. 10A. Feature extraction components 204, 206, 208 may be operated in accordance with a variety of approaches, e.g., such as described below with respect to component 1006, 1004, 1008, as described in e.g., U.S. patent application Ser. No. 14/694, 901 entitled "APPARATUS AND METHOD FOR HIERARCHICAL TRAINING OF ROBOTS", filed Apr. 23, 2015, Ser. No. 14/285,466 entitled "APPARATUS AND METHODS FOR ROBOTIC OPERATION USING VIDEO IMAGERY", filed May 22, 2014, Ser. No. 14/285,414 entitled "APPARATUS AND METHODS FOR DISTANCE ESTIMATION USING MULTIPLE IMAGE SENSORS", filed May 22, 2014, Ser. No. 14/321,736 entitled "OPTICAL DETECTION APPARATUS AND METHODS", filed Jul. 1, 2014, Ser. No. 14/542,391 entitled "FEATURE DETECTION APPARATUS AND METHODS FOR TRAINING OF ROBOTIC NAVIGATION", filed Nov. 14, 2014, Ser. No. 14/637,138 entitled "SALIENT FEATURES TRACKING APPARATUS AND METHODS USING VISUAL INITIALIZATION" filed Mar. 3, 2015, Ser. No. 14/637,164 entitled "APPARATUS AND METHODS FOR TRACKING SALIENT FEATURES", filed Mar. 3, 2015, Ser. No. 14/637,191 entitled "APPARATUS AND METHODS FOR SALIENCY DETECTION BASED ON COLOR OCCURRENCE ANALYSIS", filed Mar. 3, 2015, each of the foregoing being incorporated herein by reference in its entirety. In some implementations, the sensor input (context) may comprise information related to an internal state of the robot, robot state history, action history, and/or other information associated with sensory data and/or control signals (e.g., "corrections") from the user and/or other control device.

The component 202 may provide context output 210 to a predictor component 214. The component 214 may be trained to provide output 218 configured to enable execution of one or more actions (behaviors) associated with a given task. By way of an illustration of a fetch task such as described below with respect to FIG. 9, the output 218 of predictor 214 may correspond to one of: target approach behavior, grasp target behavior, or return to base behavior.

In some implementations, the output 218 of the predictor 214 may comprise a vector of real values. Individual components of the vector output 218 correspond to a probability, a weight, a priority value associated with a given action. By way of an illustration, the output 218 may comprise a vector v={0.7, 0.1, 0.2} indicating that target approach action (e.g., behavior 912 in FIG. 9) may be assigned a weight/probability of 0.7, target grasp behavior (e.g., 914 in FIG. 9) may be assigned a weight/probability of 0.1, and base approach behavior (e.g., 916 in FIG. 9) may be assigned a weight/probability of 0.2. In the above exemplary implementation the output 218 v={0.7, 0.1, 0.2} may be configured to fall within a range of values between 0 and 1, with the sum of all components being equal to one. In some implementations, the output 218 may be normalized and/or scaled to another range of values, e.g., between 0 and 100, between −1 and 1. In some implementations, the output 218 may be configured such that the cumulative value of the component may be other than one, e.g., 2. The predictor may be trained to produce the output 218 corresponding to one or more behaviors (actions). The training may be configured based on training input 224. In some implementation where in the predictor output 218 may comprise a plurality of components 216, the training input 224 may be provided via an input layer 222 comprised of a plurality of the components. By way of an illustration of training behavior selection shown and described with respect to FIG. 9, based on detecting an occurrence of a target (e.g., 174 in FIG. 1) proximate to the robotic device 160, the predictor 214 may be trained to produce output 218 consistent with the target approach behavior (e.g., activate wheels to move forward). The training input in such implementations may comprise a vector of values vt={1,0,0} wherein the first component (with value of 1) may denote weight associated with the target approach behavior, the second and the third components (with values of zero) may correspond to target grasp behavior and return to base behavior, respectively. Initially (e.g., during the first 1-5 trials) the predicted output 218 may comprise values (e.g., {0.3, 0.35, 0.35}) that may not be adequate to cause execution of the target behavior (e.g., the target approach). In some implementations, the output 218 may comprise non-negative component values that may add up to 1 (e.g., via a soft-max layer).

The predicted output 218 may be combined with the training input 224 by combiner component 220. Various combiner implementation may be employed e.g., additive, override, and/or combiner approaches described with respect to FIGS. 4A-4B, FIG. 12A-13, Eqn. 7-15 and/or Eqn. 17-19. The combined output 226 may be provided to the predictor 214 learning process as shown in FIG. 2.

The trainer may train the learning process of the predictor 214 by providing an indication as to which task is to be performed in a given context. In some implementations of an overriding combiner 220, the training input 224 may comprise a vector with a number of elements matching the number of tasks/behaviors being trained. The input 224 may comprise values of "0" for all elements except "1" for the element corresponding to the task to be associated with the given context.

The combined output 226 may be analyzed by an output component 230. In some implementations, the component 230 may comprise a persistent winner takes all (PWTA) process configured to determine task selection output 234 based on the combined output 226. When processing multi-channel output 226 (e.g., a multi-component vector), the winner takes all process of the component 230 may be configured to "filter-out" all but one components of the input 226. Accordingly, the component 230 output 234 may comprise one non-trivial component value. By way of an illustration, if the component 230 receives input 226 consisting of vin={0.7, 0.2, 0.1}, the output 234 may be configured as follows:

$$vout=\{1,0,0\}. \quad (Eqn.\ 1)$$

In some implementations, the single nontrivial value in the output 234 may select the maximum allowable output value (e.g., 1, 100, or another value indicating that the corresponding action is being selected); the remaining component values may be selected to a base (trivial) value, e.g., 0, −1, NaN, 0.5 or another value indicative of the respective action(s) not being selected (inactive). The persistent aspect of the PWTA process of the component 230 may comprise a threshold operation.

Values of individual components of the input 226 into the component 230 (e.g., components of the input {0.7, 0.2, 0.1} may be compared to an activation threshold value. If the value of a given input component breaches the activation threshold, the respective output component may be assigned an active value (e.g., 1 in Eqn. 2). If the value of a given input component does not breach the activation threshold, then the respective output component may be assigned an inactive value (e.g., 0 in Eqn. 2). In the example shown by Eqn. 2, the first component is assigned active value. In some implementations, wherein e.g., the input 226 into the PWTA component 230 may comprise values of {0.3, 0.35, 0.35} and the activation threshold may be selected equal 0.67, the PWTA output may comprise an inactive vector {0,0,0}. Various implementations of the PWTA process may be utilized. In one or more implementations, the input 226 may be processed by a max( ) operation wherein a maximum component value may be selected from the input. In some implementations wherein two or more values may be selected as output of the max( ) operation, one of the selected values may be provided to the threshold operation. The output of the max( ) operation may be processed by a threshold operation (e.g., compared to the activation threshold). If the output of the max( ) operation breaches the threshold, the respective component of the output 234 may be configured as active. If the output of the max( ) operation does not breach the activation threshold, the respective component of the output 234 may be configured as inactive. Components of the output 234 corresponding to values within the input 226 that may be filtered out by the max( ) operation (e.g., values smaller than the maximum) may be configured as inactive. In some implementations, the order of the threshold and the selection (e.g., max( )) operations may be reversed wherein the threshold operation may be performed on the input 226 into the component 230 and the output of the threshold operation may be analyzed using a filter operation (e.g., max( )).

In some applications, for a given context the trainer may indicate to the predictor that the presently executed task may remain active (e.g., continue to be executed). By way of an illustration of a security and/or surveillance application, a robotic camera may be configured to pan from left to right to left while surveying a given area of interest. Execution of such task may be effectuated by the controller 200 configured to implement two behaviors: TURN LEFT and TURN RIGHT. The corresponding control output 218 of the predictor 214 may comprise vector (1,0) and (0,1), respectively. The apparatus 200 may be trained to produce an alarm based on detecting an intruder, and/or other suspicious activity. The predictor may be trained to ignore other features that may have occurred in sensory input. The training of "indifference" action may be configured based on a training input 224 comprising vector (0.5, 0.5).

In some implementations comprising an override combiner 220, such an indication may be effectuated by providing the training input 224, comprising a vector, with uniform component values that may be configured to not breach the activation threshold of the PWTA process. If all the predictor outputs do not breach the threshold in a given context, the PWTA output 234 may be configured to activate a previously active task.

In some implementations where sensory input into the feature detection component 202 may comprise video camera input comprised of a plurality of digital frames, the output 234 of the apparatus 200 may be updated on a frame by frame time scale. By way of an illustration, when operating a robotic device (e.g., 160 in FIG. 1) camera input (e.g., digital frames refreshed at 25 times per second) may be analyzed to determine sensory context. The state of the components 214, 220, 230 may be updated in accordance with the context 210 and the training input 224. In some implementations, the training input may be updated on a time scale and/or time base that may differ (e.g., longer) from the sensor input time scale/base.

In some implementations of multi-task selection control process, the persistent WTA process may be operated in accordance with one or more of the following rules:
- for a given sensor frame, if the maximum value of the input vector 226 components is above an activation threshold, then the corresponding task may be enabled (e.g., the output 234 may comprise an active indication corresponding to the task associates with the component with the maximum value); and
- if the maximum value of the input vector 226 components is below the activation threshold, then the task presently being executed (e.g., based on an activation value from a prior sensor frame activation output value) may remain active;

The activation threshold may be tuned in order to tune switching sensitivity of the apparatus 200. By way of an illustration, a greater value of the activation threshold may correspond to stronger sensory evidence in order to cause switching from the current task to a new task; lower value of the activation threshold may correspond to a weaker sensory evidence being incapable of switching the activation output to a new task.

In some implementations the predictor 214 may be configured to provide output for individual possible pairs of actions that may be selected (e.g., example, there may exist $m^2$ outputs for m available actions/behaviors). This may be useful when a given context needs to be associated to different actions depending on the action currently being performed. By way of an illustration, for a given sensory input 210 at time t2, if the robot is executing task A (e.g., based on the prior combiner output 226 at time t1<t2) the new combined output may correspond to task B (switch from task A to task B). For the same sensory input at time t2 if the robot is executing task C the new combined output may correspond to task D (switch from task C to task D). During training, the combined output 226 may comprise predicted output 218 and training input 224. During autonomous operation of the apparatus 200, the combined output 226 may be configured solely on the predicted output 218. In some implementations, such predictor configuration may be referred to as stateful predictor.

In some implementations of fetch task performed by a robotic device (e.g., 160 of FIG. 1) the action-dependent switching mechanism may be effectuated as follows:
- if the current output may correspond to a movement towards the center and the current context is x, then the new output may be switched to L (move left);
- if the current output may correspond to a movement towards the right and the current context is x, then the new output may be switched to C (move to center);

The above methodology may enable a control apparatus to effectuate, e.g., a surveillance task wherein a motorized camera may be configured to pan left to right to left in order to survey an area of interest and/or detect intruders, and/or potential hazards.

The training input may be adapted by the layer 222 before entering the combiner 220 depending on the type of the combiner process and the predictor process. For example, if the combiner is operating an overriding process and the predictor comprises a neural network with softmax output, the training 224 may comprise vector of the following values [0.9, 0.05, 0.05]. In some implementations, the softmax operation may comprise for a given output component, determining an exponential value of the respective input component and scaling the obtained value by the sum of exponentials of the components in the input. Such input configuration may be configured to reduce/avoid driving the predictor network into saturation.

In some implementations, the combiner 220 may be operable in accordance with an override combiner process. Responsive to receipt of a non-trivial (e.g., positive or nonzero) training input 224, the combiner may produce the output 226 corresponding to the training input. For example, training input 224 of {0.95, 0, 0.05} may produce the output 226 of {0.95,0,0.05} regardless of the predicted output. Responsive to receipt of a trivial (e.g., negative or zero) training input 224, the combiner may produce the output 226 corresponding to the predicted output 218. For example, training input 224 of vt={0, 0, 0} and predicted input vp={0.9, 0.1, 0} may cause the combiner 220 to produce the output 226 comprising vector vo={0.9,0.1,0}.

In some implementations, wherein the user may be enabled to observe current state of the predictor 214 output 218 of before the output 218 enters the combiner 220, an additive combiner process may be utilized.

Apparatus and methods for using cost of user feedback during training of robots are disclosed herein, in accordance with one or more implementations. According to exemplary implementations, a user may want to know about robot's performance without actually letting robot to perform the task autonomously. This may wholly or partially alleviate one or more disadvantages discussed above.

One starting point to solve this task may be to measure a current cost function C of a predictor while its learning to do a task:

$$C(t)=d(y_d(t),y(t)) \qquad \text{(Eqn. 2)}$$

where C(t) represents current cost function at time t, y(t) represents output of the predictor (e.g., the component 422 of FIG. 4A), $y_d(t)$ represents desired output of the predictor (signal from the teacher), d represents distance function between desired and actual output (e.g. mean square error, Euclidean distance, and/or cross entropy).

The value of C(t) may be provided or shown to the user as a number and/or in any other graphical form (e.g., progress bar, intensity of the LED, and/or other techniques for conveying a quantity). Based on this number, the user may try to determine whether his corrections and predictions of the system are close or not, which may indicate how well or not the robot learned the task.

When a user shows the robot how to perform the task, he may do it in different ways on different occasions. For example, a user may teach the robot one or more possible obstacle avoidance trajectories which are close to each other. The system may generalize those examples and choose a single trajectory. In some implementations, if the user gives a new example of trajectory and measures costs according to Eqn. (1), the system may provide a large value indicating a mistake, even if on average the robot performs obstacle avoidance very well.

A possible solution may be to time-average (e.g., compute running average or sliding average) the costs so that all occasional prediction errors are not presented to the user. The user may receive a number that represents how many mistakes a predictor did on average for a given time interval (e.g., 1 second, 5 minutes, and/or other time interval).

The numeric values of costs may depend on one or more factors including one or more of the task, the predictor, the robot, the distance function in Eqn. (1), and/or other factors. For example, if a robot is trained to follow a trajectory with a constant linear velocity, then the costs may include costs of predicting angular velocity (e.g., costs on linear velocity may be small because it may be easy to predict a constant value). However, if a task is obstacle avoidance with backing up from obstacles, then predicting of linear velocity may contribute the costs. Different predictors may achieve different costs on different tasks. If a robot is trained with eight degrees of freedom, a range of costs may be different than costs during training navigation with two degrees of freedom (e.g., a (v, w) control space). Mean square error distance function used in Eqn. (1) may provide costs in different ranges comparing to cross entropy distance function.

In some implementations, in order to present costs to the user, it may be useful to normalize them to interval (0, 1) by the maximum achievable costs in this task (or by some fixed number if maximum costs are infinite like in cross entropy case). Normalizing may provide more independence of the cost value to the distance function and robot Normalized costs may depend on the task and on the predictor. However, numbers from (0, 1) may be readily represented to the user and compared against each other.

Figure 8:
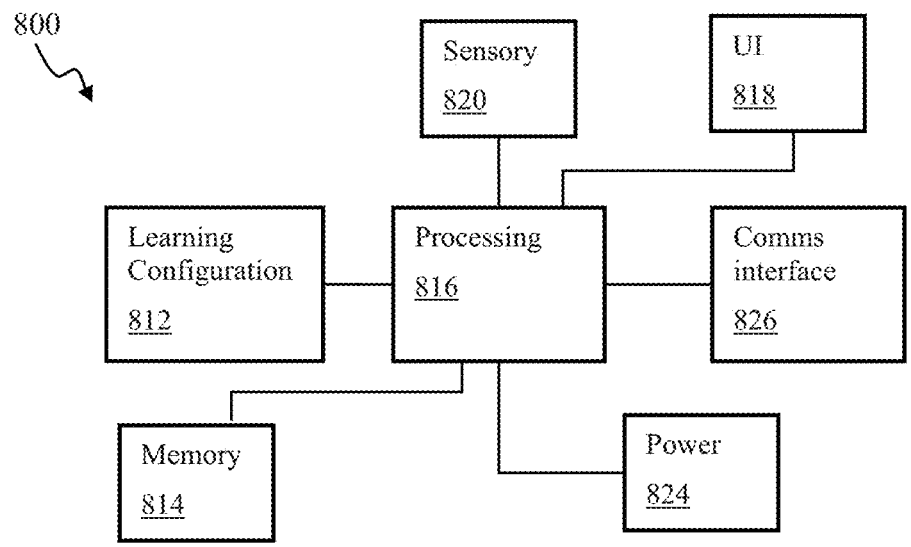
FIG. 8 is a functional block diagram depicting the salient feature detection apparatus of, e.g., FIG. 7, according to one or more implementations.

Some tasks may differ from others in complexity and/or in statistical properties of a teacher signal. For example, compare a task A: navigating through a "right angle" path which consists of a straight line and then sudden turn and then straight line again and a task B: navigating a FIG. 8 path. In task A, costs may be really small even if a prediction procedure always tells robot to drive straight without turning because costs of not turning are too small comparing to costs of not driving straight. A FIG. 8 path is more complex compared to the right angle path because the robot has to turn left and right depending on the context. If a value of costs is provided to the user in the cases of the right angle path and the FIG. 8, the same values of the costs may mean totally different performances on the actual task (small costs on "right angle" may not mean a good performance, while small costs on FIG. 8 path may mean that the robot performs well).

To decrease sensitivity to the variations in the complexity and other properties of the task, a relative may be introduced to "blind" performance measure $p_b$. A "blind" predictor may be used that does not take into account input of the robot and only predicts average values of control signal. It may compute a running (or sliding) average of control signal. In some implementations, a "blind" performance measure $p_b$ may be expressed as:

$$p_b(t)=1-C(t)/C_b(t) \quad \text{(Eqn. 3)}$$

where C(t) represents costs computed using Eqn. (1) for a main predictor, $C_b(t)$ represents costs computed using Eqn. (1) for a "blind" predictor. In some implementations, if $p_b(t)$ is close to 1, then the prediction process may perform better than a baseline cost of the "blind" predictor. If Pb(t) is negative, then the main predictor may perform worse than a baseline.

In the example of training a "right angle" path, a blind predictor may provide low costs and be able to better perform the task the main predictor has to perform (which in this case means to perform also a turn and not only go straight). For a FIG. 8 path, a blind predictor may provide a high cost because it is not possible to predict when to switch between left and right turns without input, so relative performance of the main predictor may be large even for relatively high costs values.

A problem of presenting the costs to the user may be that costs may change in time in highly non-linear fashion:

The user may prefer presentation of costs as decreasing in a linear fashion (e.g., a feedback number slowly decreases from 0 to 1 during the training). Otherwise a user may see a huge progress during sudden decrease of the costs function and then there will be almost no progress at all.

The general shape of the costs curve may be universal (or nearly so) among tasks and predictors. A reference predictor may be selected, which is trained in parallel to the main predictor (i.e., the predictor that the robot actually uses to perform actions). A relative performance number may be expressed as:

$$p_r(t)=1-C(t)/C_r(t) \quad \text{(Eqn. 4)}$$

where C(t represents costs computed using Eqn. (1) for a main predictor, $C_r(t)$ represents costs computed using Eqn. (1) for a reference predictor. If $p_r(t)$ is close to 1, then the main predictor may perform better than the reference predictor. If $p_r(t)$ is negative, then the main predictor may perform worse than the reference.

Figure 3A:
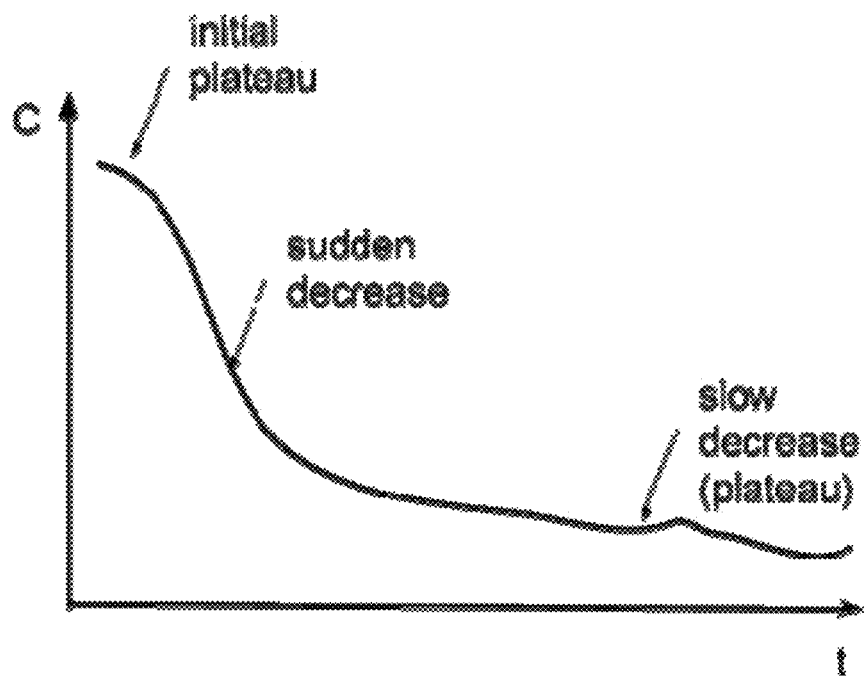
FIG. 3A is a plot illustrating nonlinear dependence of absolute cost as a function of time during training, according to one or more implementations.
Figure 3B:
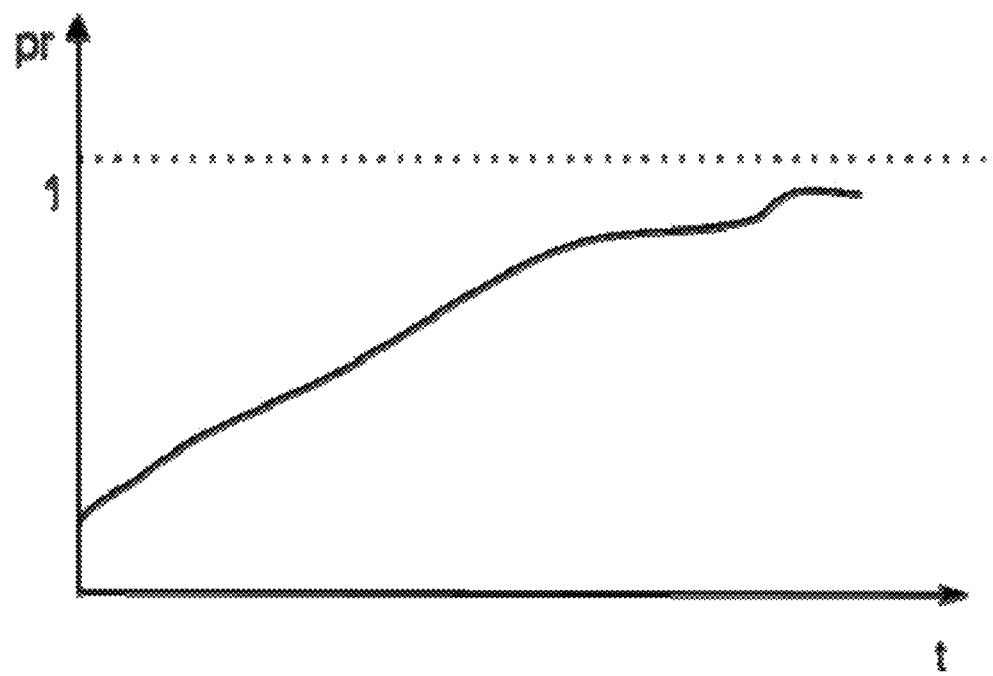
FIG. 3B is a plot illustrating relative cost as a function of time during training, according to one or more implementations.

A reference predictor may be selected such that it generally behaves worse than a main predictor but still follows the dynamics of costs of the main predictor (e.g., curves on FIG. 1 should be close for reference and for the main predictor). In some implementations, a single layer perceptron with sigmoidal outputs and mean square error distance function may be included in a good reference predictor. Linearity of a single layer may be included in some predictor process, and may be sufficient to achieve some performance on range of the tasks such as navigation, manipulation, fetch, and/or other tasks where it exhibits behavior of costs depicted in FIG. 3A. An example of relative performance with this reference predictor is shown on FIG. 3B.

If there is noise in the teacher signal, noise in the environment, and/or the robot has changed, costs may increase because the main predictor has not yet adapted accordingly. However, if relative costs are used, this effect of noise (or robot change) may be diminished because costs of reference predictor may also increase, but relative performance may not change significantly.

Different predictors may perform differently with different tasks. Sometimes a user may try different predictors on the same task to determine which predictor is better for that task. Sometimes a user may train a robot to do different tasks using the same predictor. To disentangle variations in the predictors from variations in the tasks, a relative performance number may be introduced that is independent of the main predictor $p_{rb}$:

$$p_{rb}(t)=1-C_r(t)/C_b(t) \quad \text{(Eqn. 5)}$$

where $C_b(t$ represents costs computed using Eqn. (1) for a "blind" predictor, $C_r(t)$ represents costs computed using Eqn. (1) for a reference predictor.

The main predictor $p_{rb}$ may not depend on the main predictor the user chose to perform a task. If the reference predictor is fixed, $p_{rb}$ may be used to characterize the task complexity. Consider a case when reference predictor is a linear perceptron. If $p_{rb}$ is close to 1, then the task may be non-trivial so that the blind predictor cannot learn it, but simple enough for the linear predictor to learn it. If $p_{rb}$ is close to zero, then either task may be too complex for the linear predictor to learn or it is trivial so that blind predictor achieves a good performance on it.

In some situations, it may be important to show to the user that something in the training process went wrong (e.g., changes in the environment such as lighting conditions and/or other environmental conditions, the user changing a training protocol without realizing it, and/or other ways in which the training process can be compromised). To achieve that, changes may be detected in the flow of relative performance values ($p_{rb}(t)$, $p_r(t)$, $p_b(t)$) using step detection algorithms. For example, a sliding average of p(t) may be determined and subtracted from the current value, and then normalized using either division by some max value or by passing into sigmoid function. The value may be presented to the user. An average of steps for different performance values may be determined and presented to the user. If the value is large, then something may have gone wrong, according to some implementations. For example, with $p_{rb}(t)$, if the environment changed but task is the same, then performance of the "blind" predictor may stay the same because it may be unaffected by task changes, but performance of reference predictor may drop.

In the case of using several reference predictors [p0 . . . pn] that are trained in parallel to the main one, performance numbers may be determined from any pair of them:

$$p_{ij}(t)=1-C_i(t)/C_j(t) \quad \text{(Eqn. 6)}$$

where $C_i(t)$ represents costs computed using Eqn. (1) for a i-th reference predictor, $C_j(t)$ represents costs computed using Eqn. (1) for a j-th reference predictor.

Depending on the properties of those reference predictors, performance numbers may characterize task, main predictor, and/or the whole training process differently. For example, [p0 . . . pn] may include a sequence of predictors so that a subsequent predictor is more "powerful" than a previous one (e.g., "blind", linear, quadratic, . . . , look up table). The set of performance numbers may characterize how difficult is the task (e.g., only look up table predictor gets a good score vs. a task where linear predictor is already doing fine).

Reference predictors [p0 . . . pn] may include a sequence of predictors similar to the main predictor but with different parameters (e.g. learning coefficient). Performance numbers may be indicative of how noisy is the teacher signals and/or environment. In some implementations, if there a lot of noise, only predictors with a small learning coefficient may be able to learn the task. If training signals and features are clean (i.e., low or no noise), then a predictor with high learning coefficient may be able to learn the task.

A matrix of reference numbers $p_{ij}(t)$ for a given set of predictors [p0 . . . pn] for different tasks may be provided into a clustering algorithm, which may uncover clusters of similar tasks. After that during training a new task, this clustering algorithm may provide to the user a feedback that the current task is similar in properties to the task already seen (e.g., so that the user can make a decision on which training policy to pick).

Predictor apparatus and methods are disclosed herein, in accordance with one or more implementations. FIG. 4A illustrates an implementation of adaptive control system 400. The adaptive control system 400 of FIG. 4A may comprise a corrector 412, an adaptive predictor 422, and a combiner 414 cooperating to control a robotic platform 430. The learning process of the adaptive predictor 422 may comprise a supervised learning process, a reinforcement learning process, and/or a combination thereof. The corrector 412, the predictor 422 and the combiner 414 may cooperate to produce a control signal 420 for the robotic platform 410. In one or more implementations, the control signal 420 may comprise one or more motor commands (e.g., pan camera to the right, turn right wheel forward), sensor acquisition commands (e.g., use high resolution camera mode), and/or other commands.

In some implementations, the predictor 422 and the combiner 414 components may be configured to operate a plurality of robotic platforms. The control signal 420 may be adapted by a decoder component 424 in accordance with a specific implementation of a given platform 430. In one or more implementations of robotic vehicle control, the adaptation by the decoder 424 may comprise translating binary signal representation 420 into one or more formats (e.g., pulse code modulation) that may be utilized by given robotic vehicle. U.S. patent application Ser. No. 14/244,890 entitled "APPARATUS AND METHODS FOR REMOTELY CONTROLLING ROBOTIC DEVICES", filed Apr. 3, 2014 describes some implementations of control signal conversion.

In some implementations of the decoder 424 corresponding to the analog control and/or analog corrector 412 implementations, the decoder may be further configured to rescale the drive and/or steering signals to a range appropriate for the motors and/or actuators of the platform 430.

In some implementations of the discrete state space control implementation of the corrector 412, the decoder 424 may be configured to convert an integer control index into a corresponding steering/drive command using, e.g. a look up table approach described in detail in, e.g., U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014, the foregoing being incorporated herein by reference in its entirety.

The corrector 412 may receive a control input 428 from a control entity. The control input 428 may be determined based on one or more of (i) sensory input 402 and (ii) feedback from the platform (not shown). In some implementations, the feedback may comprise proprioceptive signals, such as feedback from servo motors, joint position sensors, and/or torque resistance. In some implementations, the sensory input 402 may correspond to the sensory input, described, e.g., with respect to FIG. 1, supra. In one or more implementations, the control entity providing the input 428 to the corrector may comprise a human trainer, communicating with the robot via a remote controller (wired and/or wireless). In some implementations, the control entity may comprise a computerized agent such as a multifunction adaptive controller operable using reinforcement and/or unsupervised learning and capable of training other robotic devices for one and/or multiple tasks. In one such implementation, the control entity and the corrector 412 may comprise a single computerized apparatus.

The corrector 412 may be operable to generate control signal 408 using a plurality of approaches. In some implementations of analog control for robotic vehicle navigation, the corrector output 408 may comprise target vehicle velocity and target vehicle steering angle. Such implementations may comprise an "override" functionality configured to cause the robotic platform 430 to execute action in accordance with the user-provided control signal instead of the predicted control signal.

In one or more implementations of analog correction provision for robotic vehicle navigation, the control signal 408 may comprise a correction to the target trajectory. The signals 408 may comprise a target "correction" to the current velocity and/or steering angle of the platform 430. In one such implementation, when the corrector output 408 comprises a zero signal (or substantially a null value), the platform 430 may continue its operation unaffected.

In some implementations of state space for vehicle navigation, the actions of the platform 430 may be encoded using, e.g., a 1-of-10 integer signal, where eight (8) states indicate 8 possible directions of motion (e.g., forward-left, forward, forward-right, left, right, back-left, back, back-right), one state indicates "stay-still", and one state indicates "neutral". The neutral state may comprise a default state. When the corrector outputs a neutral state, the predictor may control the robot directly. It will be appreciated by those skilled in the arts that various other encoding approaches may be utilized in accordance with controlled configuration of the platform (e.g., controllable degrees of freedom).

In some implementations of control for a vehicle navigation, the action space of the platform 430 may be represented as a 9-element state vector, e.g., as described in, e.g., the above referenced U.S. patent application Ser. No. 14/265, 113. Individual elements of the state vector may indicate the probability of the platform being subjected to (i.e., controlled within) a given control state. In one such implementation, output 418 of the predictor 422 may be multiplied with the output 408 of the corrector 412 in order to determine probability of a given control state.

The adaptive predictor 422 may be configured to generate predicted control signal $u^P$ 418 based on one or more of (i) the sensory input 402 and the platform feedback (not shown). The predictor 422 may be configured to adapt its internal parameters, e.g., according to a supervised learning rule, and/or other machine learning rules.

Predictor realizations comprising platform feedback, may be employed in applications such as, for example, where: (i) the control action may comprise a sequence of purposefully timed commands (e.g., associated with approaching a stationary target (e.g., a cup) by a robotic manipulator arm), or where (ii) the platform may be characterized by platform state parameters (e.g., arm inertia, and/or motor response time) that change faster than the rate of action updates. Parameters of a subsequent command within the sequence may depend on the control plant state; a "control plant" refers to the logical combination of the process being controlled and the actuator (often expressed mathematically). For example, control plant feedback might be the exact location and/or position of the arm joints which can be provided to the predictor.

In some implementations, the robotic platform may comprise a manipulator arm comprising one or more segments (limbs) and a motorized joint, e.g., as shown and described in U.S. patent application Ser. No. 13/907,734 entitled "ADAPTIVE ROBOTIC INTERFACE APPARATUS AND METHODS", filed May 31, 2013. As described in the above referenced application '734, the joint may be utilized to modify an angle of the manipulator segment and/or an angle between two segments.

In some implementations, the predictor 422 may comprise a convolutional network configured to predict the output 420 of the combiner 414 given the input 402. The convolutional network may be combined with other components that learn to predict the corrector signal given other elements of the sensory context. When the corrector 412 output comprises a zero signal (or null value), the combiner output 420 may equal the predictor output 418. When the corrector provides a non-zero signal, a discrepancy may occur between the prediction 418 and the output 420 of the combiner 414. The discrepancy may be utilized by the predictor 422 in order to adjust parameters of the learning process in order to minimize future discrepancies during subsequent iterations.

The sensory input and/or the plant feedback may collectively be referred to as sensory context. The sensory context may be utilized by the predictor 422 to produce the predicted output 418. By way of a non-limiting illustration, one exemplary scenario of obstacle avoidance by an autonomous rover uses an image of an obstacle (e.g., wall representation in the sensory input 402) combined with rover motion (e.g., speed and/or direction) to generate Context_A. When the Context_A is encountered, the control output 420 may comprise one or more commands configured to avoid a collision between the rover and the obstacle. Based on one or more prior encounters of the Context_A—avoidance control output, the predictor may build an association between these events as described in detail below.

The combiner 414 may implement a transfer function h(x) where x includes the control signal 408 and the predicted control signal 418. In some implementations, the combiner 414 operation may be expressed, e.g., as described in detail in co-owned U.S. patent application Ser. No. 13/842,530 entitled "ADAPTIVE PREDICTOR APPARATUS AND METHODS", filed Mar. 15, 2013, as follows:

$$\hat{u}=h(u,u^P). \tag{Eqn. 7}$$

Various realizations of the transfer function of Eqn. 7 may be utilized. In some implementations, the transfer function may comprise one or more of: addition, multiplication, union, a logical 'AND' operation, a logical 'OR' operation, and/or other operations.

In one or more implementations, the transfer function may comprise a convolution operation, e.g., a dot product. In spiking network realizations of the combiner function, the convolution operation may be supplemented by use of a finite support kernel (i.e., a mapping function for linear space to a non-linear space) such as Gaussian, rectangular, exponential, etc. In one embodiment, a finite support kernel may implement a low pass filtering operation of input spike train(s). In some implementations, the transfer function h may be characterized by a commutative property. (Eqn. 8)

In one or more implementations, the transfer function of the combiner 414 may be configured as follows:

$$h(0,u^P)=u^P. \tag{Eqn. 9}$$

In some implementations, the transfer function h may be configured as:

$$h(u,0)=u. \tag{Eqn. 10}$$

In some implementations, the transfer function h may be configured as a combination of realizations of Eqn. 9-Eqn. 10 as:

$$h(0,u^P)=u^P, \text{ and } h(u,0)=u, \tag{Eqn. 11}$$

In one exemplary implementation, the transfer function satisfying Eqn. 11 may be expressed as:

$$h(u, u^P) = (1-u) \times (1-u^P) - 1. \quad \text{(Eqn. 12)}$$

In one such realization, the combiner transfer function is configured according to Eqn. 9-Eqn. 12, to implement additive feedback. In other words, output of the predictor (e.g., 418) may be additively combined with the control signal (408) and the combined signal 420 may be used as the teaching input (404) for the predictor. In some implementations, the combined signal 420 may be utilized as an input (context) into the predictor 422, e.g., as described in co-owned U.S. patent application Ser. No. 13/842,530 entitled "ADAPTIVE PREDICTOR APPARATUS AND METHODS", filed Mar. 15, 2013, incorporated supra.

In some implementations, the combiner transfer function may be characterized by a delay expressed as:

$$\hat{u}(t_{i+1}) = h(u(t_i), u^P(t_i)), \quad \text{(Eqn. 13)}$$

where $\hat{u}(t_{i+1})$ denotes combined output (e.g., 420 in FIG. 4A) at time t+Δt.

As used herein, symbol $t_i$ may be used to refer to a time instance associated with individual controller update events (e.g., as expressed by Eqn. 13), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity Δt may be configured to be between 1 ms and 1000 ms.

In some implementations, the combiner transfer function may be configured to implement override functionality (e.g., override combiner). The "override" combiner may detect a non-zero signal provided by the corrector, and provide a corrector signal as the combined output. When a zero (or no) corrector signal is detected, the predicted signal may be routed by the combiner as the output. In some implementations, the zero corrector signal may be selected as not a value (NaN); the non-zero signal may comprise a signal rather than the NaN.

In one or more implementations of a multi-channel controller, the corrector may simultaneously provide "no" signal on some channels and "a" signal on others, allowing the user to control one degree of freedom (DOF) of the robotic platform while the predictor may control another DOF.

It will be appreciated by those skilled in the art that various other realizations of the transfer function of the combiner 414 may be applicable (e.g., comprising a Heaviside step function, a sigmoid function, such as the hyperbolic tangent, Gauss error function, logistic function, and/or a stochastic operation). Operation of the predictor 422 learning process may be aided by a teaching signal 404. As shown in FIG. 4A, the teaching signal 404 may comprise the output 420 of the combiner 414. In some implementations wherein the combiner transfer function may be characterized by a delay (e.g., Eqn. 13), the teaching signal at time $t_i$ may be configured based on values of u, $u^P$ at a prior time $t_{i-1}$, for example as:

$$u^d(t_i) = h(u(t_{i-1}), u^P(t_{i-1})). \quad \text{(Eqn. 14)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$:

$$u^P(t_{i+1}) = F[x_i, W(u^d(t_i))]. \quad \text{(Eqn. 15)}$$

In Eqn. 15, the function W may refer to a learning process implemented by the predictor, e.g., a perceptron, and/or a look-up table.

In one or more implementations, such as illustrated in FIG. 4A, the sensory input 406, the control signal 408, the predicted output 418, the combined output 420 and/or plant feedback may comprise spiking signals, analog signals, and/or a combination thereof. Analog to spiking and/or spiking to analog signal conversion may be effectuated using, mixed signal spiking neuron networks, such as, for example, described in co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, incorporated supra.

Output 420 of the combiner e.g., 414 in FIG. 4A may be gated. In some implementations, the gating information may be provided to the combiner by the corrector 412 using, e.g., an "override" indication in order to cause the robotic platform 430 to execute actions according to the user-provided control instead of the predicted control signal.

In one such realization of spiking controller output, the control signal 408 may comprise positive spikes indicative of a control command and configured to be combined with the predicted control signal (e.g., 418); the control signal 408 may comprise negative spikes, where the timing of the negative spikes is configured to communicate the control command, and the (negative) amplitude sign is configured to communicate the combination inhibition information to the combiner 414 so as to enable the combiner to 'ignore' the predicted control signal 418 for constructing the combined output 420.

In some implementations of spiking signal output, the combiner 414 may comprise a spiking neuron network; and the control signal 408 may be communicated via two or more connections. One such connection may be configured to communicate spikes indicative of a control command to the combiner neuron; the other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 420 in FIG. 4).

The gating information may be provided to the combiner by another entity (e.g., a human operator controlling the system with a remote control and/or external controller) and/or from another output from the corrector 412 (e.g., an adaptation block, an optimization controller). In one or more implementations, the gating information may comprise one or more of: a command, a memory address of a register storing a flag, a message, an inhibitory efficacy, a value (e.g., a weight of zero to be applied to the predicted control signal by the combiner), and/or other information capable of conveying gating instructions to the combiner.

The gating information may be used by the combiner network to inhibit and/or suppress the transfer function operation. The suppression (or 'veto') may cause the combiner output (e.g., 420) to be comprised solely of the control signal portion 418, e.g., configured in accordance with Eqn. 10. In one or more implementations the gating information may be used to suppress ('veto') provision of the context signal to the predictor without affecting the combiner output 420. In one or more implementations the gating information may be used to suppress ('veto') the feedback from the platform.

In one or more implementations, the gating signal may comprise an inhibitory indication that may be configured to inhibit the output from the combiner. Zero combiner output may, in some realizations, may cause zero teaching signal (e.g., 414 in FIG. 4A) to be provided to the predictor so as to signal to the predictor a discrepancy between the target action (e.g., controller output 408) and the predicted control signal (e.g., output 418).

The gating signal may be used to veto predictor output 418 based on, for example, the predicted control output 418 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

In one or more implementations, the gating/veto functionality may be implemented on a "per-channel" basis in a multi-channel controller wherein some components of the combined control vector may comprise predicted components, while some components may comprise the corrector components.

By way of a non-limiting illustration, if the turn is to be completed and/or aborted (due to, for example, a trajectory change and/or sensory input change), and the predictor output still produces turn instructions to the plant, the gating signal may cause the combiner to veto (ignore) the predictor contribution and pass through the controller contribution.

Predicted control signal 418 and the control input 408 may be of opposite signs. In one or more implementations, a positive predicted control signal (e.g., 418) may exceed the target output that may be appropriate for performance of as task. The control signal 408 may be configured to include negative signaling in order to compensate for over-prediction by the predictor.

Gating and/or sign reversal of controller outputs may be useful, for example, where the predictor output is incompatible with the sensory input (e.g., navigating towards a wrong target). Rapid changes in the environment (compared to the predictor learning time scale caused by e.g., appearance of a new obstacle, target disappearance), may require an "override" capability for the controller (and/or supervisor) to 'override' predictor output. In one or more implementations compensation for over-prediction may be controlled by a graded form of the gating signal.

In some implementations, the predictor learning process may be configured based on one or more look-up tables (LUT). Table 1 and Table 2 illustrate the use of look up tables for learning obstacle avoidance behavior.

Table 1 and Table 2 present exemplary LUT realizations characterizing the relationship between sensory input (e.g., distance to obstacle d) and control signal (e.g., turn angle α relative to current course) obtained by the predictor during training. Columns labeled N in Table 1 and Table 2, present use occurrence N (i.e., how many times a given control action has been selected for a given input, e.g., distance). Responsive to the selection of a given control action (e.g., turn of 15°) based on the sensory input (e.g., distance from an obstacle of 0.7 m), the counter N for that action may be incremented. In some implementations of learning comprising opposing control actions (e.g., right and left turns shown by rows 3-4 in Table 2), responsive to the selection of one action (e.g., turn of +15°) during learning, the counter N for that action may be incremented while the counter for the opposing action may be decremented.

As seen from the example shown in Table 1, the controller may produce a turn command as a function of the distance to obstacle falling to a given level (e.g., 0.7 m). As shown, a 15° turn is most frequently selected during the training for sequence. In some implementations, the predictor may be configured to store the LUT (e.g., Table 1) data for use during subsequent operation. During operation, the most frequently used response (e.g., turn of 15°) may be output for a given sensory input. In some implementations, the predictor may output an average of stored responses (e.g., an average of rows 3-5 in Table 1).

TABLE 1

| d | α° | N |
|---|---|---|
| 0.9 | 0 | 10 |
| 0.8 | 0 | 10 |
| 0.7 | 15 | 12 |
| 0.7 | 10 | 4 |
| 0.7 | 5 | 1 |
| ... | | |
| 0.5 | 45 | 3 |

TABLE 2

| d | α° | N |
|---|---|---|
| 0.9 | 0 | 10 |
| 0.8 | 0 | 10 |
| 0.7 | 15 | 12 |
| 0.7 | −15 | 4 |
| ... | | |
| 0.5 | 45 | 3 |

In some implementations, the predictor 422 learning process may be configured to detect targets and/or obstacles based on sensory input (e.g., 402 in FIG. 2). In some implementations, the detection may be configured based on an operation of a multi-layer perceptron and/or a convolutional network.

Training apparatus and methods are disclosed herein, in accordance with one or more implementations. Exemplary implementations may facilitate identifying multiple solutions (also referred to herein as teaching mode) that have a value when training a robot. Depending on one or more of the type of robot, the task, the state of training, and/or other information, the teacher may switch from one teaching mode to another one to teach a behavior in the most effective manner.

In some implementations, the control signal may include a combination of a correction signal and a prediction signal. The correction signal may be given by a teacher (e.g., a human user controlling the robot and/or an algorithm mastering the task). The prediction signal may be learned while performing the task by a module called Predictor. The combination of the two signals may be performed by the combiner (e.g., ModeCombiner in the diagram below).

FIG. 4B illustrates an adaptive controller apparatus comprising a mode combiner for use with, e.g., the robotic apparatus of FIG. 1, according to one or more implementations.

There may be multiple behaviors the robot can perform when the teacher sends a correction signal. Examples of those behaviors may include one or more of:

Execute the correction and learn the association between the context and the correction;

Execute the correction but do not learn the association;
Integrate both the correction and the prediction (e.g., by adding them) and execute the resulting command;
Ignore the correction and execute the prediction; and/or
Other behaviors.

There may be one or more ways the robot can behave when the teacher is not sending any correction. Examples of those behaviors may include one or more of:

Execute the association it learned in the past (the prediction);
Don't do anything; and/or
Other behaviors.

Some implementations may provide five different modes that use a combination of what the robot does whether the teacher sends a correction or not. Those five combinations may assist teaching a behavior in the most effective manner.

In some implementations, the available modes may include one or more of Control, Listen, Override, Correct, Autonomous, and/or other modes. Exemplary implementations of various modes are described in the table below.

TABLE 3

| Mode | Action of the robot in presence of training input | Action of the robot in absence of training input |
| --- | --- | --- |
| Control | Executes the action in accordance with the training input; Does not learn the association | Idle |
| Listen | Executes the action in accordance with the training input; Learns the association | Idle |
| Override | Executes the action in accordance with the training input; Learns the association | Executes the action in accordance with the prediction |
| Correct | Combine the teaching input and the prediction and execute the action in accordance with the combined signal. Learn the resulting association | Executes the action in accordance with the prediction |
| Autonomous | Ignore the teaching input and execute the action in accordance with the prediction | Executes the action in accordance with the prediction |

In some implementations, the available modes may be embodied in and/or effectuated by the combiner (also referred to herein as ModeCombiner).

The combiner mode may be changed either by the teacher (e.g., the human teaching the robot), and/or by an internal mechanism that determines the state the combiner should be in based on the internal of the system.

According to some implementations, the teacher may switch from one teaching mode to another one using the iPhone App, as depicted in the figure below.

Figure 18:
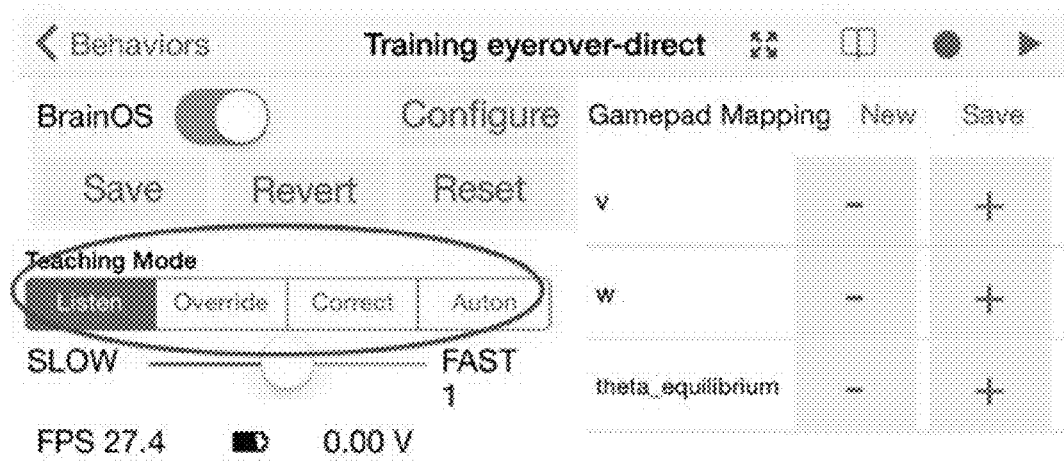
FIG. 18 presents one exemplary implementation of a correction screen with Listen mode activated, and Override Correct and autonomous mode available from the teacher control screen, in accordance with one or more implementations.

FIG. 18 illustrates an exemplary correction screen with Listen mode activated, and Override Correct and autonomous mode available from the teacher control screen, in accordance with one or more implementations.

In control mode, the robot may be remote controlled. Responsive to the teacher sending a correction, the robot may execute the command but may not learn the association. If the teacher is not sending any correction, then the robot may stay still. This mode may be useful when the teacher wants to control the robot without teaching (e.g., if the teacher is repositioning the robot to a starting position, but the teacher does not want the robot to do that on its own).

In listen mode, the robot may be "listening" to or otherwise observing what the teacher teaches, and may not do anything on its own. However, the robot may learn an association. But if the teacher stops sending a command, the robot may stay still and wait for the next command. In some implementations, teaching the robot may begin with the listen mode. Once enough examples have been provided and the robot has learned something, the override mode may be used.

In the override mode, the robot may execute what it has learned, unless a command is sent by the teacher. As soon as the teacher starts sending commands, the robot may stop taking the initiative and may let the teacher control it. For example, if the robot is turning left but the teacher wants the robot to turn right and provides a right turn command, then the robot may head the teacher's command, perform the action, and try to remember it for the next time the same situation occurs. Once a behavior only needs fine tuning, the correct mode may be used.

In the correct mode, the robot may integrate what the teacher commands with what the robot already knows. In some implementations, the robot may sum the teacher's command with what the robot already knows to get a final motor command. The teacher's correction may operate in this case as a deviation from the predicted command determined by the robot.

By way of non-limiting illustration, the robot may be driving full speed in a course. The teacher may want to teach the robot not to go so fast. A natural reaction for the teacher might be to press a "go-back button" on a gamepad used to provide commands to the robot. If the teacher does that in the override mode, which may tell the robot to drive backward, not to decrease its speed (the teacher still wants the robot to move forward in this context). The correct mode may be appropriate for this situation. The robots might say, "I like this blue trash bin over there, I am driving there as fast as I can," and the teacher may say, "Hey Champ, you are going a little bit too fast, I would suggest that you reduce your speed." Both variables may be added or otherwise combined, and at the end the robot might think something like, "Well, I still like this bin, but maybe I should go there a little bit more carefully."

The autonomous mode may provide a way for the teacher to send a correction to the robot. In this mode, the learned behavior may be expressed without any changes or learning.

Figure 19:
FIG. 19 presents one exemplary implementation of operational sequence for a learning robotic device, in accordance with one or more implementations.

FIG. 19 illustrates one set of transition between teaching modes while learning a new task, in accordance with one or more implementations.

At operation 1902, the module may operate in the CONTROL mode. The teacher may tele-operate the robot and position it in a desired state.

At operation 1904, the teacher may switch to the LISTEN mode to initiate learning. The teacher may show a few examples of the task to the robot, but may not want the robot to interfere with the teacher's teaching during this process.

At operation 1906, after a stage of training, the teacher may switch to the OVERRIDE mode. The teacher may let the robot operate autonomously while retaining capability of providing correction(s) when the robot is not expressing the target behavior.

At operation 1908, the teacher may switch to the CORRECT mode. In this mode, the teacher may only provide small corrections (e.g., delta corrections) to optimize the behavior.

At operation 1910, once the teacher may determine that the behavior has been learned by the robot with a sufficient accuracy (e.g., based on an error determined with a based on a comparison of a target action performance and actual action performance), the teacher may switch the robot to the AUTONOMOUS mode, which may prevent any intervention from the teacher, and also provide a validation mode to test performance level.

In some implementations, switching from one mode to another may be done manually by the teacher (e.g., through a Smartphone App and/or other control mechanism). In some implementations, switching between modes may be based on an internal variable representing the state system (e.g., time, number of correction given, amplitude of the last n-corrections, quality of predictions, and/or other information).

Apparatus and methods for hierarchical learning are disclosed herein, in accordance with one or more implementations. In supervised learning, a user may train a robot to perform one or more tasks by demonstration. To achieve a given level of performance by the robot when performing a composite task (e.g. comprising multiple subtasks), the user may provide additional information to the robot, in addition to examples. In particular, the user may organize "low level" tasks (also referred to as behaviors) into hierarchies. Higher level control processes (e.g., classifiers and/or switchers) may be trained to control which lower level tasks/behaviors may be active in a given context. In some implementations, the user may select which sensory information (context) may be considered as relevant for a given task. Behavior training may comprise determination of associations between a given sensory context and motor output for the task. The user may select which particular prediction method (e.g., random k-nearest neighbors (RKNN) classifier, a perceptron, a look up table, a multilayer neural network, a fern classifier, a decision tree, a Gaussian processes, a probabilistic graphical model, and/or other classification approach) may be used for training a particular behavior.

Figure 25:
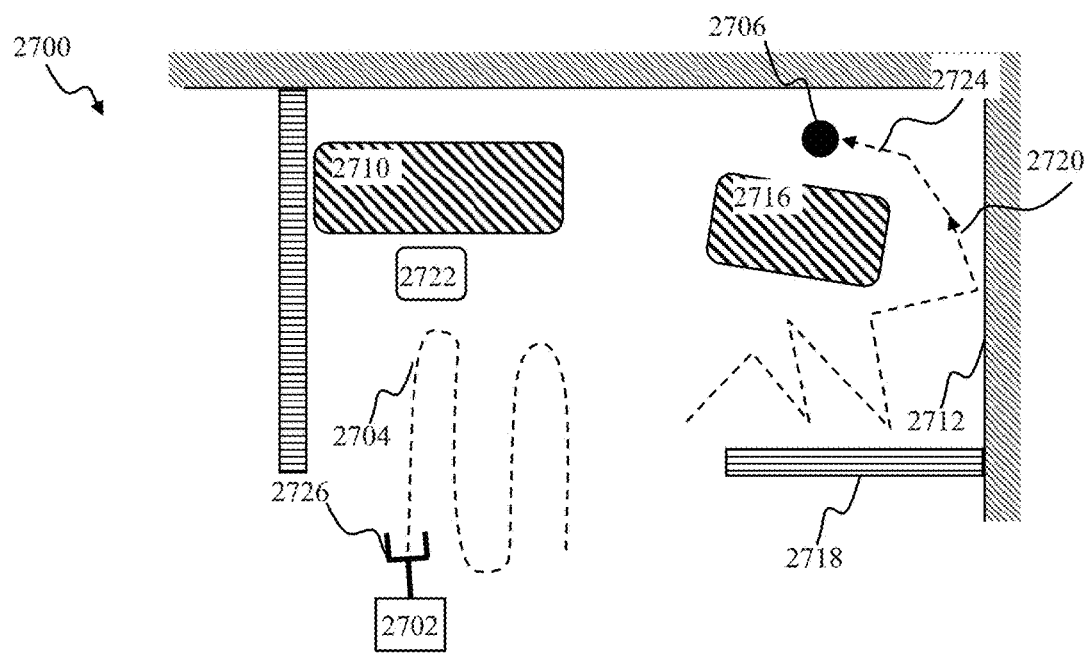
FIGS. 25-26 illustrate training and/or operation of a robotic device to execute a fetch task according to one or more implementations.
Figure 26:
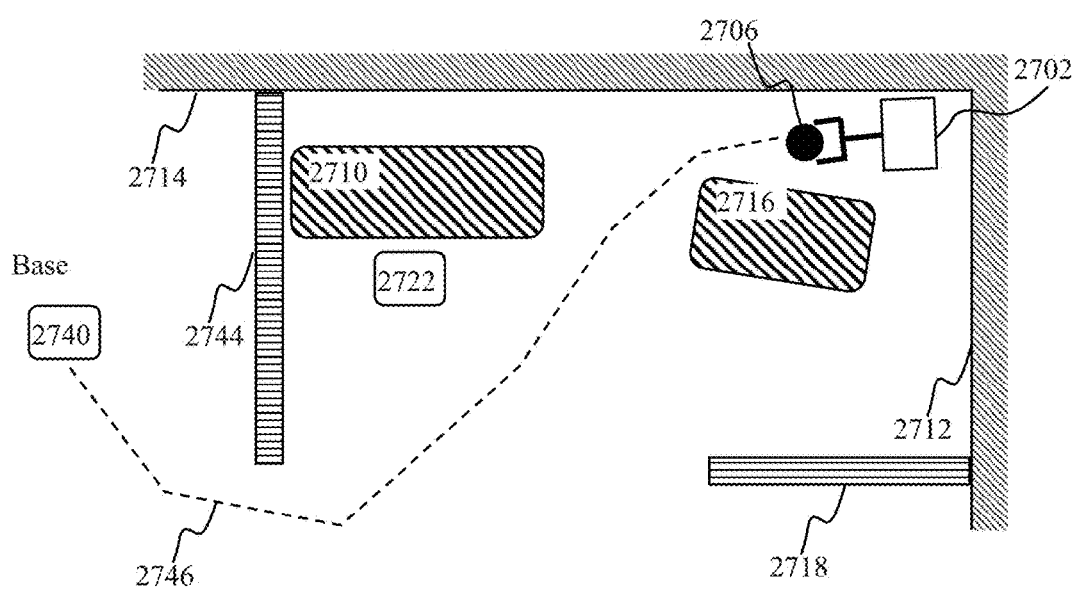

A task of playing fetch may be referred to as a composite task, as described below with respect to FIGS. 25-26. FIG. 25 illustrates target search and/or target approach portions (subtasks) of the fetch task. Fetch task may be executed in an environment (e.g., user premises 2700) comprising a plurality of obstacles (e.g., walls 2712, 2718, 2714, furniture 2710, 2716, 2722). Fetch task may comprise subtasks of locating the target (e.g., ball 2706) by the robotic device 2702, approach of the target by the robotic device 2702, target grasping by the robotic device 2702 gripper component 2726, and target return to base (e.g., 2740 in FIG. 26). In one or more implementations, the robotic device 2702 may comprise the apparatus 160 described with respect to FIG. 1, and/or 800 described with respect to FIG. 8. The robotic device 2702 may comprise sensor component (e.g., camera, sonar, radar, lidar and/or other sensor) configured to provide information about the target and/or the environment. In response to the robotic apparatus being unable to detect the target (e.g., "see" the object 2706), the robot 2702 may execute environment exploration behavior while avoiding obstacles by, e.g., using random exploration trajectory 2720, corn row trajectory 2704, and/or other approach. In response to the robot locating the target, the robot may be configured to perform a positioning maneuver (e.g., along trajectory 2724 in FIG. 25) and/or to grasp the target, e.g., as shown in FIG. 26. In some implementations, the robotic controller may be configured to select between two or more behaviors when executing a task (e.g., grasping an object). By way of an illustration, one behavior may comprise moving the robotic platform 2702 closer to the target by activating wheels; another behavior may comprise moving manipulator by e.g., adjusting manipulator angle, closer to the target.

If the target is in the robot's gripper, the robot 2702 may navigate to the base 2740 while avoiding obstacles (e.g., wall 2744, and/or furniture items 2716, 2710 in FIG. 26). Upon reaching the base the robotic device 2702 may deposit the object 2706 at the base. In some implementations, the base may comprise an electrical charger. Upon reaching the base the robot may recharge its batteries. The overall task (target search, target approach, target grasp, return to base) may comprise a highly nonlinear task (e.g., a task that may not be repeatably reproduced) and/or be affected by noise (deviations) in robot position, object position, motor speed, current, torque, and/or other sources of errors. In one or more implementations, the term nonlinear task may be used to describe a process which may not follow the superposition principle—meaning that the output of a nonlinear system may not be directly proportional to the input.

In some implementations, wherein the robot may be trained to execute the whole fetch task, the robotic device may employ a highly computationally intensive classifier (predictor) in order to determine infer the right sequence of actions from user demonstrations while maintaining resistance to noise. Such whole task classifier may be configured to determine which particular input may be relevant for a given task. For example, a state of the gripper may be regarded as not relevant to target search behavior. Additional training may be needed to communicate to the classifier that the search behavior should be performed independently of the state of the gripper.

According to some exemplary implementations, the user may train a subtask (component) of the fetch behavior at a given time. For example, at one time interval, the user may train the classifier how to search for a target and/or how to approach it while avoiding obstacles (e.g., "target approach"). At another time interval, the user may train the robot to perform a grasping behavior (e.g., "grasping a target"). Grasping training may correspond to a variety of contexts, e.g., objects of different shapes, colors, weight, material, object location relative gripper, and/or other characteristics. With the target object in the gripper the user may train the robotic device return to the base ("base approach") e.g., via trajectory 2746 in FIG. 26. While training a particular behavior, the user may concentrate on a particular behavior and may elect not to show examples of other behaviors thus making a prediction task for the classifier substantially easier (e.g., less computationally intensive). The user may have an opportunity to select which input is relevant for a particular behavior. For example, in some implementations, the target and/or obstacle detection may be relevant for training target approach, and/or base and/or obstacle detection may be relevant to train a base approach. The user may select which actuators are controlled by particular behavior. For example, navigation tasks (e.g., target approach) may not need to learn to control the gripper. The user may have an opportunity to use a specialized predictor for different low level tasks. For example, a non-linear classifier may be used for obstacle avoidance and a linear classifier may be used for grasping with a simple gripper. Obstacle avoidance maneuver may be dependent on a variety of factors associated with the robot and/or the environment, e.g., precise location of the objects, location and/or orientation of the robot, current configuration (shape) of the robot (e.g. is arm extended), speed of the robot, velocity of the moving obstacles which might require complex non-linear classification to determine which motor command to issue. Grasping with a one dimensional gripper may be implemented as follows: "if object is in the certain area of the picture, then close the gripper. Open the gripper otherwise". This logic might be solved with a linear binary classifier: if object is below the certain line in the picture—issue output 1 ("close"), otherwise issue 0 ("open").

Figure 9:
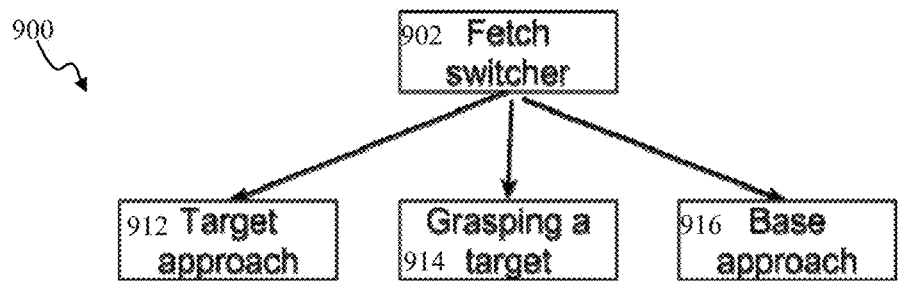
FIG. 9 is a functional block diagram depicting a fetch switching computerized apparatus, according to one or more implementations.

After achieving a target level of performance (e.g., adjudged by elapsed task execution time, presence and/or number of collisions, success rate, and/or other performance criteria) for individual tasks, the user may create a hierarchy from these behaviors. FIG. 9 illustrates one exemplary hierarchy, in accordance with one or more implementations.

According to the hierarchy depicted in FIG. 9, the "Fetch switcher" component 902 may correspond to a higher level behavior (compared to behaviors 912, 914, 916 in FIG. 9). The switcher behavior 902 may be configured (e.g., trained) to activate one or more lower level behaviors 912, 914, 916. Activation of the lower level behaviors may depend on the context. In some implementations, the user may train the "Fetch switcher" 902 using supervised learning. For example, the user may demonstrate to the switcher which of the behaviors (e.g., 912, 914, 916) should be selected in a particular situation. The user may employ a user interface (e.g., a computer, a tablet, a smart phone) for such demonstrations, according to some implementations. In some implementations, if the target is far or not visible, the user may provide a "select target approach" command to activate the behavior 912. If the target is close, the user may provide a "select grasping a target" command to activate the behavior 914. The switching component 902 may comprise a classifier configured to learn to predict which behavior is being selected for given sensory context. The user may select which sensory input may be relevant for a given task (e.g., obstacle detection feature extractor may be deactivated if the object is close enough so that it may be assumed that there are no obstacle remaining in the path to grasp the object).

Hierarchies of subtasks (control actions) may be employed for operating robotic devices (e.g., the robotic vehicle 160 of FIG. 1 and/or robotic appliance 2706 of FIG. 25. Task hierarchies may comprise hierarchy graphs of varying complexity. Action activation may be used to activate a given subtask within the hierarchy. An adaptive controller may be trained to utilize the activation signal to produce control output. FIGS. 10A-10D illustrate use of action activation (selection) mechanism in a hierarchy of actions, according to one or more implementations.

Figure 10A:
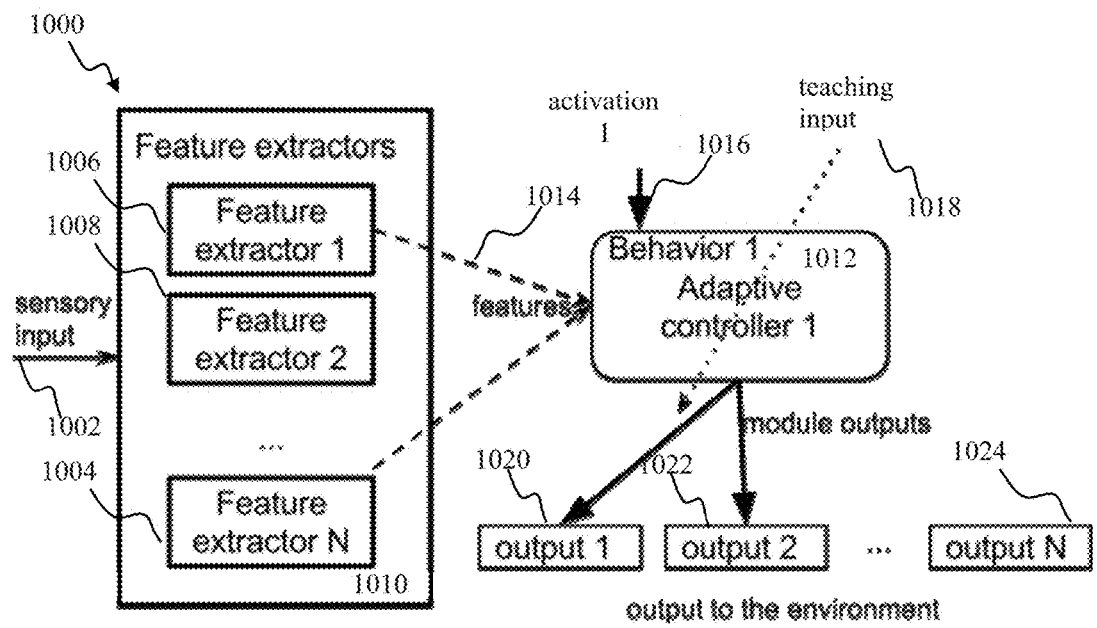
FIGS. 10A-10D illustrate BrainOS™ systems comprising action selection mechanisms, according to one or more implementations.

FIG. 10A illustrates a control apparatus comprising an adaptive controller operable based on an activation signal. The apparatus 1000 of FIG. 10A may be configured to learn to produce control output for a robot (e.g. 2702 in FIG. 25) based on teaching input 1018 and occurrence one or more features in sensory input 1002. In one or more implementations, the sensory input may comprise one or more of digital images, pressure wave sensors, RADAR, LiDAR, robot component position, force, and/or speed (e.g., limb position, velocity), actuator feedback (current, torque, position, speed), and/or other sensory output, e.g., as described above with respect to FIG. 1. The apparatus 1000 may comprise a feature extractor component 1010 comprising one or more feature extractors. Individual feature extractors (e.g., 1004, 1006, 1008 in FIG. 10A), may be configured to determine occurrence of a given feature in sensory input. As used herein term feature may be used to describe occurrence of a given sensory input (e.g., occurrence of a red circular area, corresponding to a ball target, in an image, occurrence of a given gripper configuration (e.g., motor torque and/or gripper position), a probabilistic map describing probability of an obstacle in a certain region of the screen; elementary visual features extracted from the picture (e.g. scale invariant feature transform); pre-filtered LiDAR data that may be absent the sensor noise; localization of the robot on the map as a result of particle filter localization algorithm; filtered with Kalman filter output of IMU sensors (acceleration, gyro, compass, barometer) that may represent a 3-dimensional position and orientation of the robot, fused representation of current objects nearby obtained from, e.g., Kinect, LiDAR, proximity indications (bumpers, touch, ultrasonic, and/or IR sensors) and/or other sensory input configurations.

The apparatus 1000 may comprise an adaptive controller 1012 configured to determine and provide control output to channels 1020, 1022, 1024. In one or more implementations, individual channels 1020, 1022, 1024 may comprise one or more of motor actuators, electrical components (e.g., LED), transducers (e.g., sound transducer), and/or other electrical, mechanical, and/or electromechanical components. Output 1014 of the feature extractor 1010 may be provided to adaptive controller 1012. In some implementations of robotic navigation applications, the output 1014 may comprise, e.g., position of an object of interest represented by, e.g., coordinates (x, y, width, height) of a bounding box around the object, Extracted contours of obstacles from the image, information related to motion of the robotic platform (e.g., speed, direction of motion of the rover 160 in FIG. 1) and/or other information related to environment of the robot and/or state of the robotic platform.

In some implementations of robotic manipulation, the output 1014 may comprise angular position (e.g., angle) of one or more joints of the manipulator, and/or velocity of manipulator components (e.g., angular velocity of a joint, velocity of a manipulator segment (limb)) obtained, e.g., using a set of radial basis functions for added redundancy. In some implementations, the basis function decomposition may employ a basis kernel comprised of between 100 and 200 basis function components. In some implementations, the basis function decomposition may comprise kernel expansion methodology described in, e.g., U.S. patent application Ser. No. 13/623,842 entitled "SPIKING NEURON NETWORK ADAPTIVE CONTROL APPARATUS AND METHODS", filed Sep. 20, 2012, the foregoing being incorporated herein by reference in its entirety. In one or more implementations, feature detection may be effectuated using saliency detection methodology such as described in e.g., U.S. patent application Ser. No. 14/637,138 entitled "SALIENT FEATURES TRACKING APPARATUS AND METHODS USING VISUAL INITIALIZATION", filed Mar. 3, 2015, Ser. No. 14/637,164 entitled "APPARATUS AND METHODS FOR TRACKING SALIENT FEATURES", filed Mar. 3, 2015, and Ser. No. 14/637,191 entitled "APPARATUS AND METHODS FOR SALIENCY DETECTION BASED ON COLOR OCCURRENCE ANALYSIS", filed Mar. 3, 2015, each of the foregoing also incorporated herein by reference in its entirety.

The adaptive controller 1012 may operate a learning process configured based on teaching input 1018 and the output 1014 of the feature extractor. In some implementations, the learning process may comprise k-nearest neighbor (KNN) classifier, multilayer neural network, a fern classifier, a decision tree, a Gaussian process, probabilistic graphical model, and/or another classification process. During training, the user may use a remote interface device (e.g., a gamepad, a smartphone, a tablet, and/or another user interface device) configured to provide user commands 1018 to the learning process. The teaching input may 1018 may comprise one or more commands 1018 configured to cause the robot to approach the target while avoiding the obstacles thereby effectuating training of behavior 1 (subtask 1). During training and/or execution of behavior 1, the adaptive controller may utilize input from target tracker (feature extractor 1 1006) and from obstacle detector (feature extractor N 1004). Execution of behavior 1 by the adaptive controller 1012 may comprise provision of output to channels 1020, 1022. The learning process of the adaptive controller 1012 may be adapted based on the outcome of the behavior 1 execution. In one or more implementations, learning process adaptation may comprise modifying entries of a KNN classifier, e.g., as described in U.S. patent application Ser. No. 14/588,168 entitled "APPARATUS AND METHODS FOR TRAINING OF ROBOTS", filed Dec. 31, 2014; modifying weights of an artificial neuron network (ANN), and/or one or more look-up tables, e.g., as described in U.S. patent application Ser. No. 13/842,530 entitled "ADAPTIVE PREDICTOR APPARATUS AND METHODS", filed Mar. 15, 2013, Ser. No. 13/842,562 entitled "ADAPTIVE PREDICTOR APPARATUS AND METHODS FOR ROBOTIC CONTROL", filed Mar. 15, 2013, Ser. No. 13/842,616 entitled "ROBOTIC APPARATUS AND METHODS FOR DEVELOPING A HIERARCHY OF MOTOR PRIMITIVES", filed Mar. 15, 2013, Ser. No. 13/842,647 entitled "MULTICHANNEL ROBOTIC CONTROLLER APPARATUS AND METHODS", filed Mar. 15, 2013, and Ser. No. 13/842,583 entitled "APPARATUS AND METHODS FOR TRAINING OF ROBOTIC DEVICES", filed Mar. 15, 2013, each of the foregoing being incorporated herein by reference in its entirety.

Based on the learning process adaptation based on training, the adaptive controller 1012 may be capable of providing the output 1020, 1022 based on occurrence of features detected by the feature extractor 1006, 1007 and in absence of the teaching input 1018. By way of an illustration, the controller 1018 may learn to approach a target (e.g., 2706 in FIG. 26) by autonomously generating output 1020, 1022 in FIG. 10A) for wheel actuators of the robot 2702 of FIG. 25 based on sensory input from the cameras and/or motor encoders. The controller 1018 may learn not to activate control output 1024 configured to operate the gripper (e.g., 2726 in FIG. 25).

In some implementations, operation of the adaptive controller 1012 may be configured based on an activation indication 1016. The activation indication 1016 may be used to convey to the adaptive controller 1012 as to whether it may be operable (e.g., actively executing the learning process) and/or providing the output 1020, 1022. In some implementations, the activation indication 1016 may convey a binary state (where "0" may be used to indicate that the component 1012 may be not active and "1" may be used to indicate that the component 1012 may be active, as shown in FIG. 10A. If the module is active, then the module may process input features and/or teacher commands, and may provide an output. In some implementations, code associated with inactive controller may not be executed thereby freeing computational, memory, and/or energy resources for other uses. In one or more implementations wherein adaptive controller 1016 may comprise one or more processing components (e.g., CPU, FPGA, ASIC, and/or other component) component inactivity may free energy resources for other tasks.

The user may have an ability to perform managing operations on behavior 1. For example, the user may perform operations including one or more of change a name of a module, reset a module to naive state, revert a module to a particular point in history, delete a module, save/load locally, upload, download, and/or other operations. The user may change outputs and FE1. Such changes may depend on whether it is compatible with a trained behavior (e.g., dimensionality of features and outputs is preserved), in some implementations. The user may train a target approach. The user may change input from a target tracker to a base tracker so that robot will approach to base. A robot with multiple grippers may be trained to grasp with gripper 1 and user wired output from the adaptive module form gripper 1 to gripper 2.

In some implementations, a control apparatus (e.g., 1000 in FIG. 10A) may be configured to implement multiple behaviors, e.g., target approach and target grip. After training the controller 1012 to implement one behavior (e.g., target approach) the apparatus 1000 may be provided with another instance of adaptive controller to implement another behavior (subtask), as shown and described below with respect to FIG. 10B.

Figure 10B:
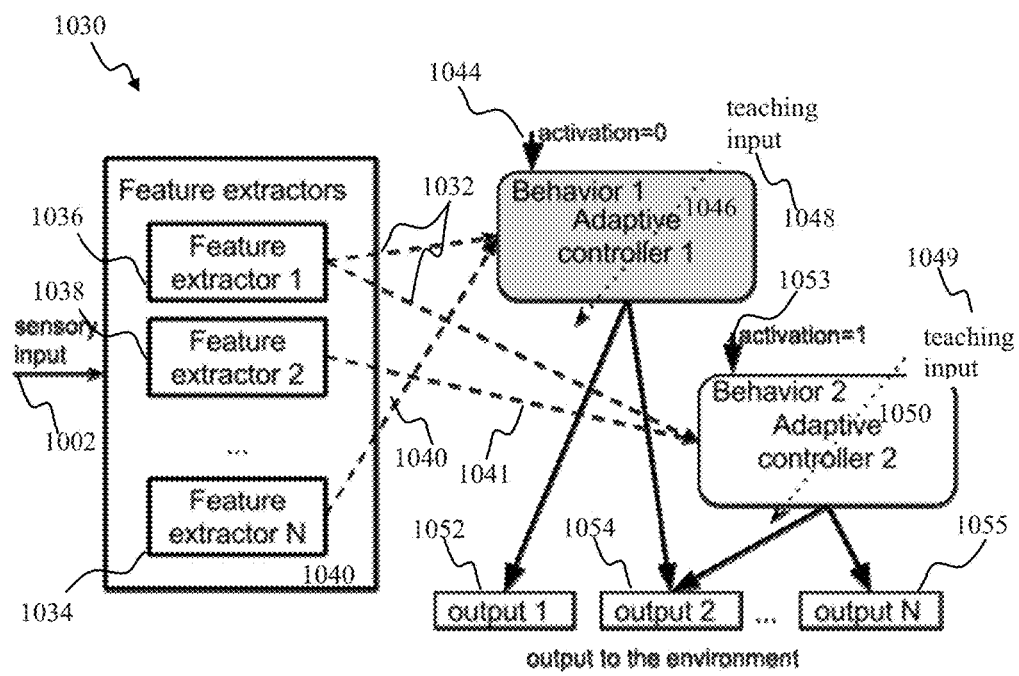

The apparatus 1030 of FIG. 10B may be configured to learn to produce control output for a robot (e.g. 2702 in FIG. 25) based on teaching input 1048, 1049 and occurrence of one or more features in sensory input 1002. In one or more implementations, the sensory input 1002 may comprise data from one or more sensors described above with respect to FIG. 10A. The apparatus 1030 may comprise a feature extractor component 1040 comprising one or more feature extractors. Individual feature extractors (e.g., 1038, 1034, 1036 in FIG. 10B), may be configured to determine occurrence of a given feature in sensory input. As used herein term feature may be used to describe occurrence of a given sensory input (e.g., occurrence of a red circular area, corresponding to a ball target, in an image, occurrence of a given gripper configuration (e.g., motor torque and/or gripper position), a probabilistic map describing probability of an obstacle in a certain region of the screen; elementary visual features extracted from the picture (e.g. scale invariant feature transform); pre-filtered LiDAR data that may be absent the sensor noise; localization of the robot on the map as a result of particle filter localization algorithm; filtered with Kalman filter output of IMU sensors (acceleration, gyro, compass, barometer) that may represent a 3-dimensional position and orientation of the robot, fused representation of current objects nearby obtained from, e.g., Kinect, LiDAR, proximity indications (bumpers, touch, ultrasonic, and/or IR sensors) and/or other sensory input configurations.

The apparatus 1030 may be configured to learn to execute a plurality of tasks (e.g., learn a plurality of behaviors). The apparatus 1030 may comprise a plurality of adaptive controller components configured to determine and provide control output to channels 1052, 1054, 1055. In some implementations, the adaptive components 1046, 1050 may comprise individual hardware and/or software components. In one or more implementations, the components 1046, 1050 may comprise logical components of a learning control process.

In one or more implementations, the component 1046 may comprise component 1012 described above with respect to FIG. 10A. Learning process of the component 1046 in FIG. 10B may be configured to implement behavior 1 (subtask 1) of e.g., target approach. To execute subtask 1, the controller 1046 may produce output for channels 1052, 1054 based on analysis of features provided by feature extractors 1036, 1034, and user training input 1048.

Learning process of the component 1050 in FIG. 10B may be configured to implement behavior 2 (subtask 2) of, e.g., target grasp. To execute subtask 2, the controller 1050 may produce output for channels 1055, 1054 based on analysis of features provided by feature extractors 1036, 1038, and user training input 1049.

In one or more implementations, individual channels 1052, 1054, 1056 may comprise one or more of motor actuators, electrical components (e.g., LED), transducers (e.g., sound transducer), and/or other electrical, mechanical, and/or electromechanical components.

In some implementations, the learning process of component 1050 may be configured different (e.g., comprise a perceptron classifier) compared to learning process of the component 1046.

Subsequent to learning process 1050 adaptation based on training, the adaptive controller 1050 may be capable of executing behavior 1 (by providing the output 1052, 1054 based on occurrence of features 1032, 1040 detected by the feature extractor 1036, 1034) and in absence of the teaching input 1048; and executing behavior 2 (by providing the output 1054, 1055 based on occurrence of features 1032, 1041 detected by the feature extractor 1036, 1038) and in the absence of the teaching input 1049.

For example, the user may train the apparatus 1030 using a gamepad (or other input device used to provide teaching input 1049) to turn and grasp the target ("Behavior 2"). The learning process of the adaptive controller 1050 (e.g., perceptron classifier) may learn to turn the robot appropriately and grasp the target by autonomously effectuating correct torques on the robot's wheel (output 1054) and gripper (output 1055). During execution of subtask 2 (object grasping) controlling of another wheel (output 1052) may remain inactive. Sensory input 1002 in FIG. 10B may comprise input from the cameras and encoders.

Operation of adaptive controller components 1046, 1050 may be activated and/or deactivated using activation indications 1044, 1053, respectively. The activation indication 1044 may be used to convey to the adaptive controller 1046 as to whether it may be operable (e.g., actively executing the learning process) and/or providing the output 1052, 1054. In some implementations, the activation indication 1016 may convey a binary state (where "0" may be used to indicate that the component 1012 may be not active, as shown in FIG. 10B; and "1" may be used to indicate that the component 1012 may be active.

The activation indication 1534 may be used to convey to the adaptive controller 1050 as to whether it may be operable (e.g., actively executing the learning process) and/or providing the output 1055, 1054. In some implementations, the activation indication 1053 may convey a binary state (where "0" may be used to indicate that the component 1050 may be inactive; and "1" may be used to indicate that the component 1050 may be active, as shown in FIG. 10B).

If the adaptive controller component is activated, (e.g., 1050 in FIG. 10B), the component may process input features and/or teacher commands, and may provide an output. In some implementations, code associated with inactive controller may not be executed thereby freeing computational, memory, and/or energy resources for other uses. In one or more implementations wherein adaptive controller 1046, 1050 may comprise one or more processing components (e.g., CPU, FPGA, ASIC, and/or other component) component inactivity may free energy resources for other tasks.

The user may perform the managing operation of the apparatus 1030. The user may select (e.g., using a user interface) which component (e.g., 1046, 1050) may be active at a given time by providing appropriate activation indications 1044, 1053. Component 1050 in FIG. 10B may be active when the activation signal 1053 state is 1, and "Behavior 1" may be inactive when the activation 1044 state is 0. The user may train target approach (behavior 1) more frequently by deactivating behavior 2, activating behavior 1, training behavior 1, and activating behavior 2 again. The user may have two good behaviors and uses manual switching (e.g., via a user interface) to give high level commands to the robot (e.g., "kick", "punch", "escape" in robotic fighting game).

The user may have an ability to perform managing operations of behavior 1 and 2 of the apparatus 1030. For example, the user may perform operations including one or more of change a name of a module, reset a module to a naive state, revert a module to a particular point in history, delete a module, save/load locally, upload, download, and/or other operations. The user may change output channel assignment and/or feature extractor components in accordance with a given application. Such changes may depend on whether it is compatible with a trained behavior (e.g., dimensionality of features and outputs is preserved), in some implementations. The user may train a target approach. The user may change input from a target tracker to a base tracker so that robot will approach to base. A robot with multiple grippers may be trained to grasp with gripper 1 and user wired output from the adaptive module form gripper 1 to gripper 2.

A control apparatus of a robot may be configured to execute a plurality of subtasks (behaviors). A task comprising two or more subtasks (behaviors) may be referred to as composite task or composite behavior. Upon learning to execute a given complex behavior, the robotic control apparatus may be trained to execute another complex behavior, as described below with respect to FIG. 10C.

Figure 10C:
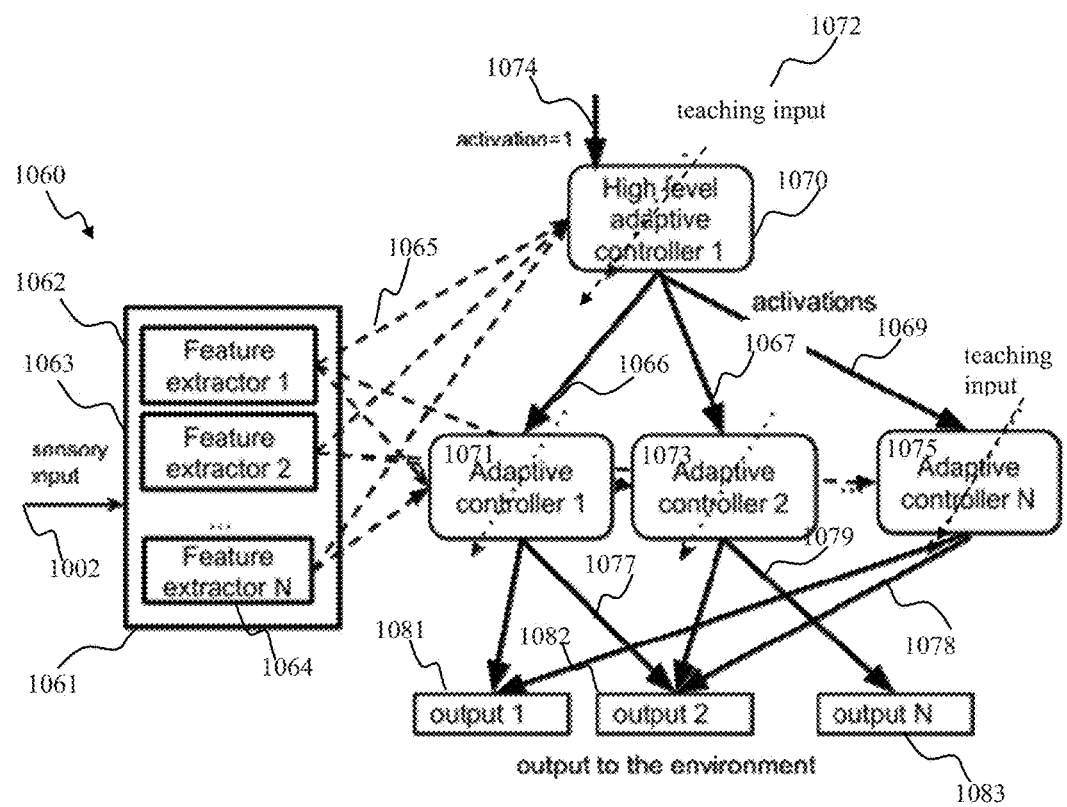

The apparatus 1060 of FIG. 10C may comprise a hierarchy of adaptive controllers configured to learn to execute a plurality of tasks by a robotic device (e.g. 2702 in FIG. 25). The hierarchy of FIG. 10C may comprise a higher level adaptive controller component 1070 and one or more lower level adaptive controller components 1071, 1073, 1075. Individual components 1071, 1073, 1075 may comprise one or more controller components 1012, 1046, 1050 described above with respect to FIGS. 10A-10B. Components 1071, 1073, 1075 may be configured to produce output for a plurality of output channels 1061, 1063, 1065. In one or more implementations, individual channels 1081, 1082, 1083 may comprise one or more of motor actuators, electrical components (e.g., LED), transducers (e.g., sound transducer), and/or other electrical, mechanical, and/or electromechanical components.

The apparatus 10960 may comprise a feature extractor component 1061 comprised of a plurality of individual feature extractors 1062, 1063, 1064. Individual feature extractors 1062, 1063, 1064 may be configured to determine occurrence of a respective feature (e.g., a representation of a target, gripper configuration) in sensory input 1002.

Adaptive controller components 1070, 1071, 1073, 1075 may receive output of the feature extractor component. Connectivity map denoted by broken arrows 1065 in FIG. 10C, may be configured based a specific application. By way of an illustration, controller components 1071, 1075 that may be configured execute target approach and/or return to base may be configured to produce wheel actuator output

1081, 1082 and not to produce gripper output 1083. Accordingly, feature extractor output related to gripper state (e.g., 1063) may not be provided to the controller components 1071, 1075.

In some implementations, output 1066, 1067, 1068 of the higher level adaptive controller component 1070 may be provided as activation input (e.g., input 1016, 1044, 1053 in FIGS. 10A-10B) to components of a lower level. In some implementations, the higher level adaptive controller component 1070 may be referred to as a switcher. In some implementations, activation output 1065, 1067, 1069 may be configured using a winner takes all approach, wherein only a given activation output may comprise an active state (e.g., 1) at a given step of task execution. By way of an illustration, based on analysis of feature extractor output 1065, the component 1070 may determine that target grasping (e.g., behavior 1073) is to be performed. Accordingly, the activation indication 1067 may be configured at an active state enabling operation of the component 1073; activation indications 1066, 1069 may be configured at an inactive state thereby causing inactivity of the components 1071, 1075. In some implementations, the output of the switcher may be binary, so that switcher activates and/or deactivates particular modules. Deactivated modules may not be executed to save computational resources. In some implementations, the switcher may activate only a single module at a time.

Using the activation indication methodology, the controller apparatus 1060 of FIG. 10C may be configured to learn to switch between lower level behaviors based on teaching input 1072. The component 1070 may operate a learning process configured to learn switching between "Target approach", "Base approach", and "Grasp the target" behaviors based on presence of features from one or more of the target tracker, the base tracker, the gripper state, and/or based on other information. In some implementations, the component 1070 may be configured to operate a persistent switcher process described herein.

Upon training, the apparatus 1060 may be configured to automatically execute a plurality of behaviors (e.g., "Target approach", "Base approach", and "Grasp the target") based on the content of sensory input and learned configuration. The configuration of FIG. 10C may be referred as a composite task (behavior) adaptive controller.

In some implementations, a control apparatus may comprise a hierarchy of adaptive controller components configured to execute a plurality of complex tasks, e.g., as shown and described with respect to FIG. 10D, below.

The apparatus 1084 may comprise two higher hierarchy level adaptive controller components 1097, 1086, also referred to as switchers. In some implementations, the component 1097 is configured to implement a fetch composite task, described above with respect to FIG. 10C. The component 1086 may be configured to implement another composite task (e.g., a modified fetch task wherein the target object is to be brought to another location (e.g., garage), a toy gathering task wherein one or more target objects are to be brought to a closet, the and/or other tasks. In some implementations, the components 1097, 1086 may be configured to operate (activate/deactivate) a given set of lower hierarchy level controller components. The component 1086 may be configured to operate a learning process based on training input, and sensory feature input 1092.

Figure 10D:
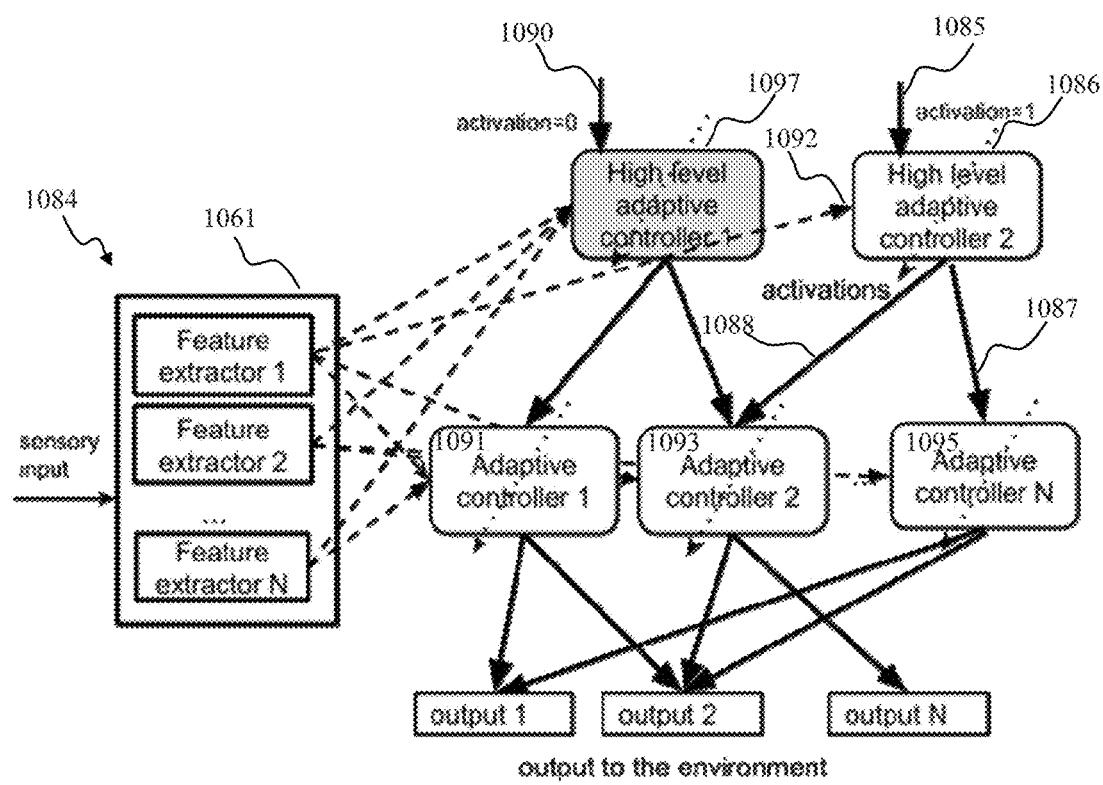

In one or more implementations (as shown in FIG. 10D), one higher level adaptive component (e.g., 1097) may be configured to operate (activate/deactivate) one plurality of lower level components (e.g., 1091, 1093). Another higher level component (e.g., 1086) may be configured to operate another plurality of lower level components (e.g., 1093, 1095). Various other component hierarchy implementations may be utilized.

During training, the user may activate different high-level behaviors (e.g. using a user interface) depending on what is the objective. For example, the first high level behavior (e.g., implemented by the component 1097) may be configured to find an object and bring it to the base. The second high level behavior (e.g., implemented by component 1086 may be configured to grasp the object near base and bring it to a closet. During operation of the first and the second higher level behaviors, one or more lower level behaviors (e.g., object grasping 1093) may be reused. The user may train the apparatus 1084 to switch between the two higher level behaviors based on a variety of parameters, e.g., the time of the day, number of objects in the closet, number and/or identity of objects near the base, and/or other considerations.

Switching between the higher level behaviors may be effectuated using activation indications 1090, 1085. As shown in FIG. 10D, during training and/or operation of the controller component 1086, activation indication 1085 may be configured as active (e.g., logical "1"); activation indication 1090 may be configured as inactive (e.g., logical "0"). By manipulating activation indication for components (switchers) of a level in the hierarchy of, e.g., FIG. 10D, execution of a plurality of composite tasks by the apparatus 1084 may be enabled.

In some implementations, arbitrarily deep (e.g., within processing and/or energy capabilities of a given computational platform) hierarchies may be developed.

Figure 11A:
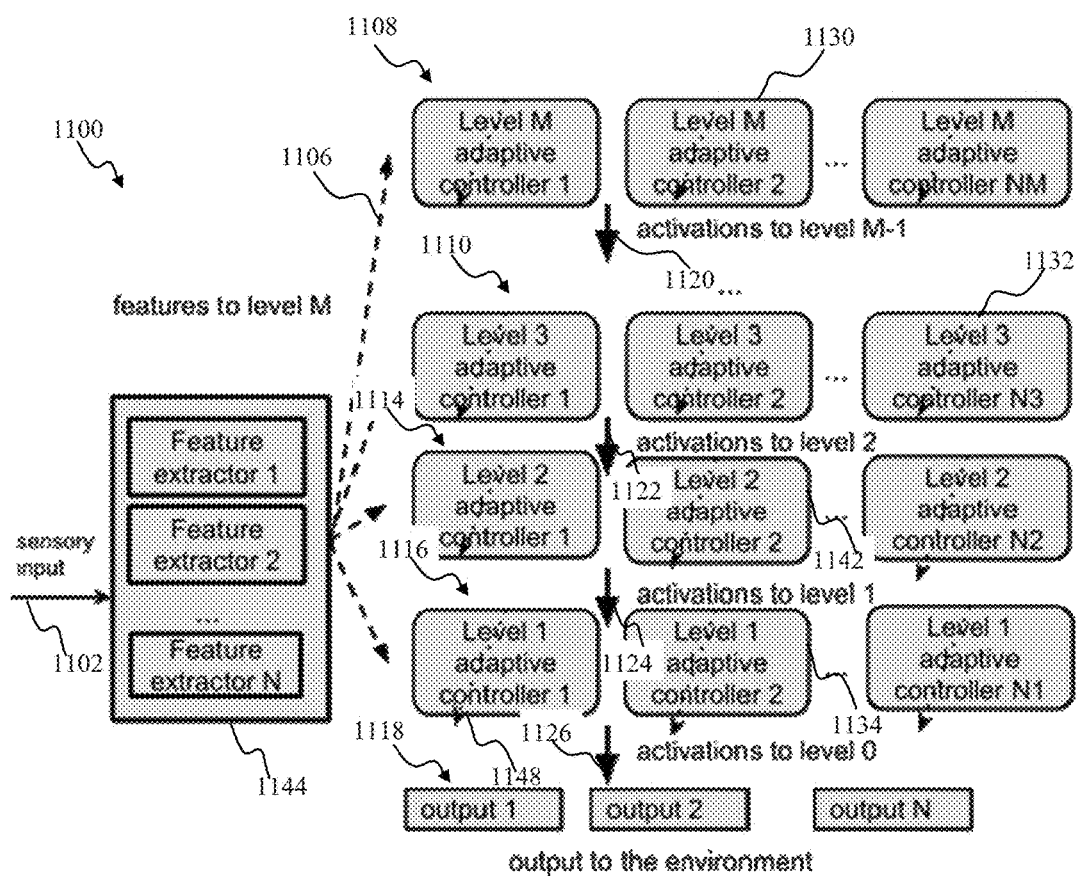
FIG. 11A illustrates a multi-level learning controller apparatus hierarchy, according to one or more implementations.

After training switcher components of one level in the hierarchy (e.g., 1097, 1086 in FIG. 10D), other higher level components (switchers) may be trained, as shown and described with respect to FIG. 11A. FIG. 11A illustrates a learning controller apparatus comprising a multi-level hierarchy of learning control components, according to one or more implementations. Components of the hierarchy of FIG. 11A may be configured to receive feature output from feature extractor component 1144. Output 1106 of the feature extractor 1144 may be configured based on analysis of sensory input, obtained e.g., such as described above with respect to FIGS. 10A-10D.

In some implementations, activation indication output produced by a component of one level (e.g. M-th) in the hierarchy may be provided to components of the subsequent lower level (e.g., M−1). By way of an illustration of control hierarchy of the control apparatus 1100 shown in FIG. 11A, activation indication 1122 from adaptive controller components of level 1110 may be provided to one or more adaptive controller components of the lower level 1114. In some implementations (not shown), activation output of a level (e.g., 1108) may be provided to components of a level that may be two or more steps below in the hierarchy (e.g., 1116, 1118). In some implementations, the components of the hierarchy levels 2 through M (e.g., 1116, 1114, 1110, 1108) may be operable in accordance with the winner takes all approach wherein the activation indication of one level (e.g., 1120, 1122, 1124) may comprise one active indication configured to activate a single (winner) component of the lower level. Activation output of the lowest level in the hierarchy (e.g., the output 1126 of level 1116) may comprise a plurality of active indications configured to enable simultaneous activation of multiple output channels 1118 (e.g., multiple joints of a robotic arm).

In some implementations wherein the activations may comprise binary indications, the hierarchy may be represented using a graph. At a given time interval, an active path within the graph may be used to provide an activation indication from a higher level switcher (behavior) to the outputs. Control components in an active path (e.g., 1130, 1132, 1142, 1134) may be executed. Inactive components may remain not-executed (e.g., dormant and/or disabled).

Figure 11B:
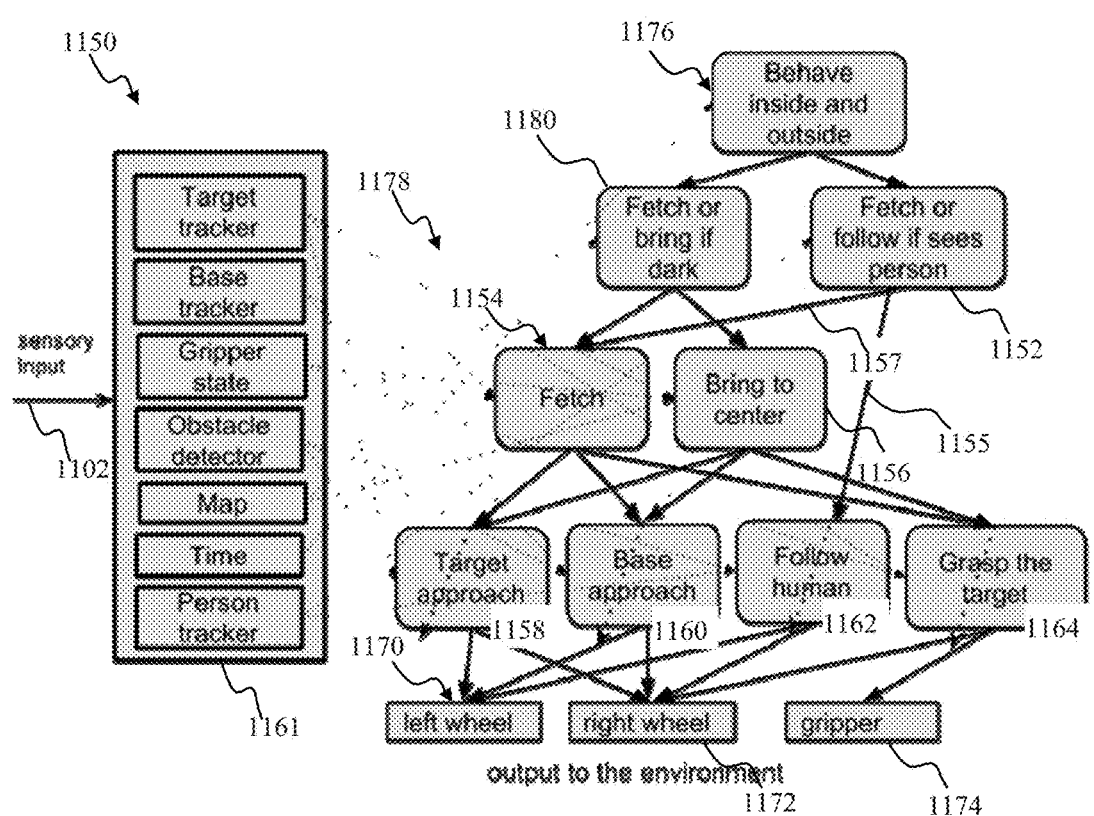
FIG. 11B illustrates a multi-level learning controller apparatus hierarchy, configured to implement a robotic dog task, according to one or more implementations.
Figure 12A:
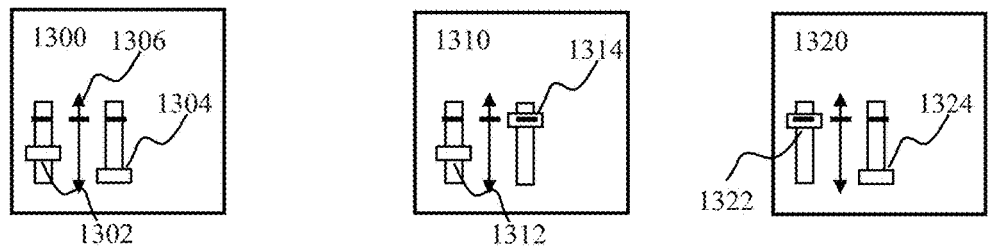
FIGS. 12A-12B are graphical illustrations depicting a touchfader user interface for implementing supervised training of BrainOS™, according to one or more implementations.
Figure 12B:
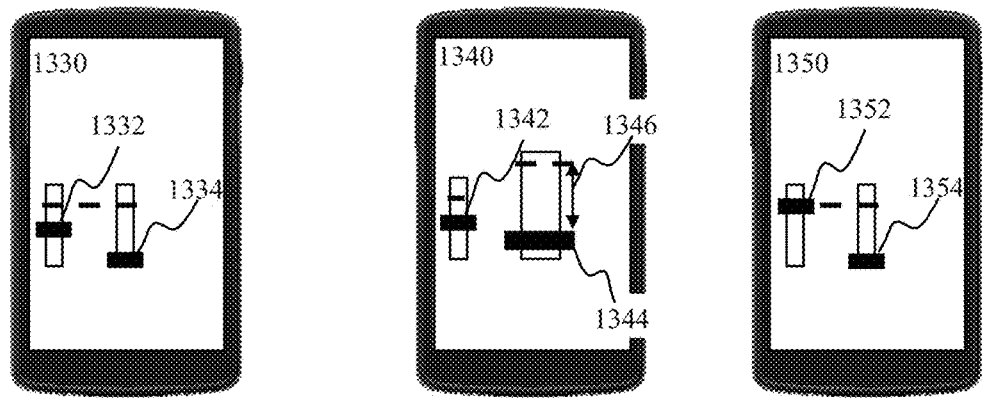
Figure 13:
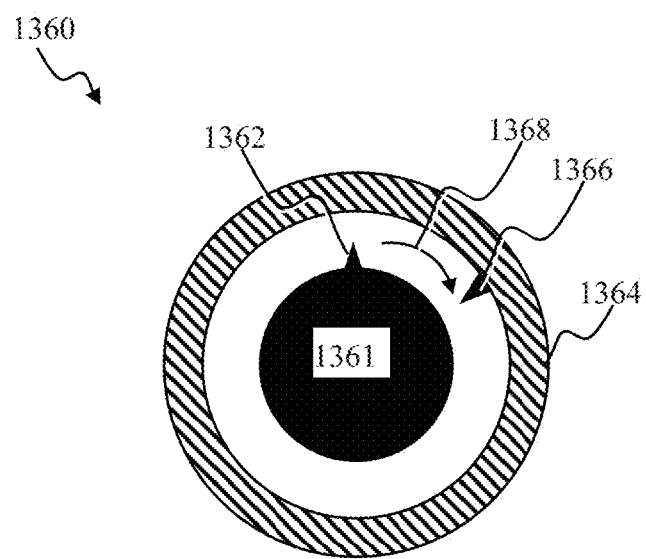
FIG. 13 is a graphical illustration depicting a mechanical touchfader user interface, according to one or more implementations.

FIG. 11B illustrates a multi-level learning controller apparatus hierarchy, configured to implement a robotic dog task, according to one or more implementations. The apparatus 1150 may be embodied in a robotic device (e.g., 160 of FIG. 1, and/or 2702 of FIG. 25). The apparatus 1150 of FIG. 11B may comprise a feature extractor component 1161 comprising one or more feature extractors. Individual feature extractors may be configured to determine occurrence of a given feature in sensory input 1102. In some implementations, the sensory input 1102 may comprise one or more of digital images, pressure wave sensors, RADAR, LiDAR, robot component position, force, and/or speed (e.g., limb position, velocity), actuator feedback (current, torque, position, speed), and/or other sensory output, e.g., as described above with respect to FIG. 1 and/or FIGS. 10A-10D.

The apparatus 1150 of FIG. 11B may comprise a learning controller comprising a hierarchy of learning components, e.g., 1176, 1180, 1152, 1154, 1156, 1158, 1160, 1162, 1164. The hierarchy of FIG. 11B may be configured in four levels. Learning components of the lowest hierarchy level (e.g., components 1158, 1160, 1162, 1164) may interface output control channels corresponding to control of a left wheel (channel 1170), a right wheel (channel 1172), and gripper (channel 1174).

Components of the learning controller may be configured to receive output 1178 of the feature extractor components as shown in FIG. 11B. Output of the learning component of an upper level of the hierarchy (e.g., the component 1154) may be provided as activation input intone or more components of a subsequent lower level in the hierarchy. Some components (e.g., 1152) may be configured to provide activation indication to a plurality of components corresponding to a plurality of lower levels (e.g., activation indication 1157 may be provided to the component 1154 of the hierarchy level immediately below the level of the component 1152; activation indication 1155 may be provided to the component 1162 of the hierarchy level two levels below the level of the component 1152).

Individual learning components e.g., 1176, 1180, 1152, 1154, 1156, 1158, 1160, 1162, 1164 of the hierarchy of FIG. 11B, may be operable in accordance with one or more learning processes. During training, a given learning component (e.g., 1158) may be trained using training input (not shown in FIG. 11B), e.g., as described above with respect to FIGS. 10A-10B. A variety of learning approaches may be utilized with the learning controller hierarchy of FIG. 11B, e.g., a perceptron, a stateful switcher, a r-KNN, a multilayer neural network, a fern classifier, a decision tree, a Gaussian processes, a probabilistic graphical model, and/or other classification approach) may be used for training a particular behavior and/or other approach.

By way of an illustration of training dog-like behaviors, composite level two fetch 1154 and/or bring to center 1156 behaviors may be trained. The fetch behavior 1154 may activate one or more level one (simple) behaviors, e.g., target approach 1158, base approach 1160 and/or grasp the target 1164 behaviors.

One or more higher level (e.g., level three) composite behaviors may be trained. By way of an illustration, the third level switcher (behavior) 1180 may comprise training the robot to execute fetch behavior if ambient light is above a given level (e.g., sunrise to sunset and/or when lights are on). Training of the apparatus 1150 may comprise training the third level switcher (behavior) 1156 to cause the robot to execute bring to center behavior if ambient light is below a given level (e.g., when it is dark). Training one or more behaviors of a given level (e.g., 1152 of level three) may comprise bypassing activation of behaviors of the level immediately below (e.g., level two). As shown in FIG. 11B, if the component 1152 may select to follow human subtask, the component 1162 of level one may be activated.

Another switcher (e.g., fourth level 1176) may be trained to select between tasks that fetch or follow; if the robot is outside fetch, or otherwise bring the object to the center if inside the house.

Individual modules may support an interface of getting features, human teaching signal, and activation signal. Different modules may include different logic.

Some implementations may include float activations (e.g., from 0 to 1) so that a module scales its output accordingly. This scheme may allow organizing an adaptive weighted mixture of behaviors depending on the context.

In some implementations, e.g., as shown and described above with respect to FIGS. 10A-11B, output of one or more feature extractor components (e.g., output 1032 of the feature extractor 1036 in FIG. 10B) may be shared between one or more adaptive controller components (e.g., 1046, 1050 in FIG. 10B). Such methodology may enable reduction of energy use associated with operation of a plurality of learning components that may be configured to update their learning configuration based on occurrence of a given feature. By way of an illustration, learning processes of the adaptive components 1046, 1050 may utilize a given copy of the feature extractor output without necessitating execution of feature extractor two times.

In some implementations, task hierarchy illustrated in FIG. 11B may be updated as follows.

At a given time interval, feature extractor component 1161 may be operated. Individual feature extractors (e.g., target tracker, gripper state) may be updated. Output of Individual feature extractors (e.g., feature detected or not, location of the feature, and/or other information).

Subsequently, output of feature extractors may be propagated to target destinations. By way of an illustration, components 1164, 1156, 1154 may be informed that the target tracker feature extractor has detected the feature. In some implementations, the propagation process may be configured based on a message queue, a semaphore, a register, software/hardware logical state (e.g., 0,1), and/or other approaches.

Subsequently, components of the hierarchy may be updated. In some implementations, the hierarchy update may comprise update of components associated with an active hierarchy tree. That is, active components (e.g., with active incoming activation indication) may be updated; inactive components (e.g., with inactive incoming activation indication) may remain unaffected and/or not executed.

The output of a feature extraction component may be configured in accordance with a format of input to one or more predictor component(s) (e.g., output 1032 consistent with input format for component 1046, 1050). In some implementations, a feature extractor may provide output comprising a data structure describing a bounding box of the tracked object with a given probability (e.g., 95%) that it is the object of interest and not a false positive. The predictor in the module may be configured to parse the data structure and interpret bounding box and probability separately.

In some implementations, the following considerations may be employed for interface between a feature extractor and a predictor component in order to obtain a given level of interoperability between the feature extractor and predictors:

1) The output of a feature extractor may comprise a plain multidimensional.
2) The non-standard output of a feature extractor may be wrapped into post-processing pipeline that transform the output to be more "standard" for a particular robot. By way of an illustration, a fetch robot may be employed with an off-the-shelf obstacle detector device that may output a device specific output structure. A converter may be utilized with the device in order to transform the specific structure to a multidimensional array suitable for the fetch robot input.
3) The multiple outputs of feature extractor may be homogenized and/or separated into individual feature extractors. By way of an illustration, output comprising 100×100 probabilistic map and a single confidence value may be split into two input channels in some implementations. In one or more implementations, the map values may be multiplicatively and/or additively combined with the confidence value, and/or other approaches.
4) The predictors may be tuned to work on unstructured multidimensional arrays.

In some implementations, in order to reduce energy use during operation of a robotic controller apparatus (e.g., 1150 of FIG. 11B) one or more feature extractors whose output may not be presently utilized (e.g., no subscribing active components) may be deactivated. By way of an illustration, if fetch tree is presently active (e.g., components 1176, 1180, 1154), person tracker feature extractor may be deactivated and/or remain inoperable.

In one or more implementations wherein performance of feature extractor may be improved, one or more feature extractors whose output may not be presently utilized (e.g., no subscribing active components) may remain operational. Operating unsubscribed (unclaimed) feature extractor(s) may expose learning processes of such unclaimed feature extractor(s) to additional sensory input. In some implementations wherein a feature extractor may be operated in accordance with an unsupervised learning process, additional sensory input may improve feature extractor performance by, e.g., reducing number of false positives of feature detection.

Individual learning controller components (e.g., 1012 in FIG. 10A; 1046, 1050 of FIG. 10B; 1070, 1071, 1073, 1075 of FIG. 10C; 1097, 108, 1091, 1093, 1095 of FIG. 10D; components of levels 1108, 1110, 1114, 1116, 1118, of FIG. 11A; components of the hierarchy of FIG. JIB (e.g. 1176, 1180, 1154, 1152, 1156, 1158, 1160, 1162, 1164 of FIG. 1B)) may be configured in accordance with a respective control process selected from a variety of approaches. The learning components may be configured to support a method (e.g., message queue) for receiving information related to feature output, interface for receiving teaching indication (e.g., 1018 in FIG. 10A), and/or activation signal (e.g., 1016 in FIG. 10A).

In some implementations of e.g., fetch behavior comprising "target approach", "base approach" and "grasping" may be implemented using a BrainOS™ approach, e.g., such as described in U.S. patent application Ser. No. 14/244,888 "LEARNING APPARATUS AND METHODS FOR CONTROL OF ROBOTIC DEVICES VIA SPOOFING", filed Apr. 3, 2014, Ser. No. 13/918,338 entitled "ROBOTIC TRAINING APPARATUS AND METHODS", filed Jun. 14, 2013, U.S. patent application Ser. No. 13/918,298 entitled "HIERARCHICAL ROBOTIC CONTROLLER APPARATUS AND METHODS", U.S. patent application Ser. No. 14/244,890 entitled "LEARNING APPARATUS AND METHODS FOR CONTROL OF ROBOTIC DEVICES", filed Apr. 3, 2014, Ser. No. 13/918,338 entitled "ROBOTIC TRAINING APPARATUS AND METHODS", filed Jun. 14, 2013, U.S. patent application Ser. No. 13/918,298 entitled "HIERARCHICAL ROBOTIC CONTROLLER APPARATUS AND METHODS", filed Jun. 14, 2013, Ser. No. 13/907,734 entitled "ADAPTIVE ROBOTIC INTERFACE APPARATUS AND METHODS", filed May 31, 2013, Ser. No. 13/842,530 entitled "ADAPTIVE PREDICTOR APPARATUS AND METHODS", filed Mar. 15, 2013, Ser. No. 13/842,562 entitled "ADAPTIVE PREDICTOR APPARATUS AND METHODS FOR ROBOTIC CONTROL", filed Mar. 15, 2013, Ser. No. 13/842,616 entitled "ROBOTIC APPARATUS AND METHODS FOR DEVELOPING A HIERARCHY OF MOTOR PRIMITIVES", filed Mar. 15, 2013, Ser. No. 13/842,647 entitled "MULTICHANNEL ROBOTIC CONTROLLER APPARATUS AND METHODS", filed Mar. 15, 2013, and Ser. No. 13/842,583 entitled "APPARATUS AND METHODS FOR TRAINING OF ROBOTIC DEVICES", filed Mar. 15, 2013, each of the foregoing being incorporated herein by reference in its entirety.

For example, the component 1154 of FIG. 11B may comprise a perceptron prediction process configured to utilize features from the target tracker, base tracker, and gripper state. The fetch switcher 1054 may further comprise a persistent WTA switching process with the winner takes all output layer configured to select one of the outputs. Activations produced by the component 1054 may comprise binary output with a single output being assigned active state (e.g., 1) while the remaining outputs being assigned inactive state (e.g., 0).

In some implementations, components of a control hierarchy (e.g., Individual learning controller components (e.g., 1012 in FIG. 10A; 1044, 1050 of FIG. 10B; 1070, 1071, 1073, 1075 of FIG. 10C; 1097, 108, 1091, 1093, 1095 of FIG. 10D; components of levels 1108, 1110, 1114, 1116, 1118, of FIG. 11A; components of the hierarchy of FIG. 11B (e.g. 1176, 1180, 1154, 1152, 1156, 1158, 1160, 1162, 1164 of FIG. 11B)) a learning component may comprise feature extraction process (e.g., a classifier). A control apparatus may be configured for operating in a variety of environments by providing shared feature extractors (e.g., 1040 in FIG. 10B) and dedicated (e.g., built-in) feature extractors. In some implementations of adaptive feature extractors, the feature extractor may be logically disposed within the learning component. Configuration of the adaptive control process and the feature extraction process may be stored subsequent to training for future use.

In some implementations wherein a given feature may be used by multiple components of a hierarchy (e.g., output 1032 of component 1036 in FIG. 10B) the respective feature extractor may comprise a standalone logical component whose output may be shared between a plurality of control components so as to reduce computational load associated with detection of the given feature.

In some implementations, a control hierarchy may be configured to operate using floating activation indications (e.g., configured in the range between 0 and 1). Such approach may allow for an adaptively weighted mixture of behaviors depending on the sensory context.

Figure 27:
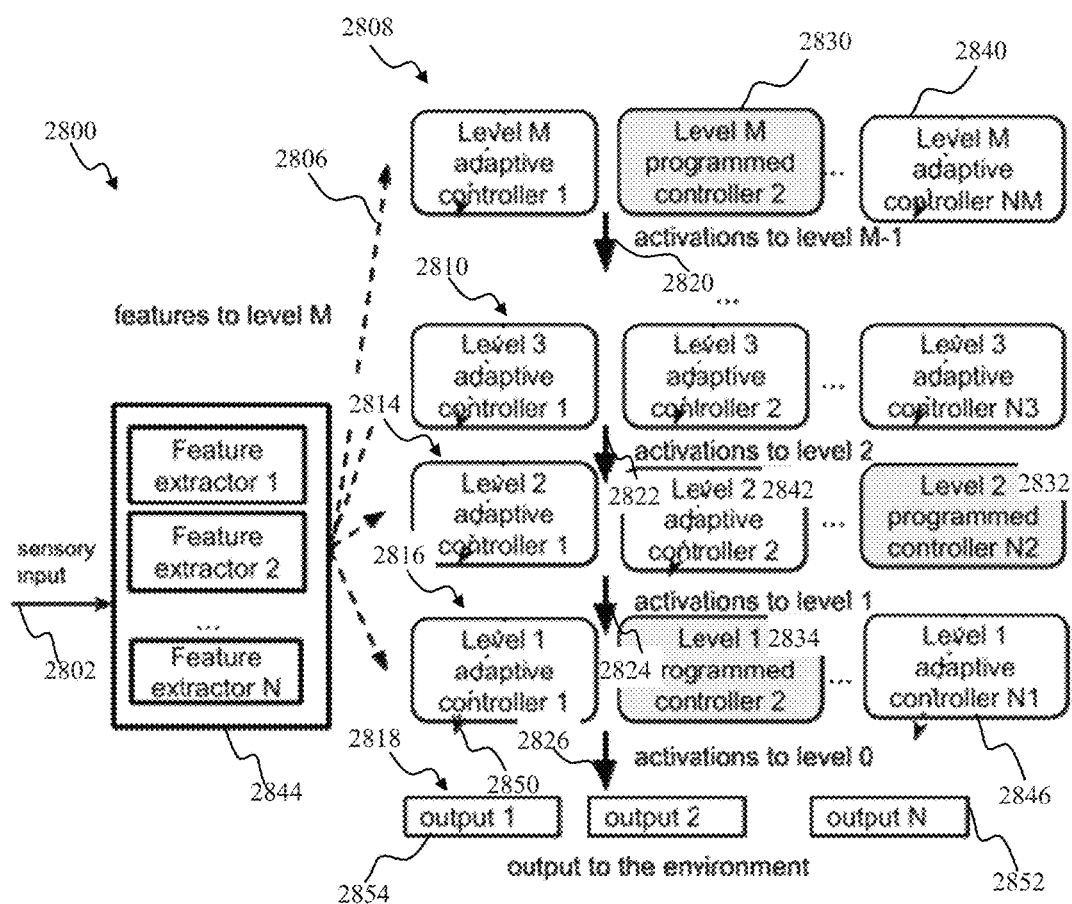
FIG. 27 illustrates a multi-level learning controller apparatus hierarchy comprising adaptive and pre-configured components, according to one or more implementations.

FIG. 27 illustrates a multi-level learning controller apparatus hierarchy comprising adaptive and pre-configured components, according to one or more implementations. The apparatus 2800 may comprise a feature extractor component 2844 comprising one or more feature extractors. Individual feature extractors in FIG. 27 may be configured to determine occurrence of a given feature (e.g., an orange ball) in sensory input 2802. In some implementations, the sensory input 2802 may comprise audio, visual, motor feedback, robot state, and/or other information including. e.g., such as described above with respect to FIGS. 10A-11B.

The apparatus 2800 may comprise an adaptive controller comprising a hierarchy of components. Components of the hierarchy of FIG. 27 may be configured in a plurality of levels, e.g., 2808, 2810, 2814, 2816, 2818. In some implementations, activation indication output produced by a component of one level (e.g. M-th) in the hierarchy may be provided to components of the subsequent lower level (e.g., M-1). Output of a component of an upper level in the hierarchy may be provided to one or more components of lower level(s) in the hierarchy. Activation output of hierarchy levels of FIG. 27 is denoted generally and without specific component-to-component mapping by arrows 2820, 2822, 2824, 2826. Connectivity mapping between components of the hierarchy may be configured in accordance with a given application.

Components of the hierarchy of FIG. 27 may be configured to receive feature output from feature extractor component 2844. Output 2806 may be configured based on analysis of sensory input 2802, obtained e.g., such as described above with respect to FIGS. 10A-10D.

Activation output of the lowest level in the hierarchy (e.g., the output 2826 of level 2816) may comprise a plurality of active indications configured to enable simultaneous activation of multiple output channels (e.g., 2852, 2854) of level 2818 (e.g., multiple joints of a robotic arm).

In some implementations wherein the activations may comprise binary indications, the hierarchy may be represented using a graph. At a given time interval, an active path within the graph may be used to provide an activation indication from a higher level switcher (behavior) to the outputs. Control components in an active path. Inactive components may remain not-executed (e.g., dormant and/or disabled).

Components of the hierarchy of FIG. 27 may comprise learning components and pre-programmed (pre-configured) components. As used herein the term pre-programmed (pre-configured) component may be used to describe a process that once configured (e.g., via programming, prior training, and/or other means) may be operable in absence of teaching input. In some implementations, e.g., such as described in U.S. patent application Ser. No. 14/632,842 entitled "APPARATUS AND METHOD FOR PROGRAMMING AND TRAINING OF ROBOTIC HOUSEHOLD APPLIANCES", filed Feb. 26, 2015, the foregoing being incorporated herein by reference in its entirety, a pre-configured process may comprise an array of weights of an artificial neuron network, a table of a classifier (e.g., RKNN) that has been previously trained. The term learning component/process may be used to describe a process configured to adapt one or more parameters (learning parameters) of the process based on an external training input (e.g., the input 1018 in FIG. 10A and/or 2850 in FIG. 27).

The apparatus of FIG. 27 may comprise a plurality of pre-configured (programmed) components (e.g., 2830, 2832, 2834) and adaptive (learning components), (e.g. 2840, 2842, 2844, 2846).

By way of an illustration of FIG. 27, level 2816 programmed controller 2834 may comprise a pre-programmed (hard wired) algorithm for obstacle avoidance that may use sensor input from one or more distance sensors. An adaptive controller of an upper level (e.g., 2842 in some implementations) may learn to select between an adaptive behavior (e.g. target approach 2846) and the pre-programmed obstacle avoidance behavior 2834 if obstacle is detected in sensor data. In some implementations, the pre-programmed process may be configured to implement a pre-programmed switcher configured to select between one adaptive behavior during one time (e.g., during daylight hours) and another adaptive behavior during another time (e.g., during dark portion of the day) based on current time and/or light sensor. Such switching may enable a user to train individual behaviors during different times of the day.

A hierarchy comprising programmed and trained behaviors may be utilized to implement a variety of tasks. In some implementations, repeatable tasks may be pre-programmed (e.g., prepare coffee at 10 am daily); other tasks may be more readily trained (e.g., obstacle avoidance). Combining programming and training may provide individual users with flexibility to implement a variety of target application using the same general framework.

Notice that for ease of use some features may be hidden or optimized with UI: automatic selection of module type for switchers, no FE selection to avoid possible training bugs.

APPENDIX B.1-B.7 present computer code illustrating an exemplary implementation of a multi-level learning controller apparatus hierarchy comprising adaptive and pre-configured components, according to one or more implementations.

APPENDIX B.1 illustrates BrainOS™ back-end component comprising, module dynamic_graph_execution (self) (lines 718 through 885) configured to implement a feature extractor loop, propagation of active indication through the hierarchy graph, application of outputs, and/or other components.

APPENDIX B.2 illustrates implementation of BrainOS™ components, comprising, e.g., loading of previously trained behavior configurations, combiner implementation, predictor implementations, and/or other components.

APPENDIX B.3 illustrates one implementation of a bypass switching component configured to update selection choice only if received strong enough correction. Such implementations enables the control system to maintain selected behavior in absence of input.

APPENDIX B.4 illustrates one implementation of environment control components configured to Module that redirects corrections and activations to the environmental control APPENDIX B.5 illustrates one implementation of BrainOS™ backend interface. The component i_brainos_backend.py describes an interface that shows a set of actions possible on the modules.

APPENDIX B.6 illustrates one implementation of BrainOS™ predictor and/or combiner components.

APPENDIX B.7 illustrates configuring a hierarchy of components in accordance with one or more implementations. The implementation of APPENDIX B.7 provides for creation, training, saving and loading of a hierarchy of behaviors for effectuating a target approach behavior. If the target is on the right, a controller may provide appropriate torques to the wheels in order to turn right; if the target is on the left, a controller may provide appropriate output (motor torque) to turn left. The controller of APPENDIX B.7 may comprise a two level hierarchy comprising two lower-level components configured to provide appropriate output to execute left/right turns and a higher-level switcher component configured to activate (select) one of the lower level behaviors based on the position of the target.

In some implementations, e.g., such as described above in connection with FIG. 4 and/or 10A-10B a random k-nearest neighbors (RKNN) approach may be used for associating sensory context with one or motor actions. In some implementations, the RKNN methodology may comprise online learning of predicting output y (e.g., motor commands) based on the input (e.g., plurality of features detected in sensory input).

The RKNN process may utilize a plurality of sensory inputs in order to predict motor command for controlling operation of a robot. In some implementations, the sensory input may comprise inputs characterized by different degrees of redundancy. In some implementations, the redundancy may be characterized by number of degrees of freedom (e.g., independent states) that may be conveyed by the input. By way of an illustration, a binary input (for example "ON"/"OFF") indicative of wheel rotation (or lack thereof), proximity sensor output (ON, OFF), battery level below threshold, and/or other binary input may be characterized by lower level of redundancy compared to other inputs (e.g., video, audio). In some implementations of robotic vision based navigation, the input space may be regarded as having high dimensionality and/or highly redundant, compared to other inputs (e.g., audio, touch). In one or more implementations, an input characterized by number of dimensions that may at least 10 times that of be greater than number of dimensions of another input may be referred to as highly dimensional and/or highly redundant, compared to the other input.

When a highly redundant input may be augmented with data of lower redundancy, the highly redundant data may overwhelm the less redundant data when determining response of a KNN classifier.

The RKNN process may partition available data into subsets comprising a given number of features from the lower-dimension/lower redundancy data. The given number of features associated with lower-dimension/lower redundancy data may be referred to as the mandatory feature(s). As used herein the term feature may be used to describe one or more integer or floating point values characterizing the input, e.g., the presence or absence of an edge, corner, shape, texture, color, object, at particular locations in the image, values of pixels in an image, patches of color texture, brightness in the image, and/or in the image as a whole; properties of the mentioned features, such as size, orientation, intensity, predominance with respect to the surround, of an edge, corner, shape, texture, color, object; the position of one of the features in the image or the relative position of two or more of the above mentioned features; changes in features across consecutive frames—changes in position (optic flow), intensity, size, orientation; the pitch, intensity, spectral energy in specific bands, formants of sounds, the temporal changes thereof, disparity measure between two or more images, input from proximity sensors (e.g., distance, proximity alarm, and/or other), motor feedback (e.g., encoders position), motion sensor input (e.g., gyroscope, compass, accelerometer), previous motor commands or switching commands, a binary/Boolean categorical variable, an enumerated type, a character/string, and/or practically any characteristic of the sensory input.

Mandatory-feature RKNN approach may be utilized for determining associations between occurrence of one or more features (also referred to as context) and control output configured to cause an action by a robotic device.

Predicted output associated with individual subsets may be combined (e.g., averaged) to produce predicted output of the RKNN process. Selecting the number of neighbors within a subset, the subset size, and/or the number of subsets may be used to trade-off between speed of computations, and accuracy of the prediction.

By way of an illustration of operation of a robotic device controller (e.g., 400 in FIG. 4A), sensory input (e.g., 402 comprising a sequence of video frames, inertial motion measurement, motor actuator feedback) may be analyzed using RKNN process in order to determine (predict) motor control signal (418). Sensory input may comprise a plurality of features (e.g., representations of objects determined using video data). In some implementations, the RKNN process may comprise configuring a plurality of N KNN classifiers to process randomly selected subsets of features. For a given classifier C; (e.g., 1408 in FIG. 14), a random subset $x_i$ of features may be selected from a pool of potential features $x=\{x_1 \ldots x_n\}$. As used herein, the term "classifier" may be used to describe a data processing operation configured to provide an output y (e.g., motor control command) based on analysis of a plurality of inputs $x_i$ (e.g., pixels of a digital image).

During training, for a given occurrence of the input x (e.g., sensory features) and the output y (e.g., training input/correction signal) the associations may be determined using methodology described with respect to FIGS. 14-15 below.

The selection process may comprise, for a given classifier $C_i$ of the plurality of classifiers (i=1 ... N):
    a) selecting a subset $x_i$ of features x, wherein individual subsets may comprise a mandatory feature (e.g., $x_1$ in FIG. 14); and
    b) appending the entry ($x_i$, y) to the classifier $C_i$.

Figure 14:
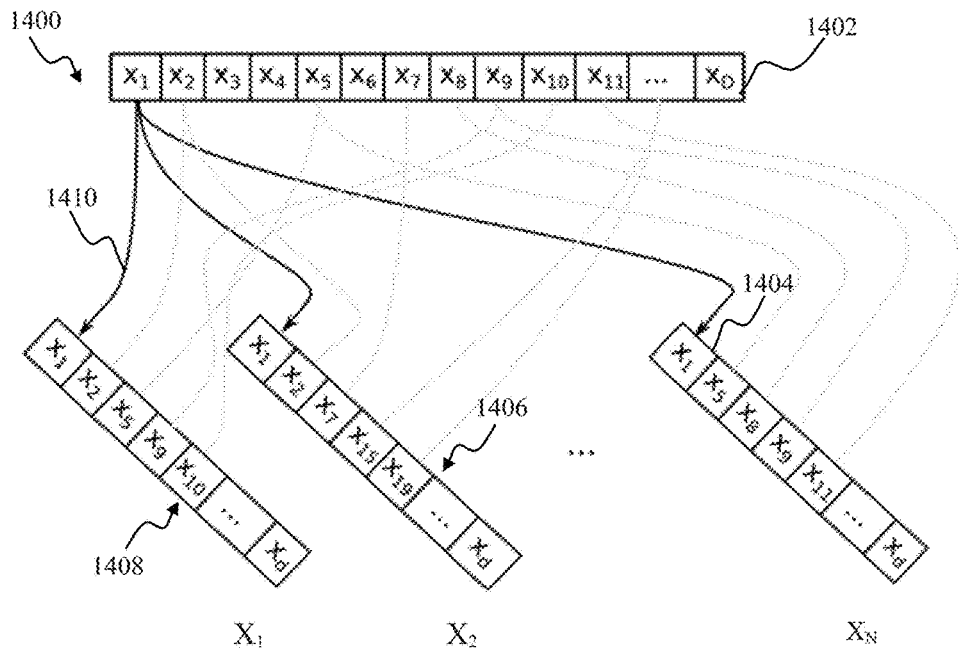
FIG. 14 is a block diagram illustrating selection of a plurality of subsets configured using a mandatory feature RKNN approach according to one or more implementations.
Figure 15:
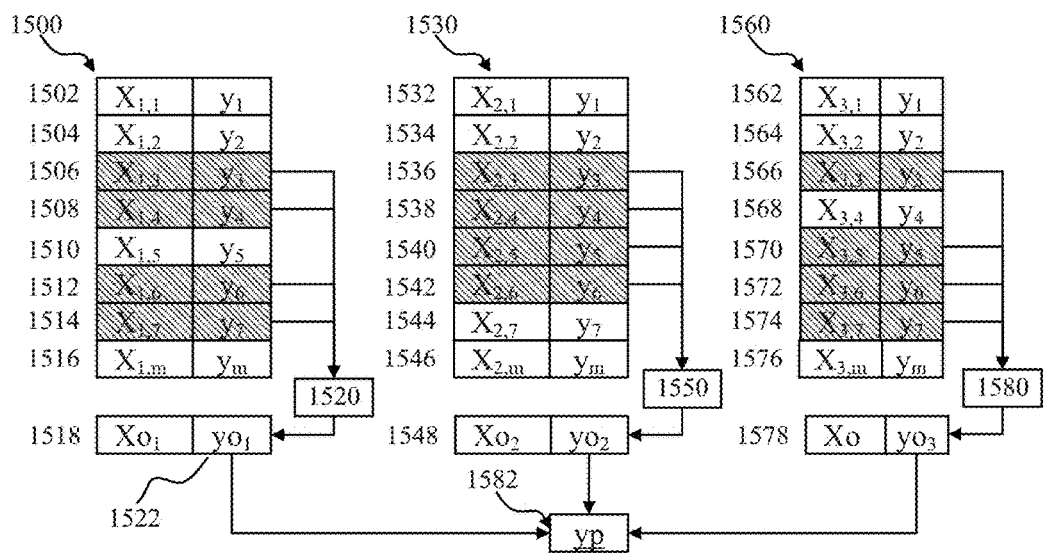
FIG. 15 illustrates determination of a predicted output by an RKNN classifier apparatus, according to one or more implementations.
Figure 17:
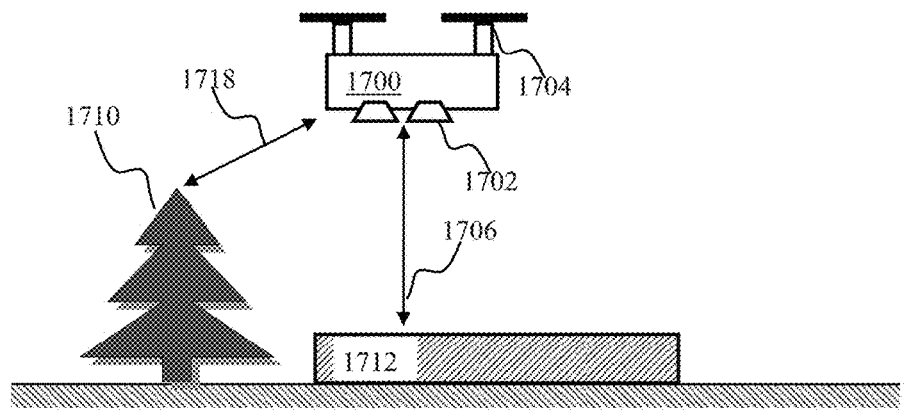
FIG. 17 is a graphical illustration depicting an exemplary unmanned robotic apparatus comprising salient feature determination apparatus of the disclosure configured for autonomous navigation, in accordance with one or more implementations.

In some implementations, individual classifiers Ci may comprise a table (e.g., the tables 1500, 1530, 1560 in FIG. 15). In the implementation illustrated in FIG. 14, the first feature $x_1$ may denote the mandatory feature that may be selected for classifiers Ci in every KNN classifier's feature set. The rest of the d−1 features may be selected at random from the population of features (e.g., the input of D features, where D>d). In one or more implementations, a single classifier C1 may be configured based on a randomly selected d−1 features from highly redundant input and one (or more) features from less redundant input.

During operation, in order to compute the output y for a given input x, one or more (k) entries within individual classifiers Ci may be used to determine N output values yi of the output y. For a given classifier Ci, individual output yi may be determined based on a first statistical operation of the k-values of y obtained during training. In one or more implementations, the first statistical operation may comprise determination of a mean, median, mode, adaptively weighted mean, and/or other operation. The output y may be determined using a second statistical operation configured based on the N outputs yi of individual classifiers. In one or more implementations the second statistical operation may comprise determination of a mean, median, mode, adaptively weighted mean, and/or other operation.

FIG. 15 illustrates an exemplary configuration for producing output yp configured based on input x using N=3 classifiers and k=4 nearest neighbors. Tables 1500, 1530, 1560 in FIG. 15 may represent three classifier Ci instances corresponding to, e.g., index selection described by elements 1408, 1406, 1404. Individual rows 1502, 1504, 1506, 1508, 1510, 1512, 1514, 1516, 1532, 1534, 1536, 1538, 1540, 1542, 1544, 1546, 1562, 1564, 1566, 1568, 1570, 1572,

1574, 1576 may denote training pairs (x,y) produced during training at time instances t1, t2, t3, t4, t5, t6, t7, tm. In tables 1500, 1530, 1560, $X_{ij}$ may denote input wherein:

index i may denote the classifier (i=1 ... 3);
index j may denote the time instance (i=1 ... n);
yj may denote the training signal, Xo may denote input during operation;
$yo_i$ may denote individual classifier output; and
yp may denote the predicted signal.

For a given time instance, the inputs $X_{1,1}$, $X_{2,1}$, $X_{3,1}$ in rows 1502, 1532, 1562, respectively, may be produced using a respective plurality of input features (e.g., the input 1402 in FIG. 14). Rows 1518, 1548, 1578, may denote data pairs (x,y) corresponding to classifier operation configured to produce a predicted output yp based on occurrence of the input Xo.

Hashed rectangles in FIG. 15 (e.g., as in row 1506) may denote the nearest neighbors as determined during operation of a respective classifier (e.g., 1500). Components 1520, 1550, 1580 may denote operation that may be used to determine classifier output. In one or more implementations, the operations of components 1520, 1550, 1580 may comprise of one or more statistical operations that may comprise determination of a mean, median, mode, adaptively weighted mean, adaptively weighted selection, and/or other methodologies that may be used to determine classifier output (e.g., 1522) based on a plurality (e.g., 4 in FIG. 15) nearest neighbors (e.g., 1506, 1508, 1512, 1514). In some implementations, output $yo_1$ $yo_2$ $yo_3$ of individual classifiers 1500, 1530, 1560 may differ from one another due to different nearest neighbor selection. As illustrated in FIG. 15, rows 1506, 1508, 1512, 1514 may be selected by the classifier 1500, rows 1536, 1538, 1540, 1542 may be selected by the classifier 1530, rows 1566, 1570, 1572, 1574 may be selected by the classifier 1560. Outputs of individual classifiers 1500, 1530, 1560 may be utilized in order to determine the predicted output yp using component 1582. In one or more implementations, the operations of the component 1582 may comprise of one or more statistical operations that may comprise determination of a mean, median, mode, adaptively weighted mean, and/or other methodologies that may be used to determine the output 1582).

The dimension d of the subset xi may be determined based on the dimension D of the input x as follows, in some implementations:

$$d = \text{floor}(\sqrt{D}). \quad \text{(Eqn. 16)}$$

Selecting processing parameters (e.g., d, N, k, and/or statistical operations) a trade-off between speed and accuracy may be adjusted.

With heterogeneous, multimodal feature vectors, adjusting processing parameters (e.g., d, N, k) may cause modification of the relative impact of the different types of features. By way of an illustration, if D=1024*1024*3+3, d may be determined using Eqn. 16, (d=1773). Accordingly, individual classifier may be characterized by a probability of p=0.0017 of using an audio feature. In order for an audio feature to be of influence with a level of certainty (e.g., greater than 50%) an impractically large ensemble size N may be required to see any effects of the audio features.

In some implementations of on-line learning for robot navigation, the input vector x may be configured by concatenating the RGB values of the pixels in an image (e.g., obtained using video camera 166 in FIG. 1) and an additional 1-channel binary signal derived from the motor state. The mandatory feature (e.g., the feature x1 described above with respect to FIG. 14) may be selected to comprise the 1-dimensional binary motor state.

In order to facilitate contributions from different types of signals for determining a distance measure between features in a metric space (e.g., Euclidian distance), data from highly redundant input (e.g., the RGB pixel values) may be normalized. Various other distance measures (metrics) may be utilized, e.g., Mahalanobis, Manhattan, Hamming, Chebyshev, Minkowski, and/or other metrics.

In some implementations, the normalization may comprise shifting and/or scaling input features to a given value range (e.g., A1=64 to A2=196 for an 8-bit pixel value, 0 to 1 range, and/or other range). In one or more implementations, the normalization may be configured based on determining an on-line estimate of the mean and standard deviation of feature values to obtain z-score for individual feature (pixel). In one such implementation, for a given pixel (e.g., pixel at location (i1,i2)) a pair of values may be stored in history memory: one for the pixel mean and another for the pixel standard deviation. In some implementations, one or more parameters related to history of the input (e.g., pixel statistics) may be computed over a given interval, and/or the total duration of training. In one or more implementations, the learnings process may be configured to enable a user to reset contents of the parameter (e.g., pixel statistics).

In some implementations, data for one or more inputs may be scaled by a parameter NF, where NF is configured based on the overall number of features of a given feature types (i.e., the number of pixels in a subset t). In some implementations, the scaling parameter may be selected from the range between $\sqrt{NF}$ and 10×NF.

In some implementations, feature scaling operation may comprise determining an average distance measure for a plurality of input feature instances (e.g., distance between 2-100 images for images acquired at 25 fps) and scaling the input in accordance with the average distance measure. Various scaling implementations may be employed, e.g., scaling the less redundant input, scaling the highly redundant input, and or combination thereof. The scaling operation may enable reducing disparity between contributions to the distance determination from a highly redundant input (e.g., video and/or other input) and less redundant input (e.g., audio, touch sensor, binary, and/or other input).

The feature scaling may be configured based on an observed and/or an expected characteristic or characteristics of a feature that may be salient to the action. By way of an illustration of an implementation of vision based robotic navigation, size of a target, e.g., number of pixels and/or cumulative pixel value corresponding to a ball 174 in FIG. 1, may be used to scale pixel values within a visual frame such that pixels of the target associated with the rescaled input may contribute comparably to the distance determination as a binary input feature (e.g., indicative of wheel rotation (or not), proximity sensor output (ON, OFF), battery level below threshold, and/or other binary input). In some implementations, the scaling configured based on observed and/or expected characteristic of a feature may be referred to as input equalization.

When determining feature-action associations, traditional RKNN methodologies of the prior art may discount data provided via sensor modalities (e.g., audio, touch) characterized by fewer dimensions (fewer features) compared to other modalities (e.g., video). In some implementations of the present disclosure, a normalization operation may be applied to data of individual sensory modalities. The normalization operation may be used to increase and/or decrease contribution of data of one modality relative contribution of data of another modality to the RKNN distance determination. In some implementations, the normalization may comprise selecting a given number of mandatory features (e.g., the feature x1 described above with respect to FIG. 14). Selecting a number m of mandatory features may ensure that at least m out of d features may contribute to distance determination. In the exemplary implementation described above with respect to FIG. 14, probability of the mandatory occurrence in the feature subset $x_i$ is equal one: P=1. Probability of occurrence of the remaining features in the subset $x_i$ is P0<1.

In some applications wherein data from two modalities with greatly different number of features (e.g., video and audio) may be used with RKNN, distance between any two samples may be dominated by the sensory modality with greater number of features (e.g., video).

Equalization may be applied so that contribution of individual sensory modality on expected distances may be comparable relative contribution from another modality data. In some implementations, the equalization may comprise determining an on-line estimate of the mean and standard deviation of individual features; using the on-line estimates to calculate a normalizing constant Cs for individual sensory modality s such that the expected Euclidean distance between two samples, measured only using the features in modality s is 1.0. Weighting data of a given modality (to further reduce the mean squared error) as training parameters that may be optimized during training.

RKNN approach may be employed for determining the relative importance of the features for producing a given output. Feature relevance may be determined based on an error measure produced by individual KNN classifiers that contain those features. In some implementations, more relevant (e.g., "better") feature for a given output, may correspond to a lower error of individual KNN classifier(s) that may contain that feature.

In some implementations, e.g., such as described with respect to FIGS. 14-15, computational load on a feature detection system may be reduced by selecting a small number of classifiers N, e.g., N<D/d, so that a portion of the total available features may be used by a given classifier instance. In some implementations, the number of classifiers may be selected from range between 3 and 10, and number of used features may be selected between 5% and 50% of the total available features. By way of an illustration, for input comprising a digital frame of 12×12 pixels and three color channels (e.g., RGB, YUV, and/or other color model), using N=5 classifiers corresponds to d=floor($\sqrt{12\times12\times3}$)=20, features per classifier. Accordingly, d*N/D=5*20/432=23% of the available features from the original data may be used.

In one or more implementations, the computational load for a classification system may be characterized by being able to perform between 10 and 20 classifications per second (CPS) processing video input comprising a sequence of RGB frames of 12×12 pixel resolution refreshed at 25 frames per second. The processing system may comprise an embedded computer system comprising a processing component (e.g., Qualcomm Snapdragon 805/806) comprising a CPU component capable of delivering 210 Mega-Floating-point Operations Per Second (MFLOPS) and a GPU component capable of delivering 57 GFLOPS with maximum combined power draw of no more than about 2.5 W.

In some implementations, the RKNN may be utilized in order to determine a feature ranking parameter at a target rate (e.g., 15 CPS) while conforming to the processing load capacity and/or power draw limit by periodically re-initializing individual KNN classifiers on a rotating basis (i.e., not all at once) with a random set of features.

In order to re-populate the KNN classifier subsets (e.g., 1404, 1406, 1408 in FIG. 14), a history buffer may be utilized in order to store previously occurring training data (e.g., instances of the input 1402 in FIG. 14). Upon producing the updated random indexes, the feature relevance may be obtained using the history buffer data. In some implementations, an updated set of features may be determined randomly "just in time," or everything could be scheduled at once when the whole ensemble is first initialized to deterministically establish how much data would be used to calculate feature importance.

In some implementations of RKNN classifiers, feature assignment for a KNN classifier may be biased using a random process. By way of an illustration, random process used for selection of indexes for a classifier may be biased to increase probability of features with a higher utility within the input (e.g. 1402 in FIG. 14) to be included in the subset (e.g., the subsets 1404, 1406, 1408). The magnitude of the bias regulating the trade-off between how quickly the subset may converge to a set of features versus how much time the subset may spend exploring new combinations of features.

In one or more implementations of RKNN, ensembles evolutionary algorithms (EA) may be employed. The evolving population may comprise population subsets of the classifiers. The genotype/phenotype characterizing the EA process may comprise the particular subset of features chosen for a given classifier. Low-utility classifiers may be culled from the population. New classifiers are may be produced by recombining and/or mutating the existing genotypes in the population of classifiers. The EA approach may produce a higher-performing ensemble of KNN classifiers, compared to existing approaches.

Apparatus and methods for behavioral undo during training of robots are disclosed herein, in accordance with one or more implementations. In some implementations, a robotic device may comprise a controller operating a software component (e.g., the BrainOS® software platform) configured to enable training. A user may control/training the robot with a remote device (e.g., comprising a Gamepad® controller and an iOS® application, and/or a handset device (e.g., a smartphone)). Training of the robot's controller may be based on the user observing robot's actions and sending one or more target control commands to the robot via the training handset. The trained controller of the robot may comprise a trained configuration configured to enable autonomous operation (e.g., without teaching input) by the robotic device. The trained configuration may be stored. A saved configuration may be loaded into the robot being trained thereby providing one or more trained behaviors to the robot. In some implementations, the trained configuration may be loaded to one or more other robots in order to provide learned behaviors. Subsequent to loading of the saved configuration, the controller learning process may match process configuration being present during saving of the configuration.

In some implementations, the BrainOS configuration may be stored (saved) automatically based on timer expiration (e.g., periodic saving) and/or based on an event (e.g., triggered by a user and/or based on a number of issued control commands).

The autosave timer interval T may be configured by the user via, e.g., interface of the training handset. In some implementations, the user may configure the controller process to save BrainOS configuration when the user may issue a command (correction) to the robot using the training handset. In one or more implementations, the training configuration may be saved upon receipt of n commands from the user (n≥1).

In some implementations, user commands (corrections) may arrive in one or more clusters (e.g., a plurality of commands) that may be interleaved by periods of user inactivity (e.g., training a race car to traverse a racetrack). In one or more implementations, a given command (e.g., the first, the last, and/or other command) in the cluster may trigger saving of the configuration.

In one or more implementations, the BrainOS may be configured to execute periodic and event-based autosave mechanisms contemporaneously with one another.

Trained behaviors of the robotic device may be configured based on learning of associations between sensory context (e.g., presence of an obstacle in front of the robotic vehicle) and a respective action (e.g., right turn) during training.

It may be beneficial to remove one or more trained behaviors from the trained configuration of the controller. In some implementations, the trained behavior removal may be based on one or more of performance below a target level, changes of the robot configuration (e.g., replacement of a wheel with a skate), changes in the robot's environment, learning of erroneous associations, and/or other causes.

The BrainOS software platform may be configured to save one or more parameters characterizing the learning process and/or the learned behaviors. In some implementations, the saved parameters may be used to produce (recreate) the BrainOS instance, for example, specify the sensory processing algorithms used for learning, describe learning algorithms. In one or more implementations, the saved parameters may be used to characterize learning parameters (e.g., the learning rate, weights in an artificial neuron network, entries in a look up table, and/or other parameters).

For example, the configuration saving may comprise storing of weights of a neural network may characterize mapping of the sensory input to motor outputs; and/or weights of feature extractor network component that may be used to process the sensory input.

The BrainOS software platform may be configured to enable users to selectively remove a learned behavior (and/or a portion thereof) via an undo and/or time machine operation.

At a given time, a user indication may be used to trigger an UNDO operation. In some implementations, the UNDO operation may comprise loading of the previously saved configuration. By loading at time t1 the configuration saved at time t0<t1, the robot controller effectively 'forgets' what it learned in time interval t0<t<t1.

The user UNDO indication may be configured based on one or more of the user activating a user interface element (e.g., a physical and/or virtual touch-screen button), a voice command, a gesture, and/or other actions, in one or more implementations. One or more undo indications may be utilized in order to remove multiple behaviors (and/or multiple versions of a given behavior). By a way of an illustration, pressing Ctl+Z in a MS Word® may effectuate UNDO of successive edits. Similarly, providing a plurality of UNDO indicating may cause removal of multiple learned associations.

Figure 5:
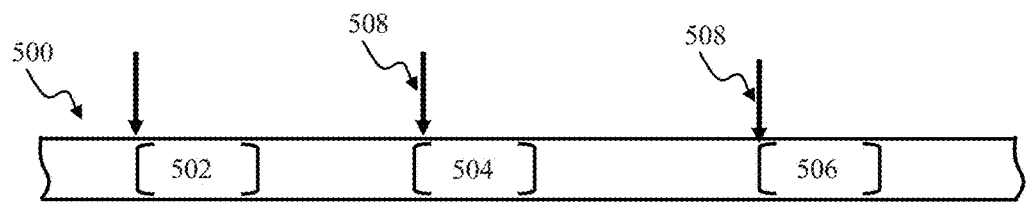
FIG. 5 is a functional block diagram illustrating use of a timeline comprising multiple bookmarks for implementing training undo functionality, according to one or more implementations.
Figure 6:
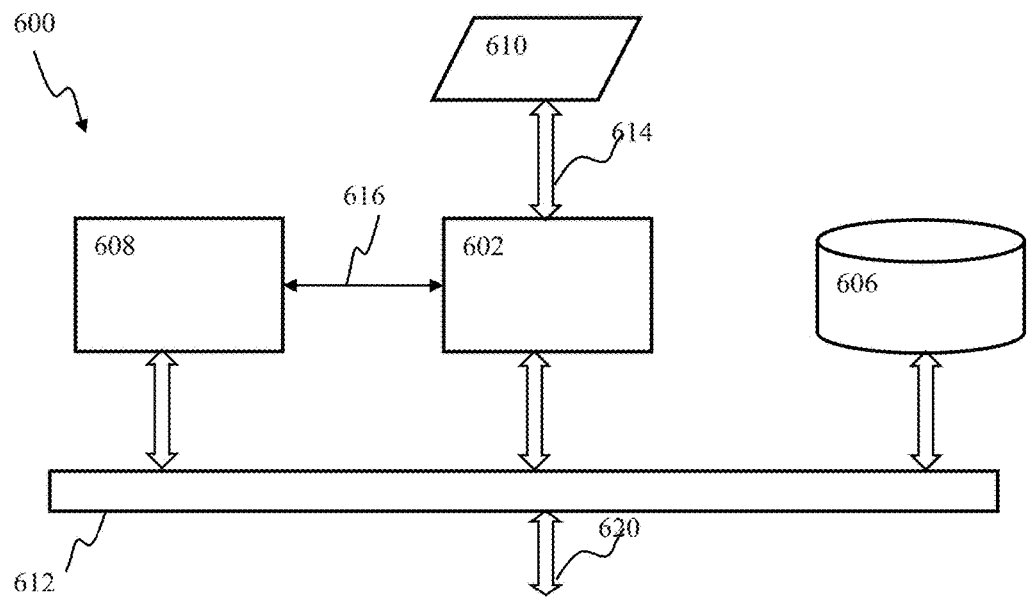
FIG. 6 is a functional block diagram depicting a computerized data processing system configured for salient feature detection, according to one or more implementations.
Figure 7:
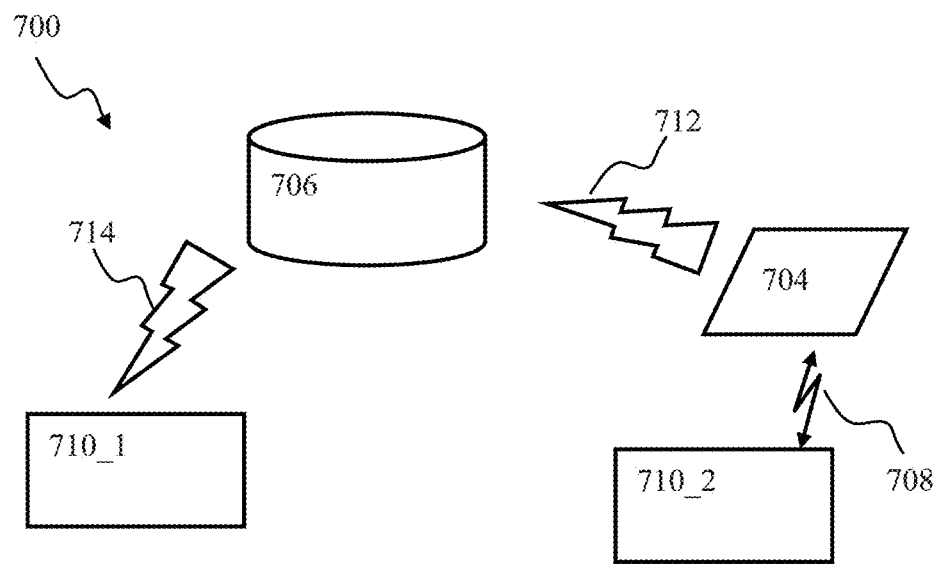
FIG. 7 is a functional block diagram depicting a system comprising salient feature detection apparatus, according to one or more implementations.

In one or more implementations, the undo operation may be effectuated using a timeline comprising, e.g., a plurality of bookmarks (e.g., shown in FIG. 5) indicative of one or more date/time, context, action, and/or other attributes of association learning. A user may select a given bookmark in order to restore (undo) the learning configuration to the state corresponding to time of the bookmark. For example, user may tap on a selected marker (representing a saved state) a slider may be used to navigate on this timeline combination of above.

Combiner apparatus and methods are disclosed herein, in accordance with one or more implementations. In some implementations of supervised training of robots, control instructions (also referred to as corrections) produced by the trainer (e.g., human) may be combined with control instructions produced by the robot controller instructions (predictions).

In some implementations, the trainer may be provided with the control of the robot during training. Upon completion of the training, the robot may be configured to operate autonomously. In one or more implementations, training may comprise periods of autonomous operation and periods of learning, wherein trainer's control input may be combined with the robot's internally generated control.

The BrainOS software platform may be configured to enable online learning wherein trainer's input may be combined with the internally produced control instructions in real time during operation of the robotic device. That is, the input from the trainer may be applied to have an "on-line" effect on the robot's state during training. The robot not only learns to move forward in this sensory context, but it also actually moves forward into some new sensory context, ready to be taught from the new location or configuration.

By way of an illustration, when training a remotely controlled car using a joystick, the car may be trained to navigate a straight trajectory (e.g., autonomously move forward). Subsequently, a trainer may elect to commence training of one or more turn behaviors (e.g., turn left/right/turnaround/drive in a circle and/or other maneuvers). The trainer may use the joystick to provide left/right turn commands to the car to train it to turn. In one or more implementations, the trainer may assume the control during the turn action and/or provide the turn instructions incrementally (e.g., in three 30° increments to complete 90° turn).

Conversely, the car may be trained to follow a circle. In order to train the car to follow a straight line the trainer may utilize the joystick to provide the training input. In some implementations, the trainer may utilize the joystick forward position in order to override the car internal control input and to cause it to proceed forward. In one or more implementations, the trainer may utilize the joystick left/right position in order to provide an additive control input so as to guide the car to proceed in a straight line.

Controller of the robot may comprise a combiner component configured to effectuate the process of combining the training input (correction) with the internally generated control (prediction). In some implementations, the combiner may be configured to allocate a greater priority (e.g., larger weight) to the correction input, e.g., to implement "the trainer is always right" mode of operation. When the robotic platform (e.g., the car) may comprise multiple degrees of freedom (DOF), the training process may be configured to operate (e.g., train) a given DOF at a given time.

In some implementations, the combiner component may be operable in accordance with a Full Override process, wherein input by the trainer takes precedence (e.g., overrides) the internally generated (predicted) control signal. When operable in the override mode, the controller may learn the context-action association and produce predicted control signal. However, the prediction may not be acted upon. By way of an illustration of training a robot to traverse an obstacle course, the full override combiner may enable the trainer to communicate to the controller of the robot which actions to execute in a given portion of the course given the corresponding sensory context (e.g., position of obstacles). Use of the Full Override combiner process may reduce number of trials required to attain target level of performance, reduce probability of collisions with obstacles thereby preventing damage to the robot.

In some implementations, the combiner component may be operable in accordance with an Additive Combiner process. When operable in the Additive Combiner mode, the trainer's control input may be combined with the predictor output. In some implementations, the trainer's input and the predicted control may be configured in "delta" space wherein the controllable parameter (e.g., correction 408 in FIG. 4A) may be used to modify the existing state of the system (e.g., comprising motor torque and/or robot platform acceleration) rather than indicating a target value (setpoint). In some implementations, the delta control approach may be utilized with a continuously varying robot state parameter (e.g., speed, orientation). In one or more implementations, the delta control approach may be used for manipulating a discrete state (e.g., training a controller of an elevator).

For example, if the target angle is 45°, the trainer's input may initially exceed the target angle in order to reduce learning time. Subsequently as the robot begins to move its current trajectory towards the target (e.g., towards 45°), the trainer may reduce the input angle in order to prevent overshooting the target trajectory angle.

The Additive Combiner process may advantageously enable training of a one DOF at a given time instance thereby facilitating training of robotic devices characterized by multiple DOF. During training of the robot using the Additive Combiner process, the trainer and the robot contribute to the output (execute action). The trainer may adjudge the learning progress based on a comparison of the trainer's contribution and the action by the robot. The Additive Combiner process may facilitate provision of small corrections (e.g., heading change of a few degrees to direct the robot trajectory along 45° heading). In some implementations wherein default state of the robot's controller may be capable of providing control output that may operate the robot within a range from the target trajectory (e.g., drive forward in a straight line). The Additive Combiner may provide an economical approach to correcting the default trajectory to the target trajectory. By way of an illustration, natural predisposition of a randomly-initialized neural network may be sufficient for some behaviors (e.g., the neural network may have a tendency to turn away from certain obstacles without training.) This means that memory resources (e.g., weights) of the learning controller process may not have to be modified in some cases. When the predictor may select an action that may be acceptable to the trainer, network memory modifications may not be required. The network may be idiosyncratic in the way it performs certain tasks or actions, but reduced computational resources are required for achieving performance.

During training of a robot by a human trainer using the Additive Combiner, the teacher may encounter an appealing experience as the robot may begin to take over (assist) as the training progresses. Such experience may encourage the trainer (particularly a novice) to perform training of robots.

In some implementations, the combiner (e.g., 418 of the controller 400 in FIG. 4A) may be operable in a Touchfader Override (TO) mode. When operable the TO mode the combiner may weigh the trainer's input (408) with a greater weight compared to the predicted signal (418) thereby implementing the override functionality. The TO combiner implementation may comprise a user interface configured to (i) convey to the trainer configuration of the combiner (e.g., weights associated with the teaching input and predictor output); and enable the trainer to provide small (e.g., less than 20% of the combined value) corrective adjustments. The interface illustrated in FIGS. 13A-13B may be utilized with, e.g., delta-based control (e.g., varying motor torque) and/or position-based control (e.g., varying robot's position).

In some implementations, e.g., such as illustrated in FIG. 13C, the Touchfader combiner may comprise a physical interface wherein the current value of the control changes may be provided in a manner visible to the user by moving the physical element (a physical slider, a knob (e.g., 1361 in FIG. 13C, and/or another control element). The trainer may apply a small amount of force to the physical control element in order to make slight adjustments (corrections), or a large force to make substantial adjustments (overrides).

In some implementations, e.g., such as illustrated in FIG. 13B, the Touchfader may comprise a proximity sensitive interface (e.g., a touchscreen) effectuated using a static (e.g., built in appliance) and/or portable computing device (e.g., a smartphone). In some implementations, the touchscreen interface may provide magnification of controllable element (e.g., area around the location of the current control) this simulates the resistance of the physical control, but on an easier-to-implement touch screen.

In some implementations, the touchfader combiner may comprise overriding control methods, the user can implement "virtual additive" function by touching the screen just a bit to the left or to the right of the slider's current position.

In one or more implementations, the combiner (e.g., 414 in FIG. 4A) may comprise an Additive-Override Hybrid (AOH) process. The AOH process may function as an additive process for small (e.g., 10% or less of the total value) corrections. For inputs that are in excess of the threshold, the AOH process may implement an overriding combiner functionality. In some implementations wherein the predictor p, and the teaching c (corrector) signals may be configured in the range between −1 and 1, the AOH process logic may be expressed as follows:

If $p > R \times c$, $b = c$;

else $$b = p + c, \quad \text{(Eqn. 17)}$$

where b denotes the combiner output (e.g., 430 in FIG. 4A), and R denotes the threshold (selected from the range between 0 and 0.2 in some implementations). In one or more implementations, the AOH combiner may comprise an interpolation operation configured to provide a smooth transition between branches of the logical expression of Eqn. 17.

In some implementations, the interpolation may be expressed as follows:

$$b = p + c - p\left(\frac{|p - c|}{|p| + |c|}\right) \quad \text{(Eqn. 18)}$$

where
p, predictor signal in [−1 1];
b, motor control (combiner output) signal in [−1 1];
c, corrector signal in [−1 1].

In some implementations, the combiner may be operable in accordance with the Threshold Nonlinearity (TN) process. The TN combiner process may be configured to provide additive and override functionality depending on the relative magnitude of the correction and prediction components. In some implementations, the TN combiner operation may be configured as follows:

$$b=p+c,$$

$$b=1 \text{ when } b>1;$$

$$b=-1 \text{ when } b<-1; \quad \text{(Eqn. 19)}$$

where
- p, predictor signal in [−1 1];
- b, motor control (combiner output) signal in [−1 1];
- c, corrector signal in [−2 2] range.

The combiner of Eqn. 19 may be operated to provide additive functionality. A threshold nonlinearity of the combiner of Eqn. 19 may be configured such that large corrector input (in excess of the maximum magnitude of the predicted component, e.g., 2) may be used to override the predictor component. By way of an illustration of an autonomous robot approaching an obstacle, when predicted output (e.g., −1) may cause a collision with the obstacle, an additive combiner with maximum correction signal value of 1 may be unable to prevent the collision. Using corrector signal range (e.g., from −2 to 2) that may exceed the predictor signal range (e.g., from −1 to 1) and the combined signal range (e.g., from −1 to 1). In the above example, the correction input of 2 may be used to effectively override the (erroneous) predicted output and guide the robot away from the obstacle.

The combiner of Eqn. 19 may be employed with the delta control process wherein the controllable parameter (e.g., correction 408) may be used to modify the current value of the system state (e.g., vehicle acceleration, motor torque, and/or other parameter) rather than indicating a target value (setpoint). In some implementations, the delta control approach may be utilized with a continuously varying robot state parameter (e.g., speed, orientation). In one or more implementations, the delta control approach may be used for manipulating a discrete state space controller (e.g., controlling an elevator, a pick and place manufacturing robot, a shelve stocking robot and/or other control application).

Systems and methods for training path navigation are disclosed herein. In some implementations, a robot may be trained to follow a path. The image shift determination may inform the robot of whether the robot is too far off to the left or right. The robot may adjust its heading to compensate. A PID controller may be used to add necessary negative feedback to make the system stable in following the path, in some implementations. Prior information about where in the training sequence the robot is currently operating may guide the robot in making correct inferences about new camera images, and may help the robot narrow the search space to gain computational efficiency.

One or more implementations described herein may provide a mechanism for enabling a robot to learn navigating a target trajectory while reducing deviation from a target path. In some implementations, the robot may comprise a robotic vehicle (e.g., 160 in FIG. 1) comprising a camera (e.g., 166). The robot may comprise a controller configured to store a sequence of images obtained during training phase. In some implementations, the images may be stored in an ordered buffer in a non-volatile memory (e.g., memory 814 in FIG. 8).

Figure 20A:
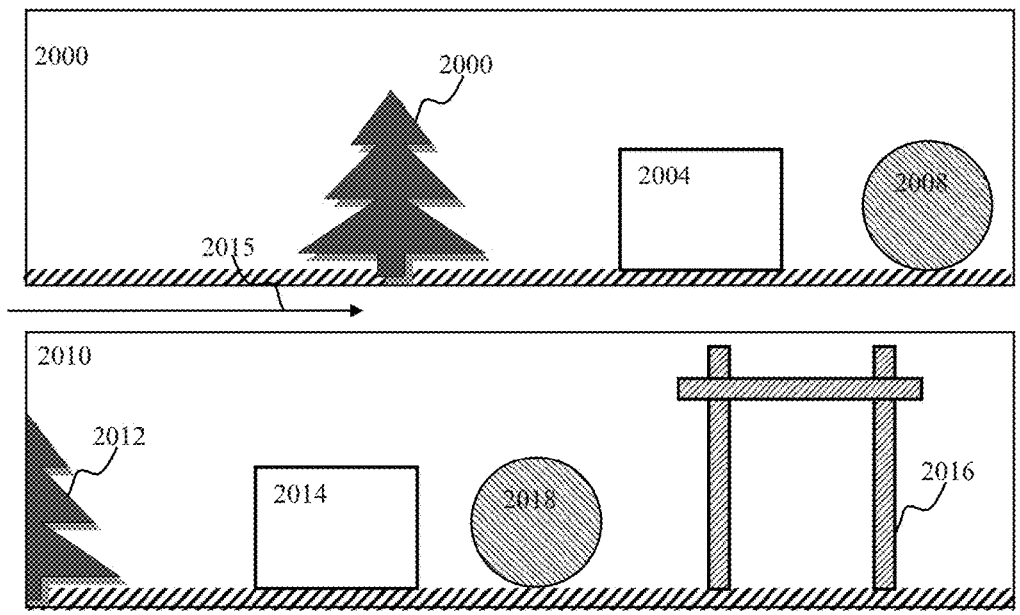
FIG. 20A presents exemplary images for use with training of path navigation, in accordance with one or more implementations.

FIG. 20A illustrates exemplary images for use with training of path navigation. Images 2000, 2010 may be obtained with a variety of sensors, e.g., a video camera, IR camera, RADAR, SONAR, LiDAR, ultrasonic imager, and/or other device. In some implementations, the camera may be spanning the entire horizontal view field of 360 degrees. A 360 degree horizontal view field may provide additional information about robot's environment and enable cyclical shift of images.

In one or more implementations, images 2000, 2010 may be obtained with a camera 166 mounted on a robotic vehicle 160 of FIG. 1. Images 2000, 2010 may comprise representations of visual field that may be obtained at times t1<t2, respectively. The image 2000 may comprise representations one or more objects, e.g., a tree 2002, a rectangle, a ball 2008, and/or other objects. During motion of the vehicle 160 relative position and/or orientation of the camera and the visual scene may change. By way of an illustration, the vehicle 160 may execute a right turn. The image 2010 may be obtained subsequent to the turn execution. Representation of objects in the image 2010 may be shifted relative representations of the same objects in the frame obtained prior to the turn execution. Additional object representations (e.g., 2016 in FIG. 20A) may appear, while representations of some object that may be present in one image (e.g., 2000) may be absent from the subsequent image (e.g., 2010). Comparing image 2010 to image 2000, representations of the tree 2012 the rectangle, 2014, and the ball 2018 are shifted (horizontally) within the frame 2010 relative representations, 2002, 2004, 2008 in the frame 2010. The amount of the shift may be configured based on relative motion between the images (e.g., motion speed and time interval t2-t1 between the images). It may be further noticed from comparing images 2000 and 2010 that the ball 2018 in image 2010 may be disposed closer to the rectangle 2014 compared to distance between respective object representations 2008, 2004 in image 2000.

During training, images (e.g., raw and/or pre-processed) may be stored in a memory buffer (training buffer). In one or more implementations, preprocessing operations may comprise resampling, cropping, light balancing, and/or feature extraction. Motor commands issued by a trainer corresponding to time instances when the images are acquired may be stored. Additional sensory information (e.g., vehicle motion information, ambient environment information, vehicle operational parameters) corresponding to time instances when the images are acquired may be stored.

During autonomous operation, control process of the robot may be configured to compare a given (e.g., the most recent, current) image with one or more the images from the training buffer. In some implementations, the matching process may comprise comparing the given image to every image in the training buffer.

For computational efficiency reasons, it may not be desirable and/or feasible to compare each new camera image with every one of the stored images seen during training, according to some implementations. The robot may take advantage of the prior information about what are the likely regions of the path where it might be located, and only search those regions. The robot may search a random sample of other regions in case the prior information is inaccurate or invalidated for some reason.

In order to reduce computational requirements of the image match process, the given image may be compared to a subset of images from the training buffer using image match process described in detail below.

In some implementations, the search space may be narrowed using a form of particle filtering, where the robot maintains a plurality of particles indicating the likely parts of the path. That is, individual particle points at a particular image from the training buffer. As a new camera image arrives, the robot may search those images in the training buffer which are close to the particles. Individual particles may be moved to a nearby location in the training buffer where the stored image matches closely with the newly arrived image. Particles with poor match with the new image may be deleted. New particles may be created, either in the vicinity of the other particles, or from randomly sampled locations in the training buffer, shown in FIG. 22.

The comparison subset of images may comprise a plurality of previously matched images and a plurality of randomly selected images (e.g., 20 in some implementations). The previously matched images may correspond to one or more tracked sequences (also referred as particles). The particle characterized by the best match (e.g., comprising previously used image) may be referred to as the primary particle. In some implementations, the best match image may be complemented by one or more second best image matches, corresponding to secondary particles.

The given image may be compared to images of the primary particle set. In some implementations, the primary particle set may comprise a previously used image I0 (e.g., 2000 in FIG. 20A), one or more (e.g., 2) images preceding the I0 image in time in the training buffer, and one or more (e.g., 5) images following the I0 image in time in the training buffer.

In one or more implementations, the given image may be compared to images of one or more secondary particle set(s). A secondary particle set may comprise the previously identified second best IS1 and one or more (e.g., 2) images following the IS1 image in time in the training buffer. In some implementations, the secondary particle set may further comprise one or more (e.g., 2) images preceding the IS1 image in time in the training buffer. In one or more implementations, additional secondary particle sets of images may be configured in the manner that is described above. The particle sets and the randomly selected images may be referred to as the match search set.

In some implementations, the given image may be compared to images (e.g., 10-50) that may be randomly selected from images in the training buffer.

Image match process may be configured as follows, in accordance with one or more implementations. The amount of shift (e.g., in x and/or in y directions) between the given image and individual images of the match search set may be determined using the phase correlation approach. To determine whether the new image is shifted left or right compared with a stored image, a cross-correlation between the two images (e.g., 2000, 2010 in FIG. 20A) may be determined. The argmax of the cross correlation (e.g., maximum of the correlation magnitude) may correspond to the most likely (x,y) shift amount. Arrow 2015 in FIG. 20A denotes amount of shift between the images 2000 and 2020. If the images are identical except for a shift, then the cross-correlation may be 1 at the corresponding x,y shift.

In some implementations, the cross-correlation between two images may be determined by utilizing the spatial frequency domain. A windowing function (e.g., Hann, Gaussian, cosine, Hamming, and/or other windowing function) may be applied to individual images to produce windowed image and reduce edge effects. A fast-Fourier transform (FFT) may be performed on the windowed images to obtain a spatial frequency representation of the images. Normalized cross-power spectrum may be determined from the two spatial frequency representations. An inverse FFT may be applied to transform the cross spectrum to x,y domain and to obtain the cross-correlation. The argmax of the cross-correlation may be determined in order to obtain x,y coordinates (shift values) corresponding to maximum cross-correlation. In some implementations wherein x,y dimension may correspond to integer values (e.g., 1 pixel), the cross-correlation matrix may be interpolated onto a grid with greater resolution (e.g., 0.5 or 0.25 pixel grid).

Image shift parameters determined from the image correlation operation may be used when determining which image(s) from the match search set may be considered as a match to the given image. In some implementations, the given image may be shifted by amount determined from the image matching operation. By way of an illustration, image 2010 may be shifted to the right by amount depicted by arrow 2015 in FIG. 20A. The shifted image may be trimmed from the edge towards which the shift is performed (e.g., right edge of the image 2010 in FIG. 20A). The matching image (e.g., 2000 in FIG. 20A) may be trimmed on the left by the amount if the shift.

Figure 20B:
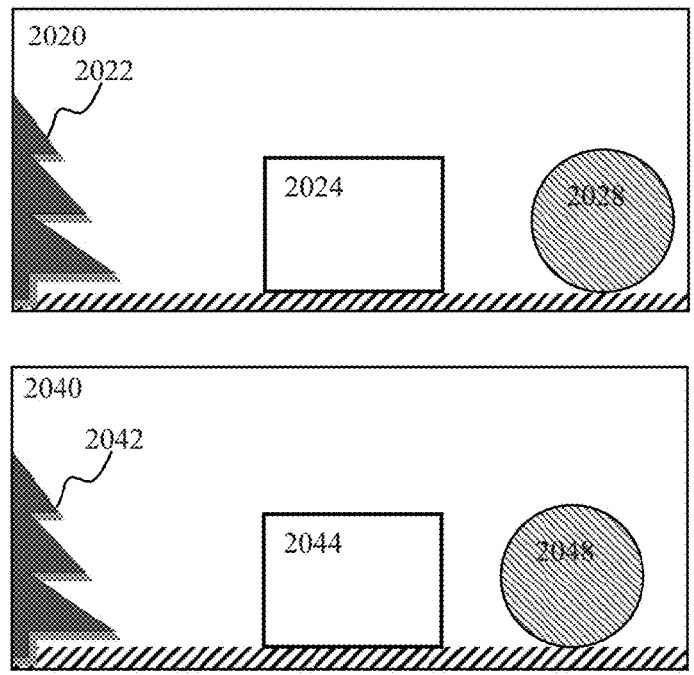
FIG. 20B illustrates using image shift and/or crop for determining image match, in accordance with one or more implementations.

FIG. 20B illustrates output of the shift and trim operation. Frame 2020 depicts the trimmed version of the image 2000; frame 2040 depicts the shifted and trimmed version of the image 2010 in FIG. 20A. It is noteworthy that matching images may not necessarily be identical to one another. Variability between matching images may exist. By way of an illustration, the ball 2018 in the image 2010 may be disposed closer to the rectangle 2014 relative the ball 2008 position in the image 2000. Accordingly, the shifted/trimmed frames 2020, 2040 in FIG. 20B may comprise differences.

A similarity metric may be determined between the shifted/trimmed frames (e.g., 2020, 2040 in FIG. 20B). In some implementations, the similarity may be determined by performing pixel-wise difference between the overlapping regions (e.g., the frames 2020, 2040 in FIG. 20B) of the given image and the matching image. A norm of the image difference in the overlapping region may be determined for individual images from the matching search set. An image corresponding to the lowest norm may be referred to as the best match.

As the robot is following a learned path, it may expect to receive approximately the same camera images in the same order as seen during training. In practice, the robot may not be expected to instantaneously jump from one part of the path to another part. It may be useful to determine and take into account prior information about which sequence number(s) of the training buffer are the most likely to be selected as the best match. The assigned likelihood of a new camera image actually being taken from the same location as a particular image in the buffer of training images, may be related to how well the new image matches up with the stored image as well as how likely that location was in the first place according to the prior information, as shown and described with respect to FIG. 21.

In some implementations, history of the image matching process may be utilized in order to determine best match image. By way of an illustration, if a match search set image with the best match score (e.g., the lowest norm) belongs to the primary particle set than it may be selected as the best match. If the image with the best match score belongs to the secondary particle set than it may be selected based on an evaluation of image history parameter. In some implementations, image history parameter evaluation may be performed as follows:

(i) a running window average match score may be determined by averaging over last N images within individual particle sets. In some implementations, the averaging window size may be selected equal 3 for video images acquired at 40 ms intervals and vehicle navigation speeds between 0.1 and 2 m/s. Other window lengths (e.g., 4-20 images) may be utilized and/or configured in accordance with expected navigation speed and/or video acquisition rate;
(ii) the average match score for individual secondary particle sets may be compared to individual match scores from the match search set;
(iii) best match image from the secondary particle set may be selected if it has the best match score (e.g., lower norm) of individual match scores from the match search set and the window averaged match score is better (e.g., lower norm) compared to the window-averaged match score of the primary particle.

The primary and/or secondary particle sets may be discontinued (discarded). In some implementations, the discarding may be configured based on a comparison of the match score for a given particle with the match score for randomly selected images. If image match score for a given particle is worse than individual scores for the randomly selected images the given particle may be discontinued. The discontinued particle may be replaced with the random image associated with the highest score.

Figure 21:
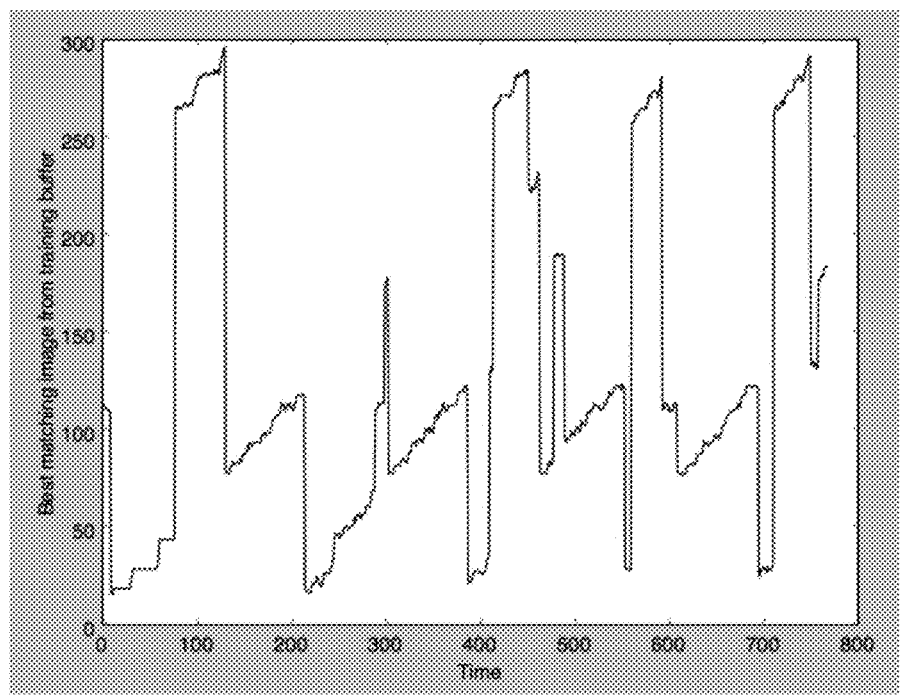
FIG. 21 is a plot presenting data illustrating output of image matching operation in accordance with one or more implementations.

FIG. 21 is a plot presenting data obtained by the initial Assignee of the instant application illustrating image matching obtained by assignee thereof during operation of an exemplary robotic vehicle. Horizontal axis denoted elapsed time during path navigation, vertical axis denoted best match image index determined from the training buffer. Training buffer corresponding to FIG. 21 comprises images obtained based on navigating a target trajectory by the vehicle three times.

Figure 22:
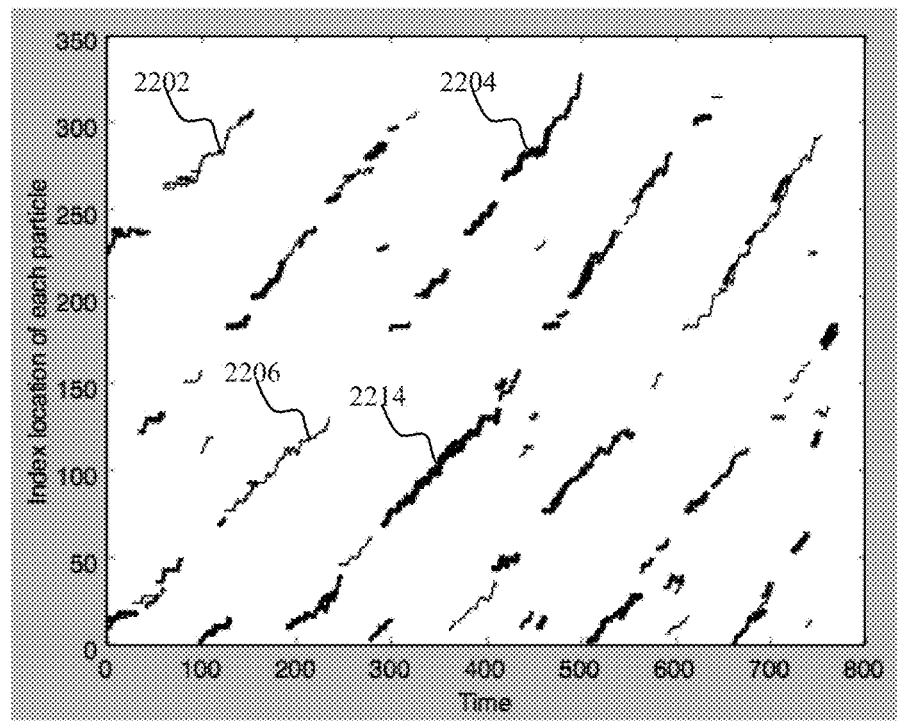
FIG. 22 is a plot presenting data related to the sequence number of the image from the training buffer chosen to be the most likely match as a function of time.
Figure 23:
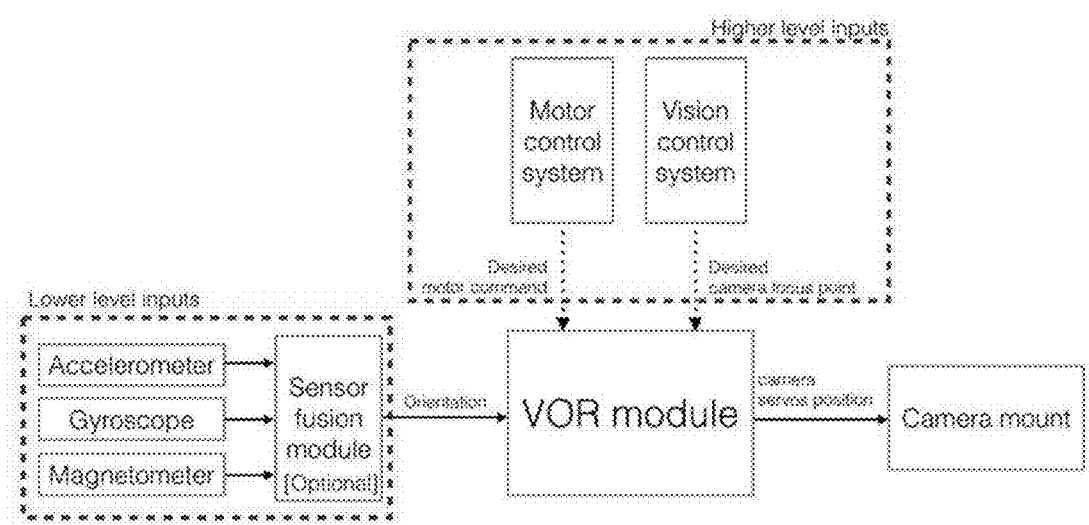
FIG. 23 is a functional block diagram illustrating VOR apparatus in accordance with one implementation.

FIG. 22 is a plot presenting data related to the sequence number of the best matched image from the training buffer selected using three particle sets. Segments denoted 2204, 2214, 2202, 2206 denote the primary and/or the secondary particle sets The x-axis denotes the time step, and the y-axis is the sequence number of the image in the training buffer that the particle is pointing to. Particles with a lifetime of less than 10 steps are not shown in FIG. 22.

Using this method, the estimate that the vehicle is in a given location may be based on data associated with previous frames, as accrued by each particle. For example, assuming independent noise across frames, a more robust estimate of the error in position could be achieved by calculating the product of the likelihood that the sensor data came from a given particle over the recent frames. Likelihood may be approximated using an exponentiated energy model. Likelihood may be explicitly calculated with a parametric statistical model. Particle deletion may be implemented using a temporally decaying cumulative log probability that deletes a given particle when the probability is lower than a fixed threshold. Additional techniques in rejection sampling (e.g. similar to Metropolis-Hastings process) sampling may be used to define a threshold.

The best match image obtained using image match methodology (e.g., such as described herein) may be used to determine changes (corrections) to motor commands during path navigation by a robotic vehicle. By way of an illustration, if the best match image (e.g., 2000 in FIG. 20A) may appear to be shifted right relative the given image (e.g., 2010) this may correspond to vehicle heading adjustment by the controller to the left. If the shift 2015 is to the left, the heading may be adjusted to the right.

Exemplary implementations of the methodology described herein may be applicable to controlling trajectory of a robotic device due to (i) position mismatch (e.g., the robot being located physically to the left of a target location); and/or (ii) due to orientation mismatch (e.g., the robot being in the same physical location while oriented towards the left of the target trajectory). To illustrate, assuming the camera faces straight ahead, the center of the image may be the spot which the robot is headed towards. Thus, if this spot is to the left of the spot where the robot is supposed to be headed towards (as defined by the camera image seen during training), then the robot may need to adjust its heading rightwards.

During operation when the robot may follow a target trajectory the shift amount determined using the image matching process may be close to 0 (this configuration may be referred to as "the robot stays on track"). In some implementations the shift amount may be utilized as an error metric by the control process of the robot. The steering signal (which may be adjusted leftwards or rightwards) may be selected as the control variable for the process. A negative feedback loop may be used in order to reduce the error metric to (and/or maintain at) a target level operation of the robot. In some implementations, the target error level may comprise zero displacement.

A PID controller may be used in order to reduce/maintain the error metric during operation of the robot. In some implementations, motor commands at a given time step may be obtained by taking the stored motor commands from the training buffer that may correspond to the best matching stored image. Those motor commands may be combined with the output from the PID controller in order to stabilize operation of the robot.

Systems and methods for providing VOR for robots are disclosed herein, in accordance with one or more implementations. Exemplary implementations may provide VOR-like functionality for a robot. In some implementations, VOR for a robot may refer to the stabilization of the camera image while the robotic body is moving. In existing robotic platforms where the movement of the system might be subject to unexpected disturbances (e.g. quad copter, two-wheeled robot (e.g., a Segway-type configuration), and/or other robotic platforms), this stabilization may improve the quality of the camera signal. Exemplary implementations may, for example, reduce blurring associated with the motion of a camera. The cleaned camera image may be later used for various applications (e.g., recording of stable video footages, clean sensors data for better post processing, and/or other applications).

Image stabilization (IS) may include a family of techniques used to compensate for pan, tilt, and roll (e.g., angular movement, equivalent to yaw, pitch and roll) of the imaging device. That family of techniques may include one or more of optical image stabilization, digital image stabilization, stabilization filters, orthogonal transfer CCD, camera stabilizer, and/or other techniques.

In some implementations, a camera stabilizer may utilize a set gimbal device. According to some implementations, a gimbal may be a pivoted support that allows the rotation of an object about a single axis. A set of three gimbals mounted with orthogonal pivot axes may be used to allow an object mounted on the innermost gimbal to remain independent of the rotation of its support.

The system may use a physical camera stabilizer to solve the problem of stabilizing the camera mount, in some implementations. This approach may enable VOR-like functionality on a robot with low cost sensors (e.g., gyroscope, accelerometer, compass, and/or other sensors) and low cost actuators (e.g., open loop control system, no feedback from the servos, and/or other actuators). In comparison, existing systems typically either use a fairly complex and expensive mechanical system (e.g., a gimbal camera) and/or a computationally expensive software solution that are not adapted to small robots with embedded low-powered processing boards.

Exemplary implementations may be not computationally expensive and may provide one or more of the following properties: change the center of the visual field dynamically, compensate selectively for unexpected movements versus desired movements, dynamic activation and deactivation of the VOR-like functionality, compensate for sensory motor delays if couple with a predictive model, and/or other properties.

Some implementations may assume that the camera to be stabilized is mounted on a set of one, two, or three servos, wherein an individual servo is allowed to rotate the camera on one axis (e.g., pan, tilt, or roll). The combination of servos may provide up to three degree of freedom for the stabilization of the movement of the camera.

The figure below illustrates an exemplary architecture used to accomplish the VOR-like functionality stabilization of a camera image, in accordance with one or more implementations.

The VOR-like functionality module may integrate inputs from sensors (e.g., state of the system, blue box) and higher level signal (e.g., sensorimotor control systems, red box) to determine the correction and desired position of the camera to stabilize the image (e.g., camera servos position, right part of the diagram).

The state of the robot may be provided one or more sensors that provide the global orientation of the robot and/or a derivative of the global orientation in multiple axes. Some implementations may include one or more of a gyroscope, an accelerometer, a magnetometer, and/or other sensors. A gyroscope may include a device that measures orientation changes, based on the principles of angular momentum. Some implementations may utilize a three-axis gyroscope, which may provide the velocity of change in the three directions x, y, and z. An accelerometer may include an electromechanical device that measures acceleration forces. These forces may be static, like the constant force of gravity pulling at your feet, or they could be dynamic, caused by moving or vibrating the accelerometer. By measuring the amount of static acceleration due to gravity, the angle the device is tilted at with respect to the earth may be determined. A magnetometer may include a device that measures the direction of the magnetic field at a point in space. In some implementation, the system may include a three-axis magnetometer.

The higher level inputs may be provided by a sensorimotor control process, which may control the desired movement of the robot (e.g., output of the motor control system) and/or the desired focus point of the camera (e.g., output of the vision control system).

The motor control system may represent any process and/or devices configured to send a motor command to the robot. A motor command may, for example, be represented in a different space (e.g., a desired set point, a new desired linear and angular velocity for a wheeled robot, a torque command, and/or other representations). A motor control system may, for example, include one or more of a wireless joystick connected to the robot, a process that configured to follow a pre-defined path, a learning system, and/or other control mechanisms.

The vision control system may represent any process and/or device configured to update the focus point of the camera to be stabilized, and/or to switch on and off the VOR-like functionality module. In some implementations, a vision control system may include a handheld computing device (e.g., a tablet computer, a Smartphone, and/or other handheld device) where the user can tap on the screen displaying the camera stream the position where the camera image should be center, and/or an automatic tracker that follows an object of interest in the visual field.

Figure 24:
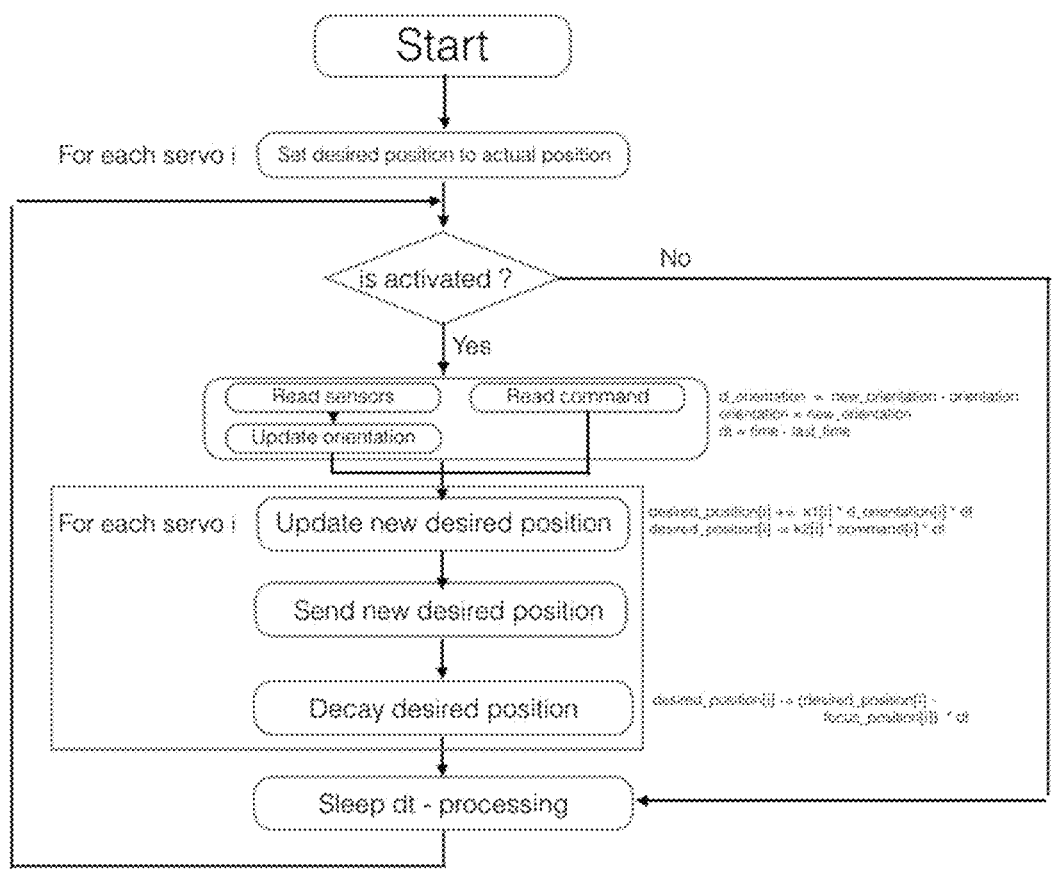
FIG. 24 presents a logical flow diagram describing operations of the VOR process, in accordance with one or more implementations.

At individual time steps, the VOR-like functionality module may receive the change of orientation since the last step, as well as the new motor commands. In this stage, the focus point may be assumed to be fixed and be set for each servo. FIG. 24 presents a logical flow diagram describing operations of the VOR process, in accordance with one or more implementations. Depending on the frequency and amplitude of movement, the VOR module may need to run at a high frequency (e.g., at 100 Hz and/or other frequencies).

In some implementations, the process may run in an infinite loop, and may exit the loop responsive to the main program of the robot being stopped. Before entering the loop, the desired position for individual servos may be set to the actual position of the servo. This may suggest that, in the absence of movement, the servo should not be moved.

If the VOR module is activated, new sensors values may be provided, a new orientation of the robot may be updated, and the change of orientation on dt may be determined, according to some implementations. The motor command may be sent to the robot and signals to the next module may be provided in order to update a new desired position.

The next stage of the VOR process may be to update the new desired position of individual servos. The desired position may account for (i) un-expected movement (such displacement should be compensated) versus (ii) desired movement where the VOR-like functionality should be counter-compensated. For a given servo i, this may be achieved by a twofold process, in some implementations. First, the desired position of the given servo may be added to or otherwise combined with the velocity of change for the particular axis multiplied by dt and a gain that is servo dependent ($k1[i]$). Second, the amplitude of the desired movement may be removed along individual axes multiplied by dt and a gain that is also servo dependent ($k2[i]$). Some implementations may assume knowledge of how a given motor command will affect the camera movement in each direction.

The new desired position may be provided to individual servos of the camera mount. The desired position may be decayed so that it slowly gets back to the focus point overtime. This may facilitate compensating over time drift due to error measurement stemming from noise in the sensors. The gain k1 and k2 may not have to be perfect, in some implementations.

In some implementations, k1 and/or k2 may not be a constant to achieve perfect compensation, but instead may exhibit a slow drift toward the focus point.

In some implementations, the focus point of the camera may change dynamically by another process using the VOR module. Some implementations may include coupling the VOR system with a tracker (e.g., OpenTLD, MIL, and/or other tracker) such that the image is stabilized on the object of interest. Some implementations may involve coupling the VOR system with a user interface to control camera position. Such an interface may be a physical interface (e.g., a head-mounted device such as an Oculus Rift) configured to allow the user moves his/her head to define the new position and get the feedback from the camera on the head screen. Some implementations may include coupling the VOR system with a vision control system, making sure that the robot will look to a direction perpendicular to the acceleration vector (in the horizon).

The focus position of the camera may be a variable that can be updated by the vision control system. In this case, in the absence of unexpected movement, the "decay desired position" module may cause the camera to drift to the new position.

Compensation for sensory-motor delays may be included in implementations of the system. Some implementations may include a predictive module configured to prevent sensorimotor delays and/or components of un-desired movement that can be predicted based on the input of other sensors (once it is integrated). For example, according to some implementations, if the system goes into an oscillatory behavior, most of the oscillation may be predicted and compensated once it kicks on.

In some implementations, information from the gyroscope may be utilized to compensate for movement. In some implementations, a sensor fusion process may be utilized to integrate that information and improve the compensation.

The sensor fusion module may obtain a measurement from one or more of an accelerometer, magnetometer, gyroscope, and/or other source. The sensor fusion module may integrate the measurement(s) using a sensor fusion process to give an accurate estimation of the orientation of the system in space. The following figure illustrates an exemplary sensor fusion process, in accordance with one or more implementations.

APPENDIX A presents exemplary code in the Python language that may be utilized with a two-wheeled, self-balancing, robotic platform (e.g., similar to a Segway-type configuration), compensating for pan and tilt, in accordance with one or more implementations.

Implementations of the principles of the disclosure may be applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking).

A video processing system of the disclosure may be implemented in a variety of ways such as, for example, a software library, an IP core configured for implementation in a programmable logic device (e.g., FPGA), an ASIC, a remote server, comprising a computer readable apparatus storing computer executable instructions configured to perform feature detection. Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A non-transitory machine-readable storage medium having instructions embodied thereon, the instructions being executable by one or more processors to effectuate training of a learning component configured to operate a robotic apparatus, the instructions configured to, when executed cause the one or more processors to:
   provide a first control output, the first control output configured to cause the robotic apparatus to execute a first physical action;
   receive a feature occurrence information comprising feedback via a sensor of the robotic apparatus;
   cause production of a predicted output comprising a first vector from the learning component based on an occurrence of a feature in the received feature occurrence information, the predicted output configured to automatically cause the robotic apparatus to execute a second physical action based on one or more components of the first vector which is selected from a first range of values between a first value and a second value;
   produce a training input indicative of a target physical action, the training input comprises one or more components of a second vector selected from a second range of values between a third and fourth value;
   cause a combination of the training input and the predicted output via a combiner to produce a second control output comprising a third vector, the second control output configured to maintain execution of the first physical action by the robotic apparatus or execute the second physical action based on an analysis of one or more components of the third vector which is selected from a third range of values between the first value and the second value;
   provide the second control output to the learning component; and
   adapt the learning component in accordance with a discrepancy measure between the second control output and the predicted output;
   wherein the adaptation of the learning configuration is configured to cause the learning component to produce the second control output upon the occurrence of the feature during execution of the first action.

2. The non-transitory machine-readable storage medium of claim 1, wherein:
   a second control output is determined by an overriding combiner component configured to produce:
      the second control output corresponding to the training input when the training input comprises a non-trivial indication; and
      the second control output corresponding to the predicted output when the training input comprises a trivial indication.

3. The non-transitory machine-readable storage medium of claim 2, wherein the non-trivial indication comprises a non-zero signal.

4. The non-transitory machine-readable storage medium of claim 2, wherein the trivial indication comprises a zero-valued signal.

5. The non-transitory machine-readable storage medium of claim 1, wherein:
   a second control output is characterized by an active state configured to automatically cause the robotic apparatus to execute the second physical action; and an inactive state configured to be ignored by the robotic apparatus; and the second control output is effectuated by the combiner, the combiner being operable in accordance with a state-persistent process characterized by a threshold, the process configured to:
  produce the active state of the second control output when a combination of the training input and the predicted output breaches the threshold; and
  produce the inactive state of the second control output when the combination of the training input and the predicted output does not breach the threshold.

6. The non-transitory machine-readable storage medium of claim 5, wherein:
  the active state comprises a positive value; and
  the inactive state comprises a negative value.

7. The non-transitory machine-readable storage medium of claim 5, wherein:
  the predicted output comprises the first vector, the first vector comprised of a first component configured to activate the first physical action, and a second component configured to activate the second physical action;
  the training input comprises the second vector, the second vector being comprised of a plurality of components;
  the second control output comprises the third vector being comprised of a plurality of components; and
  the threshold of the state-persistent process is performed on a component-by component basis.

8. The non-transitory machine-readable storage medium of claim 7, wherein a sum of the plurality of components of the third vector is one.

9. The non-transitory machine-readable storage medium of claim 1, wherein the second control output is generated by an additive combiner component configured to produce the second control output, the additive combiner component configured to generate the combination of the training input and the predicted output when the training input comprises a trivial indication; and generate the training input when the training input comprises a non-trivial indication.

10. A robotic apparatus comprising:
  a sensor interface configured to receive sensor data related to an environment of the robotic apparatus;
  an interface configured to receive a training input;
  a feature detection component;
  an output prediction component in operable communication with the feature detection component and the interface, the output prediction component comprising logic configured to, based on a feature detection indication produced by the feature detection component, to produce a first task activation indication and a second task activation indication; and
  a switching component configured to, responsive to the production of the feature detection indication:
  evaluate a current active task indication;
  based on an occurrence of a first sensory input via the sensor interface during execution of a first physical task by the robotic apparatus, and based on the current active task indication corresponding to a third physical task, provide a first task activation output comprising the first task activation indication, the first task action indication being configured to automatically cause the robotic apparatus to execute the third physical task associated therewith; and
  based on the occurrence of the first sensory input via the sensor interface during execution of a second physical task by the robotic apparatus, and based on the current active task indication corresponding to a fourth physical task, provide a second task activation output comprising the second task activation indication, the second task action indication being configured to automatically cause the robotic apparatus to execute the fourth physical task associated therewith, the fourth physical task differing from the third physical task;
  wherein:
  the third and the fourth physical tasks differ from one another so as to produce outcomes different from one another.

11. The robotic apparatus of claim 10, wherein the first, the second, the third and the fourth physical tasks differ from one another so as to produce outcomes different from one another.

12. The robotic apparatus of claim 10, wherein the first and the second physical tasks differ from one another so as to produce outcomes different from one another.

13. The robotic apparatus of claim 10, further comprising:
  a first and second actuator operably coupled to the switching component;
  wherein the first task activation output is configured to activate the first actuator; and the second task activation output is configured to activate the second actuator.

14. The robotic apparatus of claim 13, wherein
  the first actuator activation is configured to displace the robotic apparatus from a first coordinate to a second coordinate, and the second actuator activation is configured to displace the robotic apparatus from the first coordinate to a third coordinate substantially different from the second coordinate.

15. The robotic apparatus of claim 13, wherein:
  the robotic apparatus is characterized by a state;
  the first activation indication is configured to modify a current instance of the state to a first state; and
  the second activation indication is configured to modify the current instance of the state to a second state, the second state being different from the first state.

16. The robotic apparatus of claim 15, wherein the state is characterized by a state parameter selected from the group consisting of a position of the robotic apparatus, a characteristic of motion of the robotic apparatus, and an orientation of the robotic apparatus.

17. The robotic apparatus of claim 15, further comprising a first mechanical element and a second mechanical element;
  wherein the state is characterized by a state parameter conveying information related to mutual orientation of the first and the second mechanical element.

18. The robotic apparatus of claim 15, further comprising a mechanical element characterized by a dimension of a plurality of possible dimensions; and
  wherein the state comprises a first dimension.

* * * * *